(12) United States Patent
Woodgate et al.

(10) Patent No.: US 11,353,752 B2
(45) Date of Patent: Jun. 7, 2022

(54) DIRECTIONAL DISPLAY APPARATUS

(71) Applicant: RealD Spark, LLC, Boulder, CO (US)

(72) Inventors: Graham J. Woodgate, Henley-on-Thames (GB); Michael G Robinson, Boulder, CO (US); Robert A Ramsey, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 17/243,993

(22) Filed: Apr. 29, 2021

(65) Prior Publication Data

US 2021/0341799 A1 Nov. 4, 2021

Related U.S. Application Data

(60) Provisional application No. 63/017,714, filed on Apr. 30, 2020.

(51) Int. Cl.
*G02F 1/1337* (2006.01)
*G02F 1/1335* (2006.01)
(Continued)

(52) U.S. Cl.
CPC ....... *G02F 1/133769* (2021.01); *G02B 30/31* (2020.01); *G02F 1/133524* (2013.01);
(Continued)

(58) Field of Classification Search
CPC ......... G02F 1/133769; G02F 1/133742; G02F 1/133738; G02F 1/133524;
(Continued)

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

CN-201980020303.0—Notification of the First Office Action dated Dec. 16, 2021.
(Continued)

*Primary Examiner* — Nathanael R Briggs
(74) *Attorney, Agent, or Firm* — Penny L. Lowry

(57) ABSTRACT

A switchable privacy display comprises a spatial light modulator (SLM), a first switchable liquid crystal (LC) retarder and first passive retarder between a first pair of polarisers and a second switchable LC retarder and second passive retarder between a second pair of polarisers. The first switchable LC retarder comprises a homeotropic alignment layer and a homogeneous alignment layer. The second switchable LC crystal retarder comprises two homeotropic alignment layers or two homogeneous alignment layers. In landscape or portrait privacy mode, on-axis light from the SLM is directed without loss, whereas off-axis light has reduced luminance to reduce visibility to off-axis snoopers. Display reflectivity may be reduced for on-axis reflections of ambient light, while reflectivity may be increased for off-axis light to achieve increased visual security. In public mode, the LC retardance is adjusted so that off-axis luminance and reflectivity are unmodified. The display may switch between day-time and night-time operation.

45 Claims, 35 Drawing Sheets

(51) Int. Cl.
  *G02B 30/31* (2020.01)
  *G06F 21/84* (2013.01)
(52) U.S. Cl.
  CPC .. *G02F 1/133533* (2013.01); *G02F 1/133536* (2013.01); *G02F 1/133738* (2021.01); *G02F 1/133742* (2021.01); *G06F 21/84* (2013.01)
(58) Field of Classification Search
  CPC ......... G02F 1/133533; G02F 1/133536; G02B 30/31; G06F 21/84
  See application file for complete search history.

(56) References Cited

U.S. PATENT DOCUMENTS

| | | |
|---|---|---|
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,935,714 B2 | 3/2021 | Woodgate et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0214615 A1 | 11/2003 | Colgan et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |

(56) References Cited

U.S. PATENT DOCUMENTS

| | | |
|---|---|---|
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1* | 8/2019 | Robinson .......... G02F 1/133536 |
| 2019/0278010 A1 | 9/2019 | Sakai et al. |
| 2019/0293858 A1 | 9/2019 | Woodgate et al. |
| 2019/0293983 A1 | 9/2019 | Robinson et al. |

(56) References Cited

U.S. PATENT DOCUMENTS

| | | | |
|---|---|---|---|
| 2019/0353944 | A1 | 11/2019 | Acreman et al. |
| 2019/0361165 | A1 | 11/2019 | Chang et al. |
| 2020/0026125 | A1 | 1/2020 | Robinson et al. |
| 2020/0159055 | A1 | 5/2020 | Robinson et al. |
| 2020/0218101 | A1 | 7/2020 | Ihas et al. |
| 2020/0225402 | A1 | 7/2020 | Ihas et al. |
| 2020/0233142 | A1 | 7/2020 | Liao et al. |
| 2021/0033898 | A1 | 2/2021 | Woodgate et al. |
| 2021/0116627 | A1 | 4/2021 | Tsuji |
| 2021/0149233 | A1 | 5/2021 | Robinson et al. |

FOREIGN PATENT DOCUMENTS

| | | | |
|---|---|---|---|
| CN | 1776484 | A | 5/2006 |
| CN | 101042449 | A | 9/2007 |
| CN | 101256251 | A | 9/2008 |
| CN | 101518095 | A | 8/2009 |
| CN | 101681061 | A | 3/2010 |
| CN | 103473494 | A | 12/2013 |
| CN | 104133292 | A | 11/2014 |
| CN | 104303085 | A | 1/2015 |
| CN | 104321686 | A | 1/2015 |
| CN | 104380177 | A | 2/2015 |
| CN | 204740413 | U | 11/2015 |
| CN | 106104372 | A | 11/2016 |
| CN | 106415342 | A | 2/2017 |
| CN | 209171779 | U | 7/2019 |
| GB | 2418518 | A | 3/2006 |
| GB | 2428100 | A | 1/2007 |
| GB | 2428345 | A | 1/2007 |
| GB | 2482065 | A | 1/2012 |
| GB | 2486935 | B | 9/2013 |
| JP | H01130783 | U | 9/1989 |
| JP | H11174489 | A | 7/1999 |
| JP | 2006139160 | A | 6/2006 |
| JP | 2007148279 | A | 6/2007 |
| JP | 2007273288 | A | 10/2007 |
| JP | 2014099363 | A | 5/2014 |
| KR | 20120011228 | A | 2/2012 |
| KR | 1020170040565 | A | 4/2017 |
| KR | 101990286 | B1 | 6/2019 |
| TW | M537663 | U | 3/2017 |
| TW | I612360 | B | 1/2018 |
| WO | 2005071449 | A2 | 8/2005 |
| WO | 2009008406 | A1 | 1/2009 |
| WO | 2010021926 | A2 | 2/2010 |
| WO | 2010143705 | A1 | 12/2010 |
| WO | 2014011328 | A1 | 1/2014 |
| WO | 2014130860 | A1 | 8/2014 |
| WO | 2015040776 | A1 | 3/2015 |
| WO | 2015057625 | A1 | 4/2015 |
| WO | 2015143227 | A1 | 9/2015 |
| WO | 2015157184 | A1 | 10/2015 |
| WO | 2015190311 | A1 | 12/2015 |
| WO | 2015200814 | A1 | 12/2015 |
| WO | 2016195786 | A1 | 12/2016 |
| WO | 2017050631 | A1 | 3/2017 |
| WO | 2018035492 | A1 | 2/2018 |
| WO | 2018208618 | A1 | 11/2018 |
| WO | 2019055755 | A1 | 3/2019 |
| WO | 2019067846 | A1 | 4/2019 |
| WO | 2019147762 | A1 | 8/2019 |

OTHER PUBLICATIONS

Adachi, et al. "P 228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.

(56) References Cited

OTHER PUBLICATIONS

Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Cheng, et al., "Fast-Response Liquid Crystal Variable Optical Retarder and Multilevel Attenuator," Optical Engineering 52 (10), 107105 (Oct. 16, 2013). (Year: 2013).
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
CN201680061632.6 Notification of the First Office Action dated Sep. 14, 2021.
CN201880073578.6 Notification of the First Office Action dated Aug. 27, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority dated Nov. 1, 2021.
PCT/US2021/043444 International search report and written opinion of the international searching authority dated Nov. 1, 2021.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.

* cited by examiner

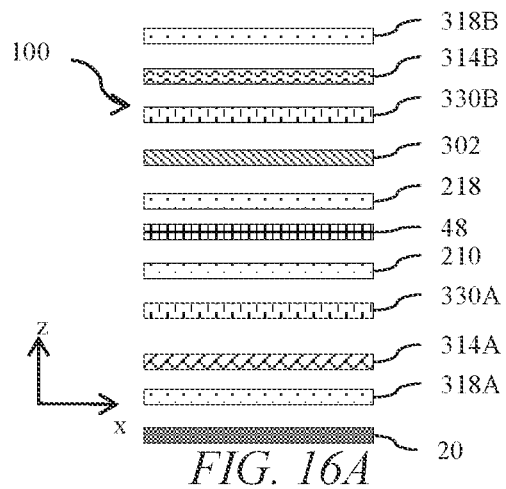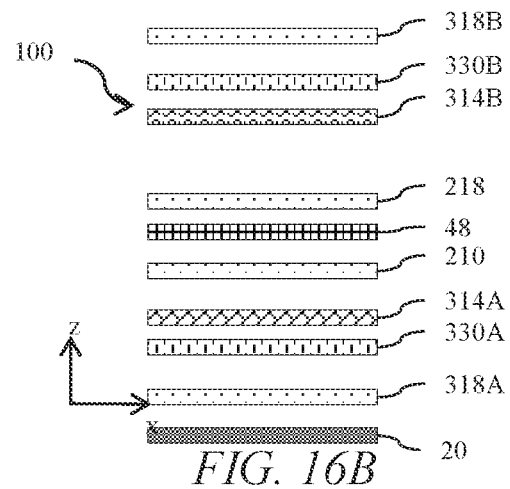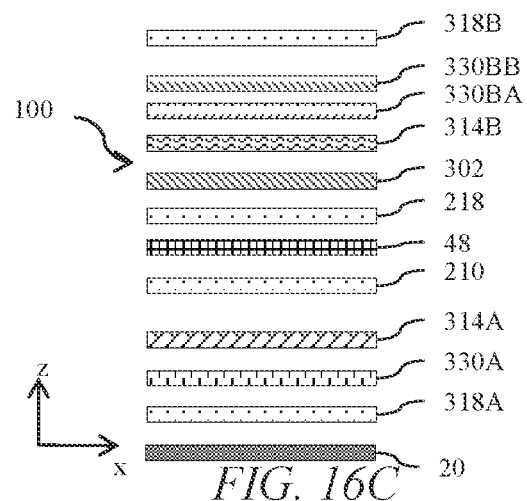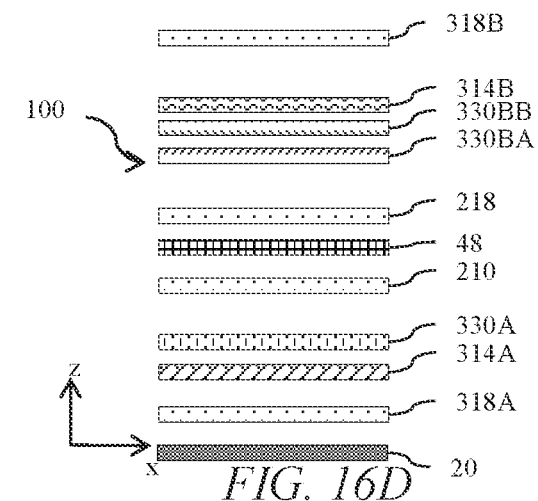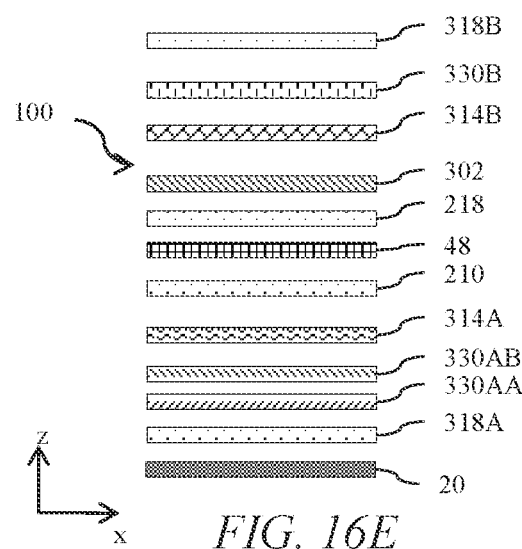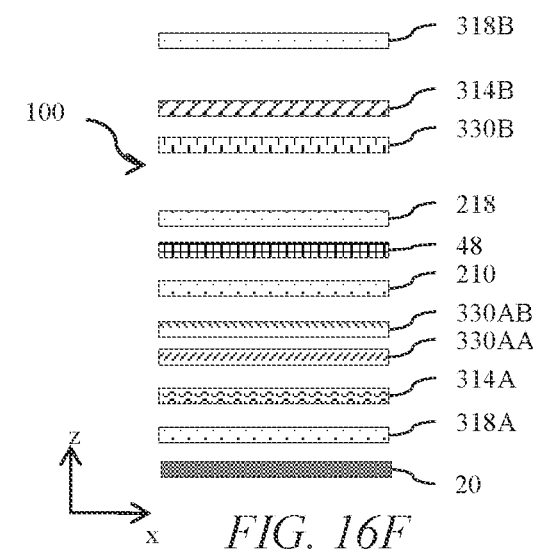

DIRECTIONAL DISPLAY APPARATUS

TECHNICAL FIELD

This disclosure generally relates to illumination from light modulation devices, and more specifically relates to optical stacks for providing control of illumination for use in display including privacy display and night-time display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to a first aspect of the present disclosure there is provided a display device comprising: a spatial light modulator; a display polariser arranged on a side of the spatial light modulator, the display polariser being a linear polariser; a first additional polariser arranged on the same side of the spatial light modulator as the display polariser, the first additional polariser being a linear polariser; at least one first polar control retarder arranged between the first additional polariser and the display polariser, a second additional polariser, the second additional polariser being a linear polariser; and at least one second polar control retarder, wherein either: the second additional polariser is arranged on the same side of the spatial light modulator as the first additional polariser outside the first additional polariser, and the at least one second polar control retarder is arranged between the first additional polariser and the second additional polariser; or the display device further comprises a backlight arranged to output light, the spatial light modulator comprises a transmissive spatial light modulator arranged to receive output light from the backlight, said display polariser is an input display polariser arranged on the input side of the spatial light modulator, and the display device further comprises an output display polariser arranged on the output side of the spatial light modulator, the second additional polariser is arranged on the output side of the spatial light modulator, and the at least one second polar control retarder is arranged between the second additional polariser and the output display polariser, wherein: each of the at least one first polar control retarder and the at least one second polar control retarder comprises a respective switchable liquid crystal retarder comprising a layer of liquid crystal material and two surface alignment layers disposed adjacent to the layer of liquid crystal material and on opposite sides thereof, in respect of one of the at least one first polar control retarder and the at least one second polar control retarder, one of the surface alignment layers is arranged to provide homogenous alignment in the adjacent liquid crystal material and the other of the surface alignment layers is arranged to provide homeotropic alignment in the adjacent liquid crystal material, and in respect of the other of the at least one first polar control retarder and the at least one second polar control retarder, both of the surface alignment layers are arranged to provide homogenous alignment in the adjacent liquid crystal material or both of the surface alignment layers are arranged to provide homeotropic alignment in the adjacent liquid crystal material. Advantageously a switchable privacy display may be provided with extended polar regions over which desirable security level may be achieved.

The switchable liquid crystal retarder of said one of the at least one first polar control retarder and the at least one second polar control retarder may have a retardance for light of a wavelength of 550 nm having a first retardance value in a range from 700 nm to 2500 nm, preferably in a range from 850 nm to 1800 nm. Advantageously luminance may be reduced over desirable polar regions; in embodiments comprising a reflective polariser reflectance may be increased over a wide polar area and security level may be provided at desirable levels over a wide polar region.

Said one of the at least one first polar control retarder and the at least one second polar control retarder may further comprise at least one passive compensation retarder. Advantageously the area of luminance reduction may be increased. Further the uniformity of luminance in public mode may be increased.

The spatial light modulator may comprise an emissive spatial light modulator arranged to output light, the display polariser may be an output display polariser arranged on the output side of the emissive spatial light modulator, the second additional polariser may be arranged on the output side of the spatial light modulator outside the first additional polariser, and the at least one second polar control retarder may be arranged between the first additional polariser and the second additional polariser. Advantageously a switchable privacy display with high security factor may be provided for an emissive spatial light modulator.

The display device may further comprise a backlight arranged to output light, and the spatial light modulator may comprise a transmissive spatial light modulator arranged to receive output light from the backlight. Advantageously a switchable privacy display with high security factor may be provided for a transmissive spatial light modulator.

The at least one passive compensation retarder of said one of the at least one first polar control retarder and the at least one second polar control retarder may be arranged on the same side of the switchable liquid crystal retarder as the surface alignment layers that is arranged to provide homeotropic alignment in the adjacent liquid crystal material. The at least one passive compensation retarder of said one of the at least one first polar control retarder and the at least one second polar control retarder may comprise a passive uniaxial retarder having its optical axis perpendicular to the plane of the retarder. The passive uniaxial retarder may have a retardance for light of a wavelength of 550 nm in a range from −400 nm to −2100 nm, preferably in a range from −700 nm to −1700 nm. Advantageously the size of the polar region for desirable security level is increased.

The display device may further comprise a reflective polariser, the reflective polariser being a linear polariser, and either: said display polariser may be an output display polariser arranged on the output side of the spatial light modulator, the second additional polariser may be arranged on the same side of the spatial light modulator as the first additional polariser outside the first additional polariser, the at least one second polar control retarder may be arranged between the first additional polariser and the second additional polariser, and the reflective polariser may be arranged between the first additional polariser and the at least one second polar control retarder; or the display device may further comprise a backlight arranged to output light, the spatial light modulator may comprise a transmissive spatial light modulator arranged to receive output light from the backlight, said display polariser may be an input display polariser arranged on the input side of the spatial light modulator, and the display device may further comprise an output display polariser arranged on the output side of the spatial light modulator, the second additional polariser may be arranged on the output side of the spatial light modulator, the at least one second polar control retarder may be arranged between the second additional polariser and the output display polariser, and the reflective polariser may be arranged between the output display polariser and at least one second polar control retarder. Advantageously in a privacy mode of operation, increased display reflectivity may be provided. In ambient illuminance, increased security level of the display may be achieved for snooper locations.

Said one of the at least one first polar control retarder and the at least one second polar control retarder may be the at least one second polar control retarder and said other of the at least one first polar control retarder and the at least one second polar control retarder may be the at least one first polar control retarder.

The switchable liquid crystal retarder of said one of the at least one first polar control retarder and the at least one second polar control retarder may have a retardance for light of a wavelength of 550 nm having a first retardance value and the switchable liquid crystal retarder of said other the at least one first polar control retarder and the at least one second polar control retarder may have a retardance for light of a wavelength of 550 nm has a second retardance value, the first retardance value being greater than the second retardance value. The magnitude of the difference between half the first retardance value and the second retardance value may be at most 400 nm. The first and second polar control retarders may provide luminance reduction and reflection increase for different polar regions. Advantageously the polar region over which desirable visual security is achieved is increased.

In respect of said other of the at least one first polar control retarder and the at least one second polar control retarder, both of the surface alignment layers may be arranged to provide homogenous alignment in the adjacent liquid crystal material which has a retardance for light of a wavelength of 550 nm in a range from 450 nm to 900 nm, preferably in a range from 550 nm to 800 nm, and said other of the at least one first polar control retarder and the at least one second polar control retarder may further comprise a pair of passive uniaxial retarders having optical axes in the plane of the retarders that are crossed and each having a retardance for light of a wavelength of 550 nm in a range from 250 nm to 800 nm, preferably in a range from 400 nm to 625 nm. In respect of the other of the at least one first polar control retarder and the at least one second polar control retarder, both of the surface alignment layers may be arranged to provide homogenous alignment in the adjacent liquid crystal material which has a retardance for light of a wavelength of 550 nm in a range from 500 nm to 900 nm, preferably 600 nm to 850 nm, and said other of the at least one first polar control retarder and the at least one second polar control retarder may further comprise a passive uniaxial retarder having its optical axis perpendicular to the plane of the retarder and having a retardance for light of a wavelength of 550 nm in a range from −300 nm to −700 nm, preferably in a range from −350 nm to −600 nm. In respect of the other of the at least one first polar control retarder and the at least one second polar control retarder, both of the surface alignment layers may be arranged to provide homeotropic alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder may further comprise a passive uniaxial retarder having its optical axis perpendicular to the plane of the retarder and having a retardance for light of a wavelength of 550 nm in a range from −300 nm to −900 nm, preferably in a range from −400 nm to −800 nm. Advantageously high luminance reduction and reflection may be achieved for polar regions that are complementary to the luminance reduction of one of the at least one first polar control retarder and the at least one second polar control retarder. The security level may be increased and the size of the polar region for desirable visual security may be increased.

The spatial light modulator may comprise an emissive spatial light modulator arranged to output light, the display polariser may be an output display polariser arranged on the output side of the emissive spatial light modulator, the second additional polariser may be arranged on the output side of the spatial light modulator outside the first additional polariser, and the at least one second polar control retarder is arranged between the first additional polariser and the second additional polariser. Advantageously an emissive display may be provided with desirable security level over a desirable polar range.

The emissive spatial light modulator may have an output luminance profile having a full width half maximum that is at least 40 degrees, preferably at least 50 degrees. Advantageously the public mode of operation may be provided with high image visibility over a wide polar range.

The display device may further comprise a backlight arranged to output light, and the spatial light modulator may comprise a transmissive spatial light modulator arranged to receive output light from the backlight. The backlight may have an output luminance profile having a full width half maximum that is at least 40 degrees, preferably at least 50 degrees.

The switchable liquid crystal retarder of said one of the at least one first polar control retarder and the at least one second polar control retarder may have a retardance for light of a wavelength of 550 nm having a first retardance value and the switchable liquid crystal retarder of said other the at least one first polar control retarder and the at least one second polar control retarder may have a retardance for light of a wavelength of 550 nm has a second retardance value, half of the first retardance value being less than the second retardance value. In respect of the other of the at least one first polar control retarder and the at least one second polar control retarder, both of the surface alignment layers may be arranged to provide homogenous alignment in the adjacent liquid crystal material which has a retardance for light of a wavelength of 550 nm in a range from 700 nm to 2500 nm, preferably in a range from 850 nm to 1800 nm, and said other of the at least one first polar control retarder and the at least one second polar control retarder may further comprise a pair of passive uniaxial retarders having optical axes in the plane of the retarders that are crossed and each having a retardance for light of a wavelength of 550 nm in a range from 600 nm to 1600 nm, preferably in a range from 750 nm to 1300 nm. In respect of the other of the at least one first polar control retarder and the at least one second polar control retarder, both of the surface alignment layers may be arranged to provide homeotropic alignment in the adjacent liquid crystal material which has a retardance for light of a wavelength of 550 nm in a range from 700 nm to 2500 nm, preferably in a range from 1000 nm to 1800 nm, and said other of the at least one first polar control retarder and the at least one second polar control retarder may further comprise a passive uniaxial retarder having its optical axis perpendicular to the plane of the retarder and having a retardance for light of a wavelength of 550 nm in a range from −700 nm to −2500 nm, preferably in a range from −900 nm to −1800 nm. Advantageously a switchable privacy display may be provided to achieve a narrow privacy switch-on angle.

The spatial light modulator may comprise an emissive spatial light modulator arranged to output light, the display polariser may be an output display polariser arranged on the output side of the emissive spatial light modulator, the second additional polariser may be arranged on the output side of the spatial light modulator outside the first additional polariser, and the at least one second polar control retarder may be arranged between the first additional polariser and the second additional polariser. The emissive spatial light modulator may comprise an array of pixels arranged in a pixel layer, and the display device may further comprise a parallax barrier forming an array of apertures, wherein the parallax barrier is separated from the pixel layer by a parallax distance along an axis along a normal to the plane of the pixel layer, each pixel being aligned with an aperture. The emissive spatial light modulator and the parallax barrier may have an output luminance profile having a full width half maximum that is at most 40 degrees. Advantageously a switchable privacy display may be provided with increased security level for off-axis snooper locations. An emissive display may be provided to operate in a privacy mode for both landscape and portrait operation.

The display device may comprise a backlight arranged to output light, and the spatial light modulator may comprise a transmissive spatial light modulator arranged to receive output light from the backlight. The backlight may have an output luminance profile having a full width half maximum that is at most 40 degrees. Advantageously a privacy display may be provided for a transmissive displays. The backlight may be provided with reduced cone angle. The polar area for desirable security level may be increased.

Said display polariser may be an input display polariser arranged on the input side of the spatial light modulator; the first additional polariser may be arranged between the backlight and the input display polariser; and the second additional polariser may be arranged on the same side of the spatial light modulator as the first additional polariser between the backlight and the first additional polariser, and the at least one second polar control retarder may be arranged between the first additional polariser and the second additional polariser. Advantageously the visibility of frontal reflections from the front surface of the display device may be reduced.

Said surface alignment layers of said one of the at least one first polar control retarder and the at least one second polar control retarder may have pretilts having pretilt directions with components in the plane of the layer of liquid crystal material in a first pair of anti-parallel directions, and said surface alignment layers of said other of the at least one first polar control retarder and the at least one second polar control retarder may have pretilts having pretilt directions with components in the plane of the layer of liquid crystal material in a second pair of anti-parallel directions, the first pair of anti-parallel directions being crossed with the second pair of anti-parallel directions. The first pair of anti-parallel directions may be at 90 degrees to the second pair of anti-parallel directions, as viewed normal the planes of the layers of liquid crystal material of the at least one first polar control retarder and the at least one second polar control retarder. Advantageously polar regions with desirable security level may be achieved in both lateral and elevation directions. A switchable privacy display may be provided in landscape and portrait directions. In an automotive use, reflections from windscreens may be reduced.

The switchable liquid crystal retarder of said one of the at least one first polar control retarder and the at least one second polar control retarder may have a retardance for light of a wavelength of 550 nm having a first retardance value and the switchable liquid crystal retarder of said other the at least one first polar control retarder and the at least one second polar control retarder may have a retardance for light of a wavelength of 550 nm has a second retardance value, the first retardance value being greater than the second retardance value. The magnitude of the difference between half the first retardance value and the second retardance value is at most 400 nm. Advantageously the size of the polar region for desirable security level is increased.

In respect of the other of the at least one first polar control retarder and the at least one second polar control retarder, both of the surface alignment layers may be arranged to provide homogenous alignment in the adjacent liquid crystal material which has a retardance for light of a wavelength of 550 nm in a range from 450 nm to 900 nm, preferably in a range from 550 nm to 800 nm, and said other of the at least one first polar control retarder and the at least one second polar control retarder further comprises a pair of passive uniaxial retarders having optical axes in the plane of the retarders that are crossed and each having a retardance for light of a wavelength of 550 nm in a range from 250 nm to 800 nm, preferably in a range from 400 nm to 625 nm. In respect of the other of the at least one first polar control retarder and the at least one second polar control retarder, both of the surface alignment layers may be arranged to provide homogenous alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder may further comprise a passive uniaxial retarder having its optical axis perpendicular to the plane of the retarder and having a retardance for light of a wavelength of 550 nm in a range from −300 nm to −700 nm, preferably in a range from −350 nm to −600 nm. In respect of the other of the at least one first polar control retarder and the at least one second polar control retarder, both of the surface alignment layers may be arranged to provide homeotropic alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder may further comprise a passive uniaxial retarder having its optical axis perpendicular to the plane of the retarder and having a retardance for light of a wavelength of 550 nm in a range from −300 nm to −800 nm, preferably in a range from −400 nm to −800 nm.

The spatial light modulator may comprises an emissive spatial light modulator arranged to output light, the display polariser is an output display polariser arranged on the output side of the emissive spatial light modulator, the second additional polariser is arranged on the output side of the spatial light modulator outside the first additional polariser, and the at least one second polar control retarder is arranged between the first additional polariser and the second additional polariser. Said other of the at least one first polar control retarder and the at least one second polar control retarder further may comprise at least one passive compensation retarder.

The at least one passive compensation retarder of said other of the at least one first polar control retarder and the at least one second polar control retarder may comprise a passive uniaxial retarder having its optical axis perpendicular to the plane of the retarder. Advantageously thickness and cost may be reduced. Advantageously the polar region over which desirable security level is achieved is increased in the case that the polar control retarder further comprises two homeotropic alignment layers.

The at least one passive compensation retarder of said other of the at least one first polar control retarder and the at least one second polar control retarder may comprise a pair of passive uniaxial retarders having optical axes in the plane of the retarders that are crossed. Advantageously the polar region over which desirable security level is achieved is increased in the case that the polar control retarder further comprises two homogeneous alignment layers.

In respect of said other of the at least one first polar control retarder and the at least one second polar control retarder, both of the surface alignment layers may be arranged to provide homeotropic alignment in the adjacent liquid crystal material. Advantageously power consumption in public mode of operation is reduced.

The display device may further comprise a backlight arranged to output light, the spatial light modulator comprises a transmissive spatial light modulator arranged to receive output light from the backlight, and said other of the at least one first polar control retarder and the at least one second polar control retarder may be between the backlight and the transmissive spatial light modulator. The thickness of components arranged on the front of the display is reduced. Increased front surface diffusion may be provided with low pixel blurring, increasing image fidelity and reducing the visibility of specular reflections.

In respect of said other of the at least one first polar control retarder and the at least one second polar control retarder, both of the surface alignment layers may be arranged to provide homogeneous alignment in the adjacent liquid crystal material. Advantageously the visibility of artefacts under applied pressure may be reduced. The polar area for desirable security level may be increased.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 16A, FIG. 16B, FIG. 16C, FIG. 16D, FIG. 16E, and FIG. 16F are schematic diagrams illustrating in side view alternatives for optical component stackings for a switchable privacy display wherein one of the first and second polar control retarders is arranged to receive light from the spatial light modulator and the transmissive spatial light modulator is arranged to receive light from the other of the first and second polar control retarders and a backlight;

DETAILED DESCRIPTION

Figure 1A:
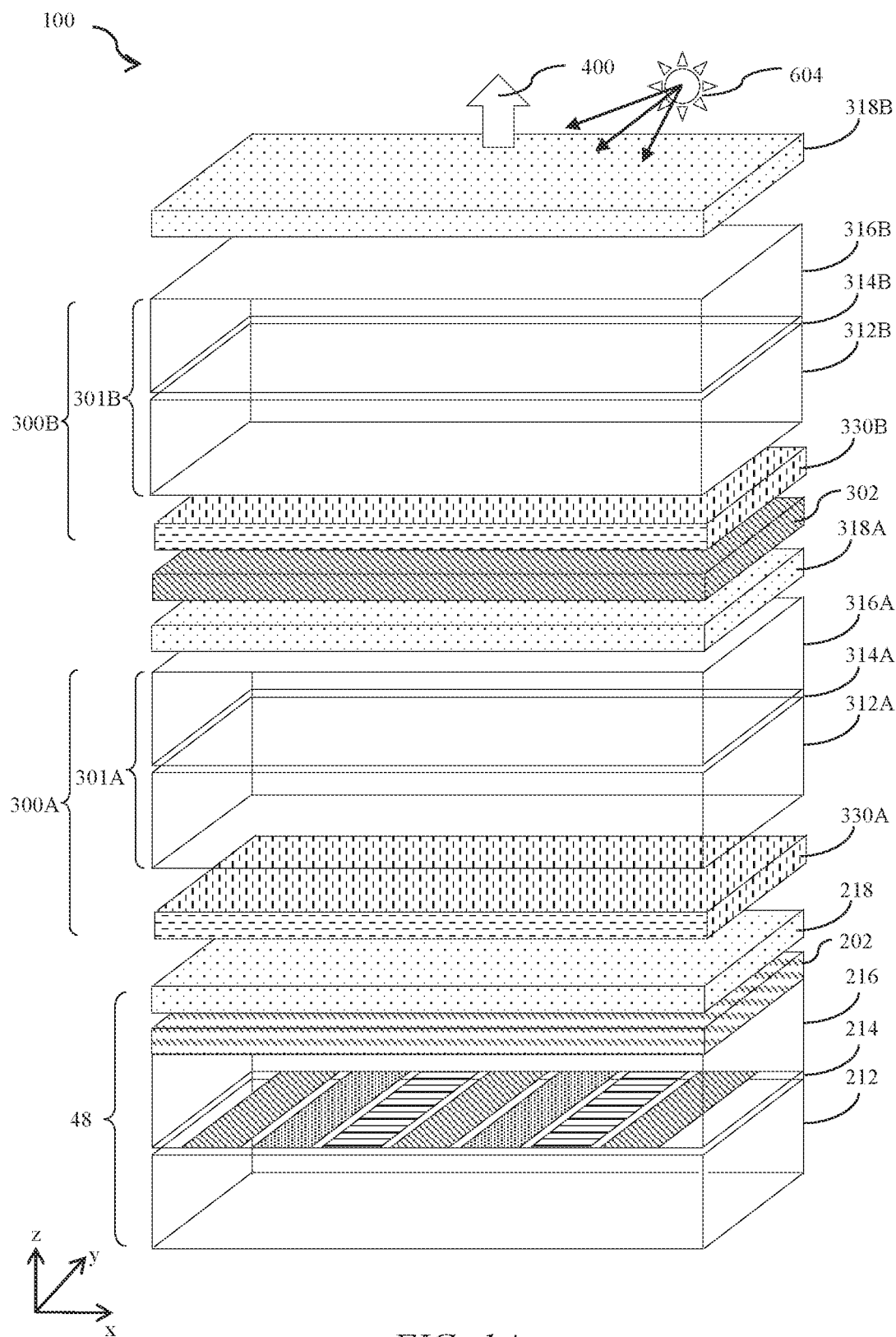
FIG. 1A is a schematic diagram illustrating in side perspective view a switchable privacy display for use in ambient illumination comprising an emissive spatial light modulator, a first polar control retarder arranged between the display polariser of the emissive spatial light modulator and a first additional polariser; and a reflective polariser and second polar control retarder arranged between the first additional polariser and a second additional polariser.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, Γ, that it imparts on the two polarization components; which is related to the birefringence Δn and the thickness d of the retarder by $$\Gamma = 2 \cdot \pi \cdot \Delta n \cdot d / \lambda_0 \qquad \text{eqn. 1}$$

In eqn. 1, Δn is defined as the difference between the extraordinary and the ordinary index of refraction, i.e.

$$\Delta n = n_e - n_o \qquad \text{eqn. 2}$$

For a half-wave retarder, the relationship between d, Δn, and $\lambda_0$ is chosen so that the phase shift between polarization components is Γ=π. For a quarter-wave retarder, the relationship between d, Δn, and $\lambda_0$ is chosen so that the phase shift between polarization components is Γ=π/2.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive Δn. A 'negative C-plate' refers to a negatively birefringent C-plate, i.e. a C-plate with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance $\lambda n$, d that varies with wavelength λ as $$\Delta n \cdot d / \lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by λn, d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V = (Y+R)/(Y-K) \quad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C = Y/K \quad \text{eqn. 5}$$

so the visual security level may be further given as:

$$V = (P \cdot Y_{max} + I \cdot \rho/\pi)/(P \cdot (Y_{max} - Y_{max}/C)) \quad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur may at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser illuminance I is invariant with polar and azimuthal angles. For arrangements with a display with non-Lambertian front diffusion arranged in an environment with directional (non- Lambertian) ambient light, illuminance I varies with polar and azimuthal angle of observation.

Thus in a perfectly dark environment, a high contrast display has VSL of approximately 1.0. As ambient illuminance increases, the perceived image contrast degrades. VSL increases and a private image is perceived.

For typical liquid crystal displays the panel contrast C is above 100:1 for almost all viewing angles. allowing the visual security level to be approximated to:

$$V=1+I \cdot \rho/(\pi \cdot P \cdot Y_{max})$$  eqn. 7

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that $$S=\log_{10}(V)$$  eqn. 8

Desirable limits for S were determined in the following manner. In a first step a privacy display device was provided. Measurements of the variation of privacy level. $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by and measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In practical display devices, this means that it is desirable to provide a value of S for an off-axis viewer who is a snooper that meets the relationship S≥$S_{min}$, where: $S_{min}$ has a value of 1.0 or more to achieve the effect that the off-axis viewer cannot perceive the displayed image; $S_{min}$ has a value of 1.5 or more to achieve the effect that the displayed image is invisible, i.e. the viewer cannot perceive even that an image is being displayed, for most images and most observers; or $S_{min}$ has a value of 1.8 or more to achieve the effect that the displayed image is invisible independent of image content for all observers.

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min})$$  eqn. 9 and so:

$$M=((Y+R)-(K+R))/((Y+R)+(K+R))=(Y-K)/(Y+K+2 \cdot R)$$  eqn. 10

Thus the visual security level (VSL), V is equivalent (but not identical to) 1/M. In the present discussion, for a given off-axis relative luminance, P the wide angle image visibility, W is approximated as $$W=1/V=1/(1+I \cdot \rho/(\pi \cdot P \cdot Y_{max}))$$  eqn. 11

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.1 may provide acceptable visibility of the displayed image. In practical display devices, this means that it is desirable to provide a value of S for an on-axis viewer who is the intended user of the display device that meets the relationship S≤$S_{max}$, where $S_{max}$ has a value of 0.1.

In the present discussion the colour variation $\Delta \epsilon$ of an output colour ($u_w'+\Delta u'$, $v_w'+\Delta v'$) from a desirable white point ($u_w'$, $v_w'$) may be determined by the CIELUV colour difference metric, assuming a typical display spectral illuminant and is given by:

$$\Delta \epsilon = (\Delta u'^2 + \Delta v'^2)^{1/2}$$  eqn. 12

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

Figure 1B:
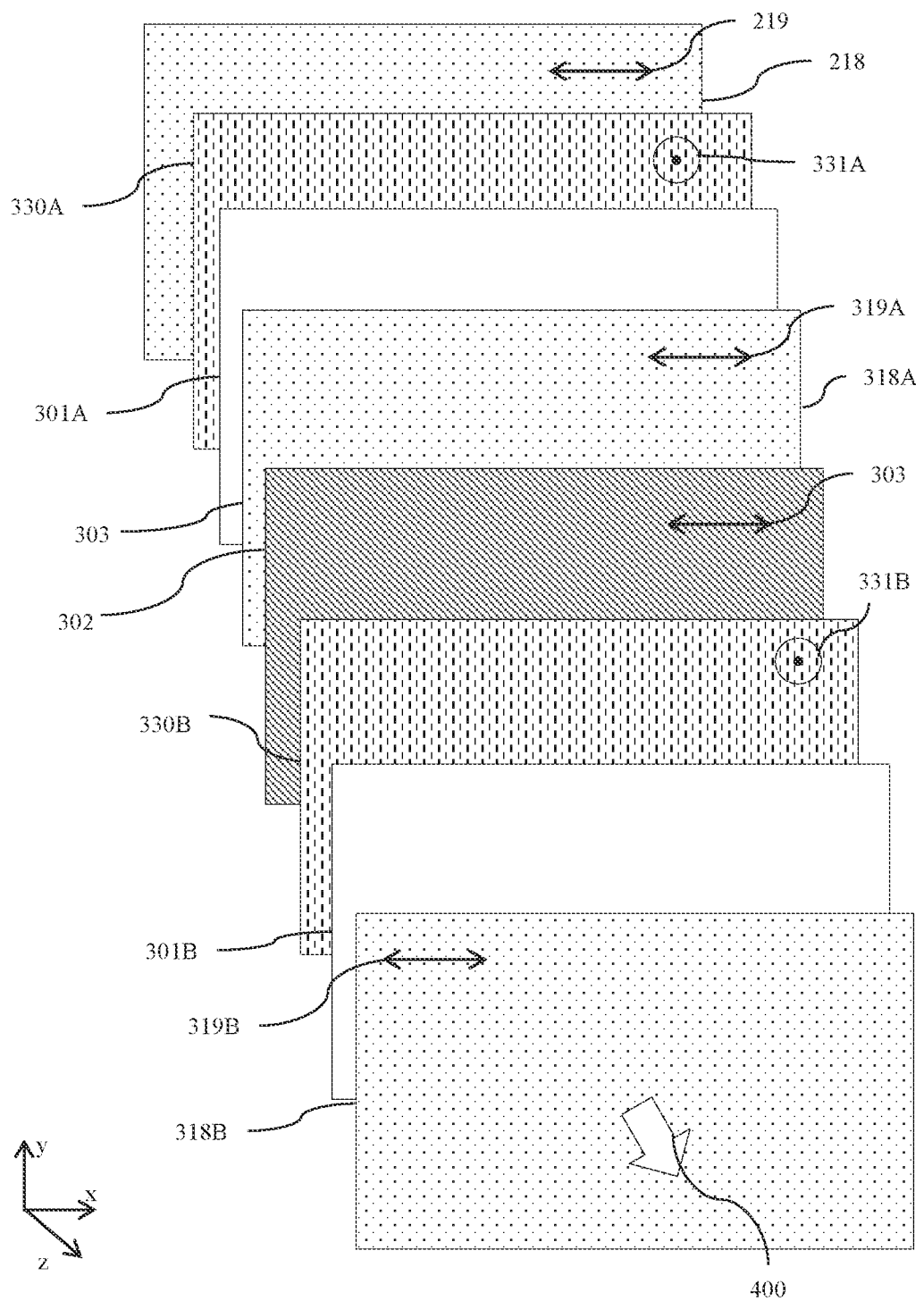
FIG. 1B is a schematic diagram illustrating in front perspective view an arrangement polarisers and polar control retarders for the embodiment of FIG. 1A.

FIG. 1A is a schematic diagram illustrating in side perspective view a switchable privacy display device 100 for use in ambient illumination 604 comprising an emissive spatial light modulator 48, a first polar control retarder 300A arranged between the display polariser 218 of the emissive spatial light modulator 48 and a first additional polariser 318A; and a reflective polariser 302 and second polar control retarder 300B arranged between the first additional polariser 318A and a second additional polariser 318B; and FIG. 1B is a schematic diagram illustrating in front perspective view an arrangement polarisers and polar control retarders for the embodiment of FIG. 1A.

The display device 100 comprises a spatial light modulator 48; wherein the spatial light modulator 48 comprises an emissive spatial light modulator 48 arranged to output light, the display polariser 218 is an output display polariser arranged on the output side of the emissive spatial light modulator 48, the display polariser 218 being a linear polariser.

A quarter waveplate 202 is arranged between the display polariser 218 and the pixel plane 214 to reduce frontal reflections from the pixel plane 214. Substrates 212, 216 are arranged to provide support of the pixel plane 214.

A first additional polariser 318A is arranged on the same side of the spatial light modulator 48 as the display polariser 218, the first additional polariser 318 being a linear polariser. The first additional polariser 318A is an absorbing polariser such as an iodine polariser on stretched PVA.

At least one first polar control retarder 300A is arranged between the first additional polariser 318A and the display polariser 218.

The display device 100 further comprises a second additional polariser 318B, the second additional polariser being a linear polariser; and at least one second polar control retarder 300B. The second additional polariser 318B is arranged on the output side of the spatial light modulator 48 outside the first additional polariser 318A, and the at least one second polar control retarder 318B is arranged between the first additional polariser 318A and the second additional polariser 31B.

Said display polariser 218 is an output display polariser arranged on the output side of the spatial light modulator 48, and the display device further comprises a reflective polariser 302 arranged between the first additional polariser 318A and at least one second polar control retarder 300B, the reflective polariser being a linear polariser.

Each of the at least one first polar control retarder 300A and the at least one second polar control retarder 300B comprises a respective switchable liquid crystal retarder 301A, 301B comprising a layer of liquid crystal material 314A, 314B, arranged between transparent substrates 312A, 312B and 316A, 316B respectively.

Each of the at least one first polar control retarder 300A and at least one second polar control retarder 300B further comprises at least one passive compensation retarder 330A, 330B respectively.

In an alternative embodiment (not shown), reflective polariser 302 may be omitted.

Figure 1C:
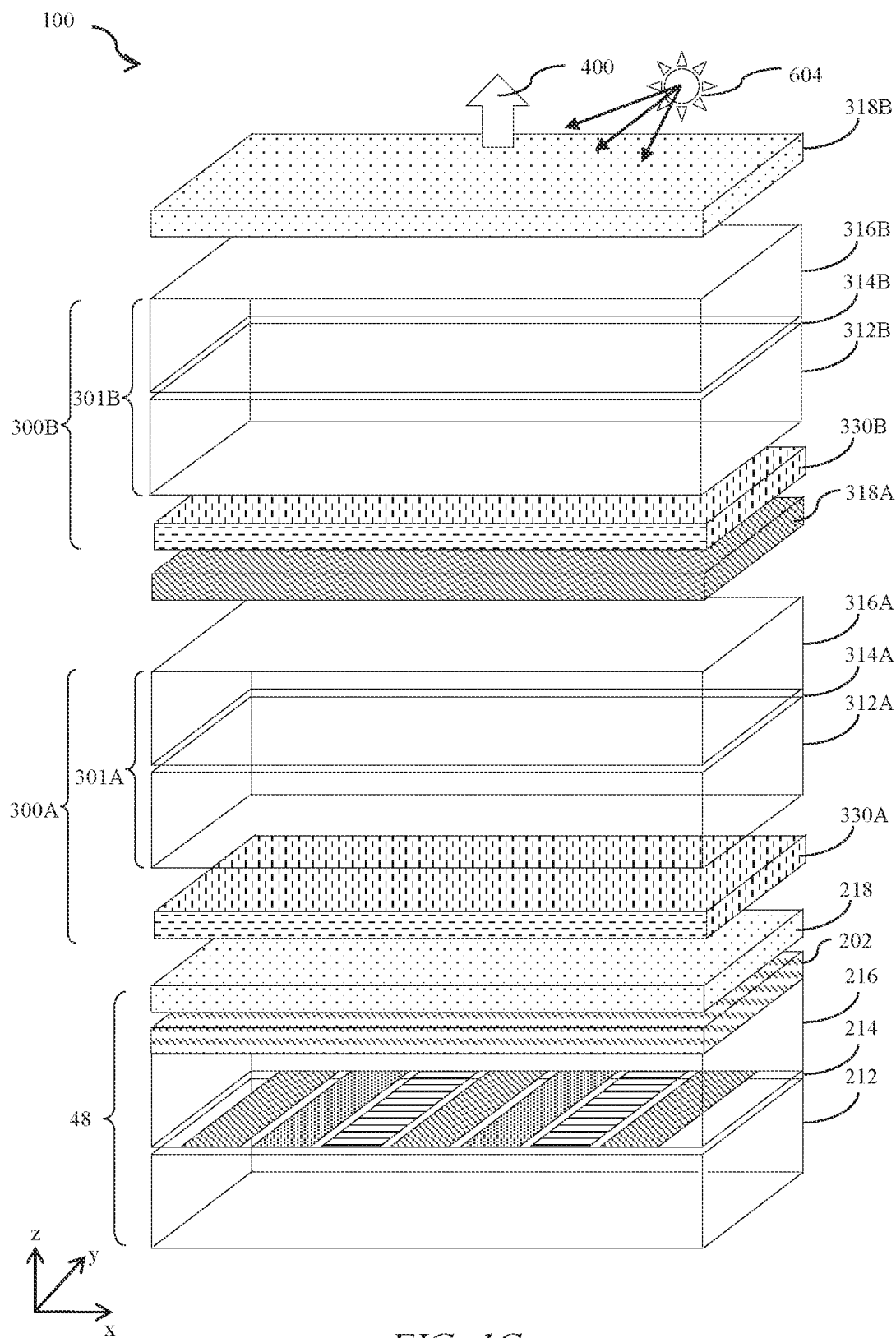
FIG. 1C is a schematic diagram illustrating in side perspective view the switchable privacy display of FIG. 1A wherein the reflective polariser is omitted and the first additional polariser is a reflective polariser.

FIG. 1C is a schematic diagram illustrating in side perspective view the switchable privacy display device 100 of FIG. 1A wherein the reflective polariser 302 is omitted and the first additional polariser 318A is a reflective polariser. Advantageously thickness and cost may be reduced. Features of the embodiment of FIG. 1A not discussed in further detail may be assumed to correspond to the features with equivalent reference numerals as discussed above, including any potential variations in the features.

The spatial light modulator 48 may take any suitable form. Some possible alternatives are as follows.

Figure 2:
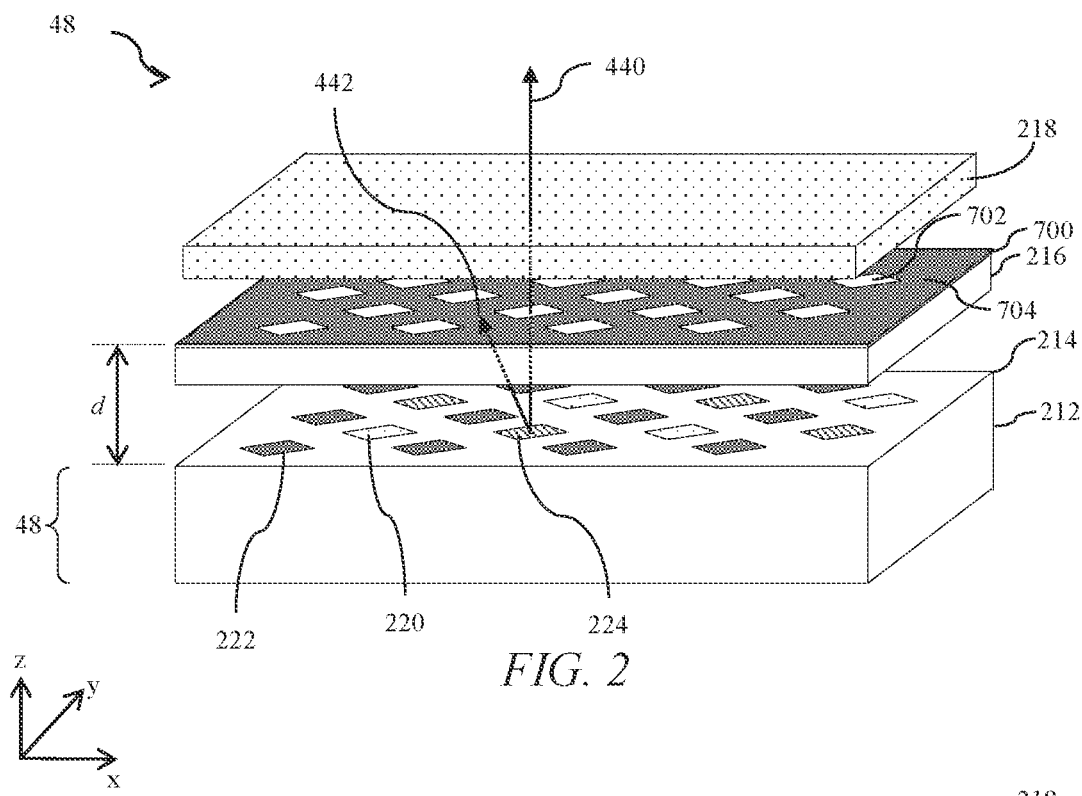
FIG. 2 is a schematic diagram illustrating in side perspective view of an alternative structure of spatial light modulator for use in the arrangement of FIG. 1A further comprising a parallax barrier.

FIG. 2 is a schematic diagram illustrating in side perspective view of an alternative for the structure of emissive spatial light modulator 48 for use in the arrangement of FIG. 1A. The spatial light modulator 48 further comprising a parallax barrier 70) comprising light absorbing region 704 and apertures 702 that are aligned with the pixels 220, 222, 224 of the pixel plane 214. The parallax barrier 700 is separated by distance d from the pixel plane 214 and is aligned to the pixels so that the pixels have high luminance on axis and reduced luminance off-axis.

In operation the parallax barrier 700 is arranged to provide transmission of light ray 440 from pixel 224 in the normal direction to the spatial light modulator 48, and the aligned aperture 702 is arranged with an aperture size to provide high transmission. By comparison light rays 442 that are inclined at a non-zero polar angle, may be absorbed in the absorbing region 704. The separation d is provided to achieve a minimum transmission at a desirable polar angle in at least one azimuthal direction. Advantageously off-axis luminance is reduced, achieving increased security factor.

Further, reflectivity of the pixel plane may be reduced as incident ambient light is absorbed at the absorbing region 704. Quarter waveplate 202 of FIGS. 1A-1B may be omitted achieving reduced cost and complexity.

Features of the embodiment of FIG. 2 not discussed in further detail may be assumed to correspond to the features with equivalent reference numerals as discussed above, including any potential variations in the features.

Another alternative for the emissive spatial light modulator 48 for use in the arrangement of FIGS. 1A-B will now be described.

Figure 3:
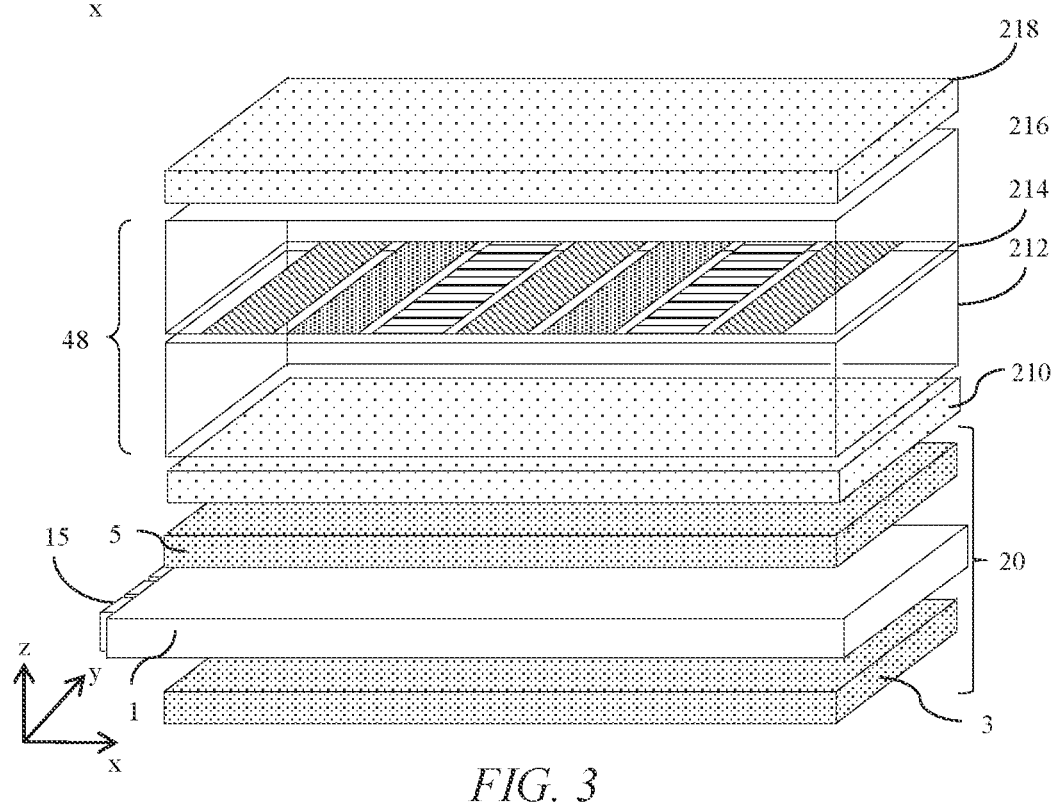
FIG. 3 is a schematic diagram illustrating in side perspective view of an alternative structure of spatial light modulator for use in the arrangement of FIG. 1A comprising a transmissive spatial light modulator and a backlight.

FIG. 3 is a schematic diagram illustrating in side perspective view of an alternative structure of spatial light modulator for use in the arrangement of FIG. 1A comprising a transmissive spatial light modulator 48 and a backlight 20 arranged to output light. The spatial light modulator 48 comprises a transmissive spatial light modulator arranged to receive output light from the backlight 20. Features of the embodiment of FIG. 1A not discussed in further detail may be assumed to correspond to the features with equivalent reference numerals as discussed above, including any potential variations in the features.

The backlight may comprise a light guide plate (LGP) 1, light extraction layers 5 and rear reflector 3. The light extraction layers may comprise diffusers, light turning films or prism films. Light may be provided from an array of light sources such as LEDs 15 arranged at the edge of the LGP 1.

The output may be provide a wide angle luminance profile such as achieved using crossed BEF™ films from 3M corporation and may have a full width half maximum of greater than 50 degrees. The output may provide a narrow angle profile, such backlights may be termed collimated backlights and have a full width half maximum luminance of less than 50 degrees, for example 30 degrees. Examples of collimated backlights are illustrated in U.S. Pat. No. 10,935, 714, which is herein incorporated by reference in its entirety. The backlight may comprise other types of structure including mini-LED arrays and known light distribution optics to achieve desirable uniformity. The backlight 20 may be further provided with a micro-louvre array arranged to reduce off-axis luminance output from the backlight 20. Advantageously security factor, S may be improved in comparison to wide angle backlights.

Alternative arrangements of polar control retarders and additional polarisers will now be described for display devices 100 comprising backlights 20.

Figure 4A:
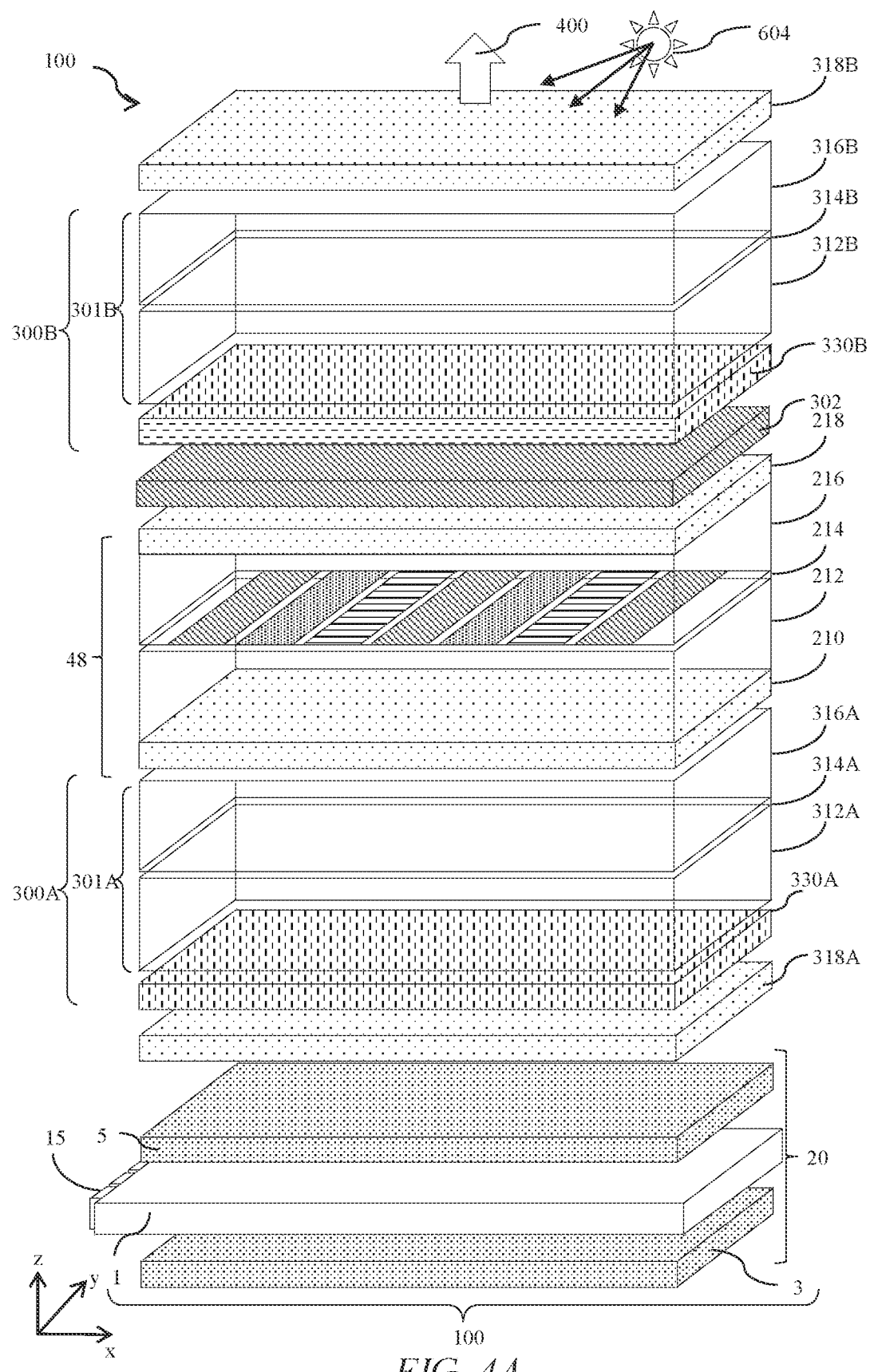
FIG. 4A is a schematic diagram illustrating in side perspective view a switchable privacy display for use in ambient illumination comprising the transmissive spatial light modulator and backlight of FIG. 3; a reflective polariser and a first polar control retarder arranged between the output display polariser of the spatial light modulator and a first additional polariser; and a second polar control retarder arranged between the input display polariser of the spatial light modulator and a second additional polariser.
Figure 4B:
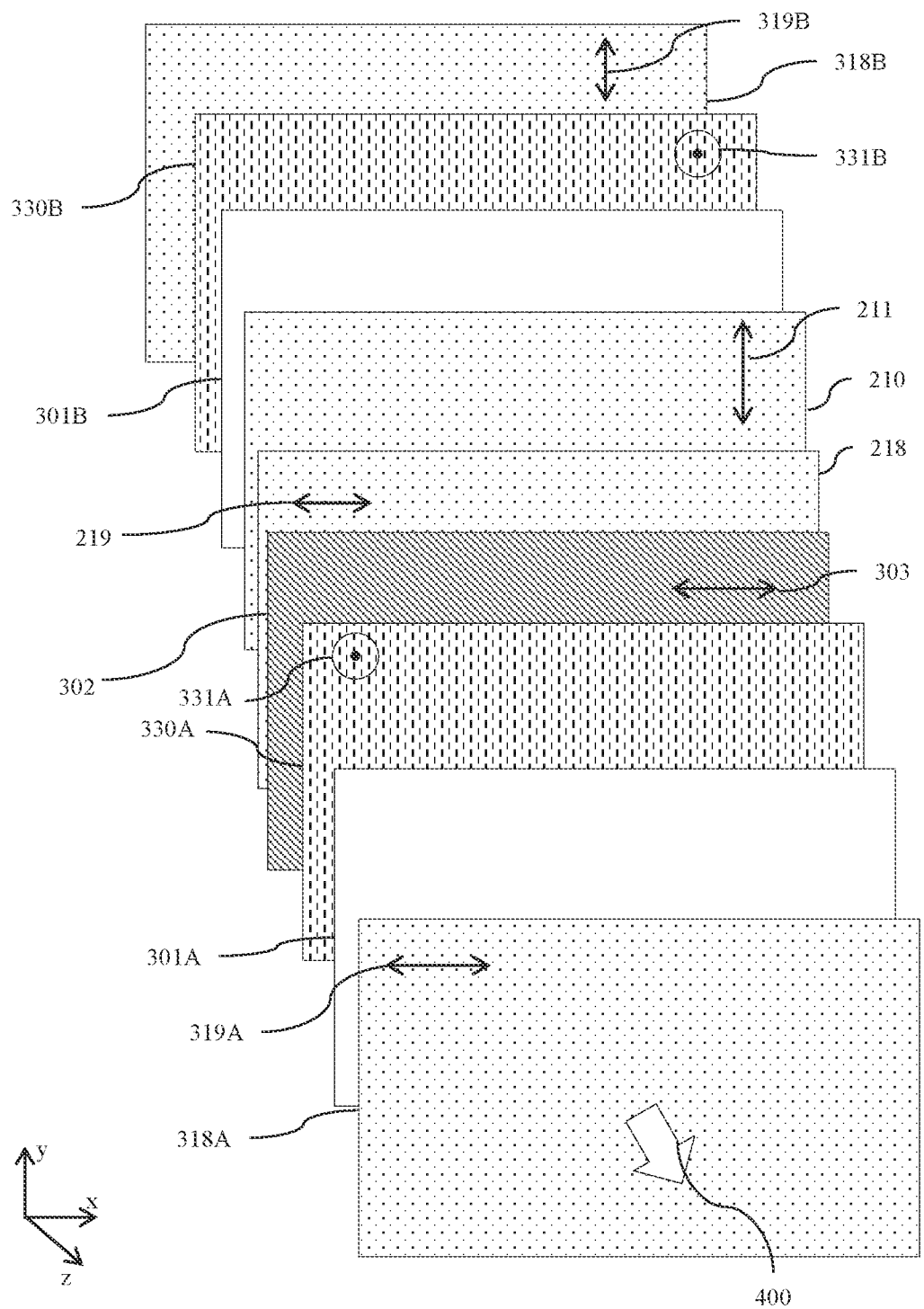
FIG. 4B is a schematic diagram illustrating in front perspective view an arrangement polarisers and polar control retarders for the embodiment of FIG. 4A.

FIG. 4A is a schematic diagram illustrating in side perspective view a switchable privacy display device 100 for use in ambient illumination 604 comprising the transmissive spatial light modulator 48 and backlight 20 of FIG. 3; and FIG. 4B is a schematic diagram illustrating in front perspective view an arrangement polarisers and polar control retarders for the embodiment of FIG. 4A.

The display device 100 further comprises an input display polariser 210 arranged on the input side of the spatial light modulator 48, and the display device 100 further comprises an output display polariser 218 arranged on the output side of the spatial light modulator 48, the first additional polariser 318A is arranged on the input side of the spatial light modulator 48 and the first polar control retarder 300A is arranged between the first additional polariser 318A and the input display polariser 210. The second additional polariser 318B is arranged on the output side of the spatial light modulator 48, and the at least one second polar control retarder 300B is arranged between the second additional polariser 318B and the output display polariser 218.

Second polar control retarder 300B is arranged between the input display polariser 210 of the spatial light modulator 48 and a second additional polariser 318B. Reflective polariser 302 is arranged between the output display polariser 218 and the second polar control retarder 318B. In an alternative embodiment (not shown), reflective polariser 302 may be omitted.

Advantageously the separation of the output of the second additional polariser 318B to the pixel plane 214 is reduced in comparison to the arrangements of FIGS. 1A-B. Contrast of the image seen may be increased due to the reduced number of layers. An air gap may be provided between the input polariser 210 and second polar retarder 300B, advantageously reducing assembly cost and complexity.

In the present embodiments, said one of the at least one first polar control retarder 300A and the at least one second polar control retarder 300B is the at least one second polar control retarder and said other of the at least one first polar control retarder and the at least one second polar control retarder is the at least one first polar control retarder.

Features of the embodiment of FIG. 4A not discussed in further detail may be assumed to correspond to the features with equivalent reference numerals as discussed above, including any potential variations in the features.

The embodiments of FIGS. 1A-B and FIG. 4A may alternatively be provided with no reflective polariser 302. Advantageously frontal reflections are reduced in privacy mode in environments where increased reflection is considered undesirable. Another alternative arrangement with no reflective polariser will now be described.

Figure 5A:
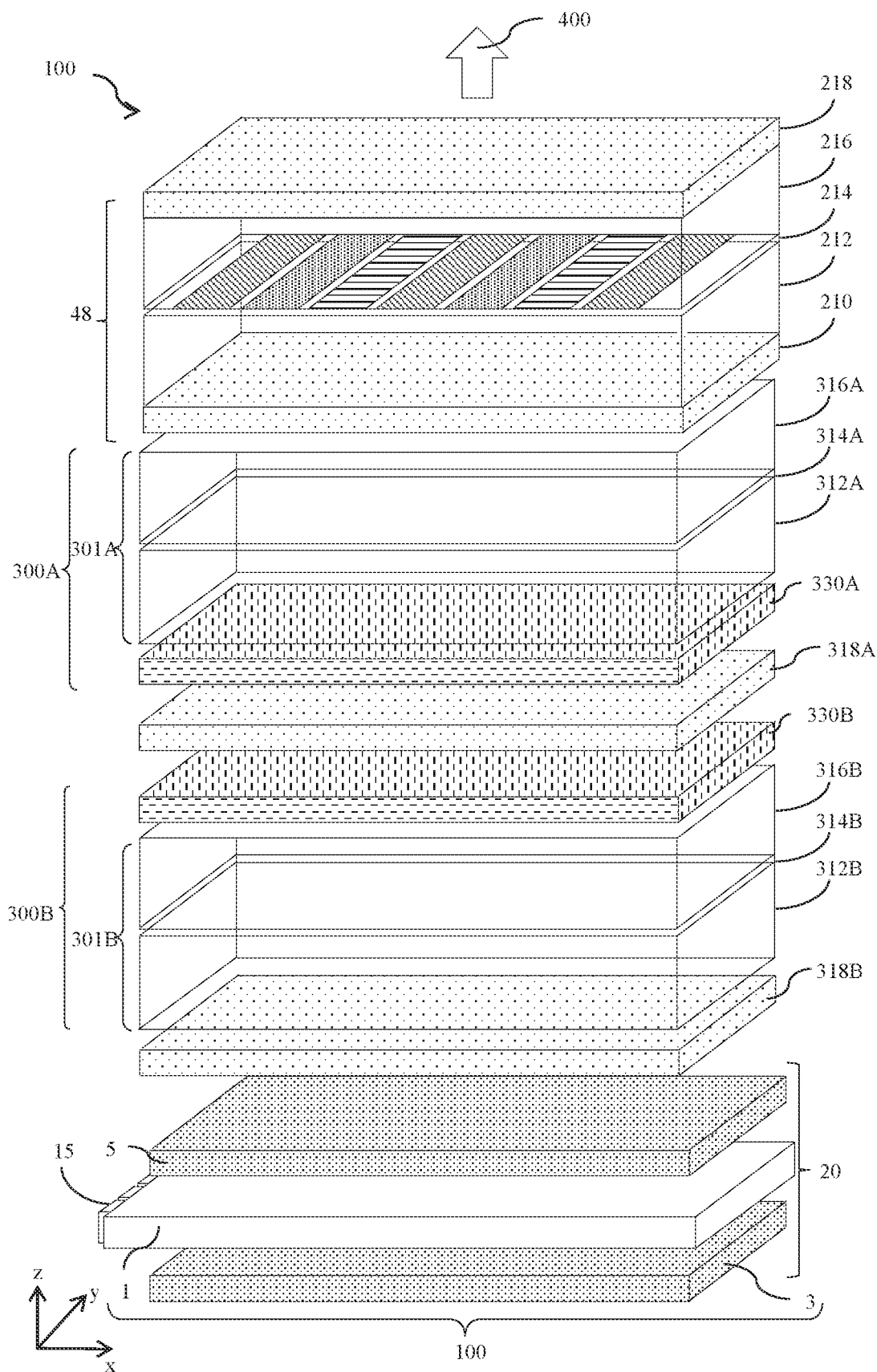
FIG. 5A is a schematic diagram illustrating in side perspective view a switchable privacy display comprising the transmissive spatial light modulator and backlight of FIG. 3; a first polar control retarder arranged between the input display polariser of the spatial light modulator and a first additional polariser; and a second polar control retarder arranged between the first additional polariser and a second additional polariser.
Figure 5B:
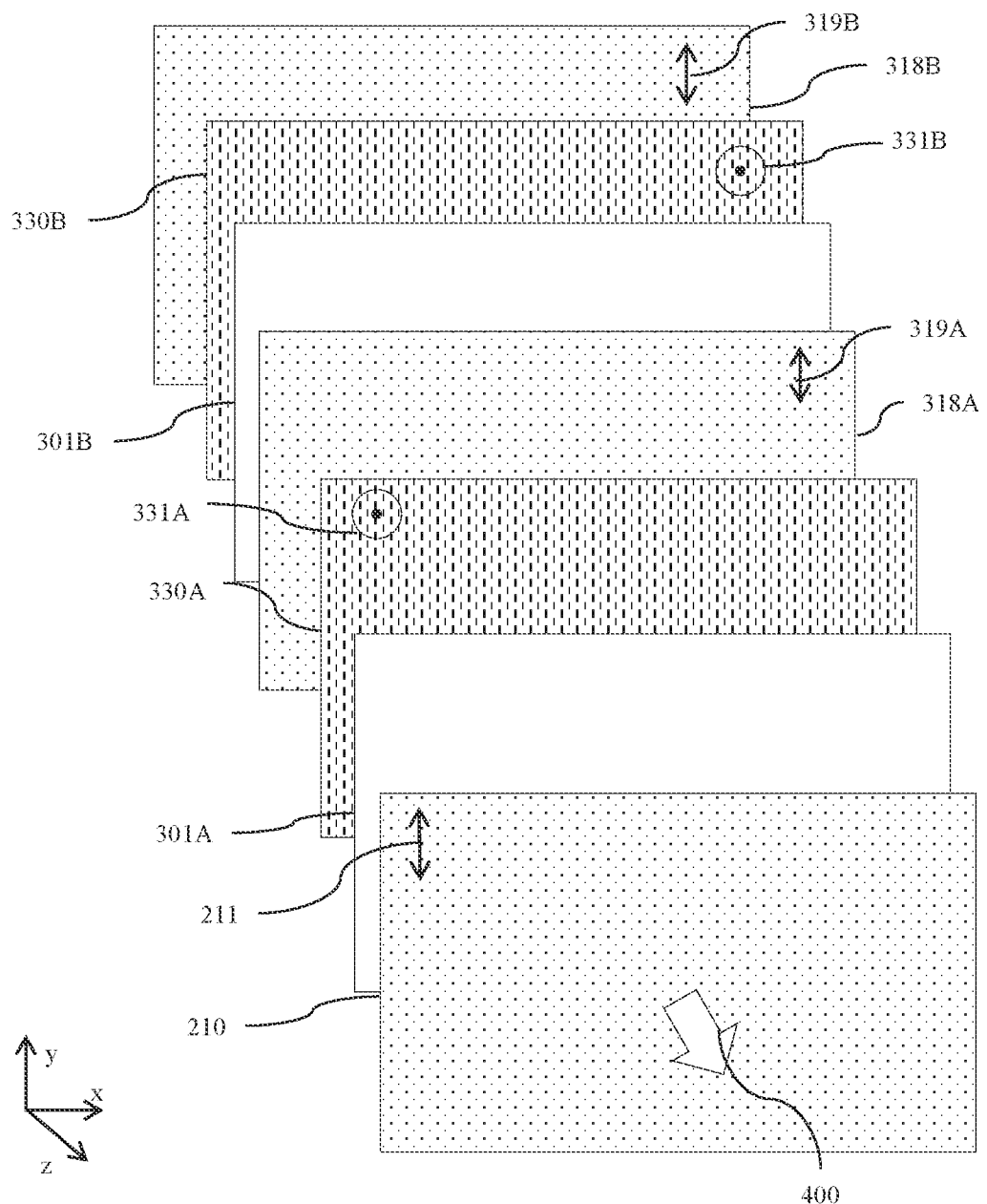
FIG. 5B is a schematic diagram illustrating in front perspective view an arrangement polarisers and polar control retarders for the embodiment of FIG. 1A.

FIG. 5A is a schematic diagram illustrating in side perspective view a switchable privacy display device 100 comprising the transmissive spatial light modulator 48 and backlight 20 of FIG. 3; and FIG. 5B is a schematic diagram illustrating in front perspective view an arrangement polarisers and polar control retarders for the embodiment of FIG. 5A.

A first polar control retarder 300A is arranged between the input display polariser 210 of the spatial light modulator 48 and a first additional polariser 318A; and a second polar control retarder 300B is arranged between the first additional polariser 318A and a second additional polariser 318B.

Reflective polariser 302 is omitted. In some environments such as certain automotive environments, reflective operation may be undesirable and front of display reflectivity may be reduced. Further cost may be reduced.

In comparison to the arrangements of FIG. 1 and FIG. 4A the output display polariser 218 is the display device 100 output polariser. Advantageously diffusers may be arranged on the polariser 218 to provide increased image haze with reduced image blurring. Air gaps may be provided between the spatial light modulator input polariser 210 and plural retarders 300A, 300B. Advantageously image contrast is not degraded and assembly cost and complexity is reduced.

Features of the embodiment of FIG. 5A not discussed in further detail may be assumed to correspond to the features with equivalent reference numerals as discussed above, including any potential variations in the features.

Arrangements of liquid crystal alignment for use in the retarders 300A, 300B of FIG. 1, FIG. 4A and FIG. 5A will now be described.

Figure 6A:
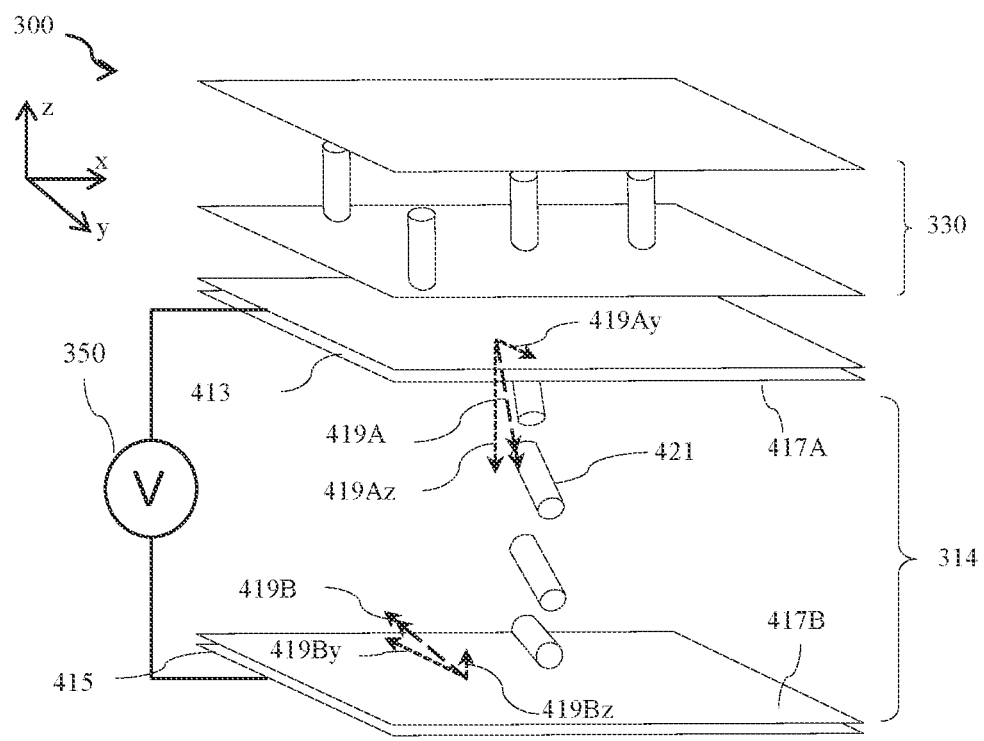
FIG. 6A is a schematic diagram illustrating in side perspective view a structure of a polar control retarder wherein the polar control retarder comprises a passive C plate and an active liquid crystal layer comprising a homeotropic alignment layer and a homogeneous alignment layer, wherein the pretilt directions of the alignment layers have a component in the plane of the alignment layers that are antiparallel, and the components are oriented in a first direction in the plane of the alignment layers.

FIG. 6A is a schematic diagram illustrating in side perspective view a structure of a polar control retarder 300 wherein the polar control retarder 300 comprises a passive C plate retarder 330 and an active liquid crystal layer 314.

Electrodes 413, 415 are arranged to apply a voltage from driver 350 across the liquid crystal material 421 in the layer 314. In a first driven state the liquid crystal molecules are arranged to provide no phase modification to input polarisation state in a normal direction to the polar control retarder and modified phase to an input polarisation state in directions at an angle to the normal direction to the polar control retarder 300. Such a driven state may be provided for privacy mode operation.

In a second driven state the liquid crystal molecules are arranged to provide no phase modification to input polarisation state in a normal direction to the polar control retarder and modified phase to an input polarisation state in directions at an angle to the normal direction to the polar control retarder 300. Such a driven state may be provided for public (or share) mode operation.

Two surface alignment layers are disposed adjacent to the layer of liquid crystal material and on opposite sides thereof. One of the surface alignment layers being arranged to provide homogenous alignment in the adjacent liquid crystal material and the other of the surface alignment layers being arranged to provide homeotropic alignment in the adjacent liquid crystal material. The alignment layers thus comprise a homeotropic alignment layer 417A and a homogeneous alignment layer 417B.

The pretilt directions 419A, 419B of the alignment layers have a component in the plane of the alignment layers 417A, 417B that are antiparallel. The pretilt directions 419A, 419B refer to the alignment of the liquid crystal molecules 421 that are adjacent to said layers. The components 419Ay and 419By are the in-plane components and are anti-parallel to each other. Component 419Az at the homeotropic alignment layer 417A is much greater than component 419Ay while component 419Bz at the homogeneous alignment layer 417B is much smaller than component 41By. The pretilt angle is the angle between the directions 419A and 419Ay, and between directions 419B and 419By respectively.

The components 419Ay, 419By are oriented in a first direction in the plane of the alignment layers, that is parallel to the y-axis.

In the present illustrative embodiments and as illustrated in FIG. 6A, the at least one passive compensation retarder 330 of said one of the at least one first polar control retarder 330A and the at least one second polar control retarder 330B is arranged on the same side of the switchable liquid crystal retarder 314 as the surface alignment layers 417A that is arranged to provide homeotropic alignment in the adjacent liquid crystal material 421. The at least one second polar control retarder 330 comprises a passive uniaxial retarder having its optical axis perpendicular to the plane of the retarder 330, that is a C-plate.

In alternative embodiments, the passive retarder 330 may comprise 'crossed' A-plates. In the present disclosure crossed A-plates refers to a pair of passive uniaxial retarders having optical axes in the plane of the retarders that are crossed, as illustrated by retarders 330A, 330B in FIG. 6C.

Figure 6B:
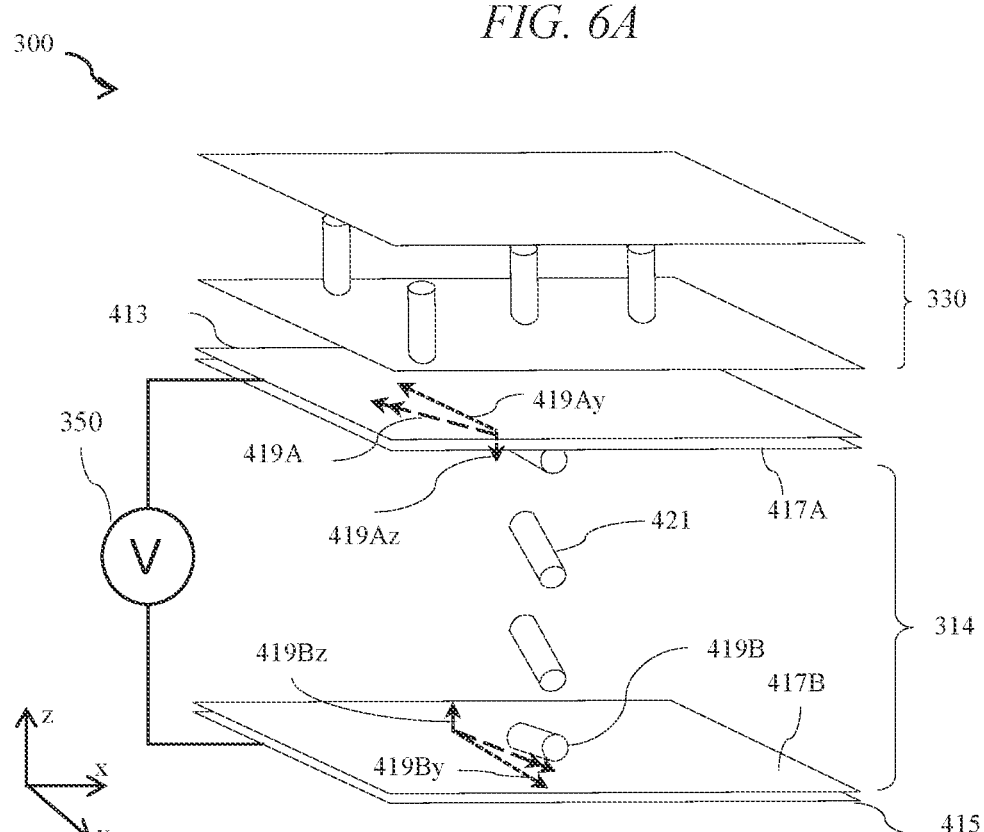
FIG. 6B is a schematic diagram illustrating in side perspective view a structure of a polar control retarder wherein the polar control retarder comprises a passive C plate and an active liquid crystal layer comprising two homogenous alignment layers, wherein pretilt directions of the alignment layers have a component in the plane of the alignment layers that are antiparallel.

FIG. 6B is a schematic diagram illustrating in side perspective view a structure of a polar control retarder wherein the polar control retarder comprises a passive C plate and an active liquid crystal layer comprising two homogeneous alignment layers, wherein pretilt directions of the alignment layers have a component in the plane of the alignment layers that are antiparallel.

Figure 6C:
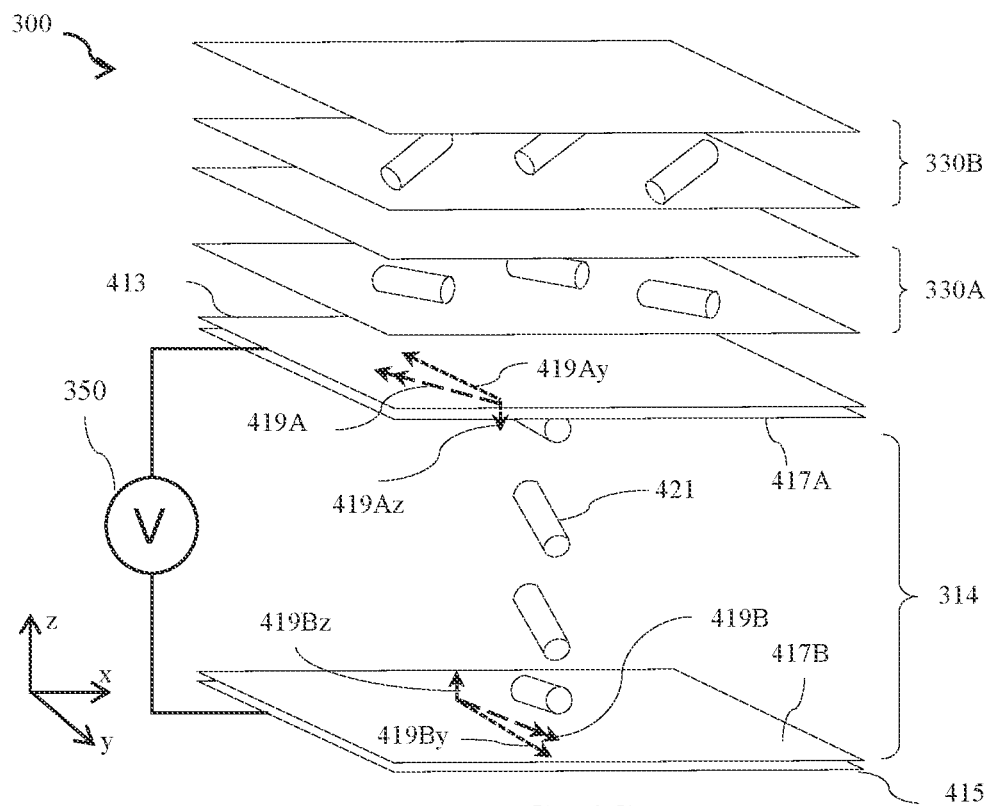
FIG. 6C is a schematic diagram illustrating in side perspective view a structure of a polar control retarder and an active liquid crystal layer comprising two homogeneous alignment layers wherein the polar control retarder comprises crossed A-plates.

FIG. 6C is a schematic diagram illustrating in side perspective view a structure of a polar control retarder and an active liquid crystal layer comprising two homogeneous alignment layers wherein the polar control retarder comprises crossed A-plates.

Figure 6D:
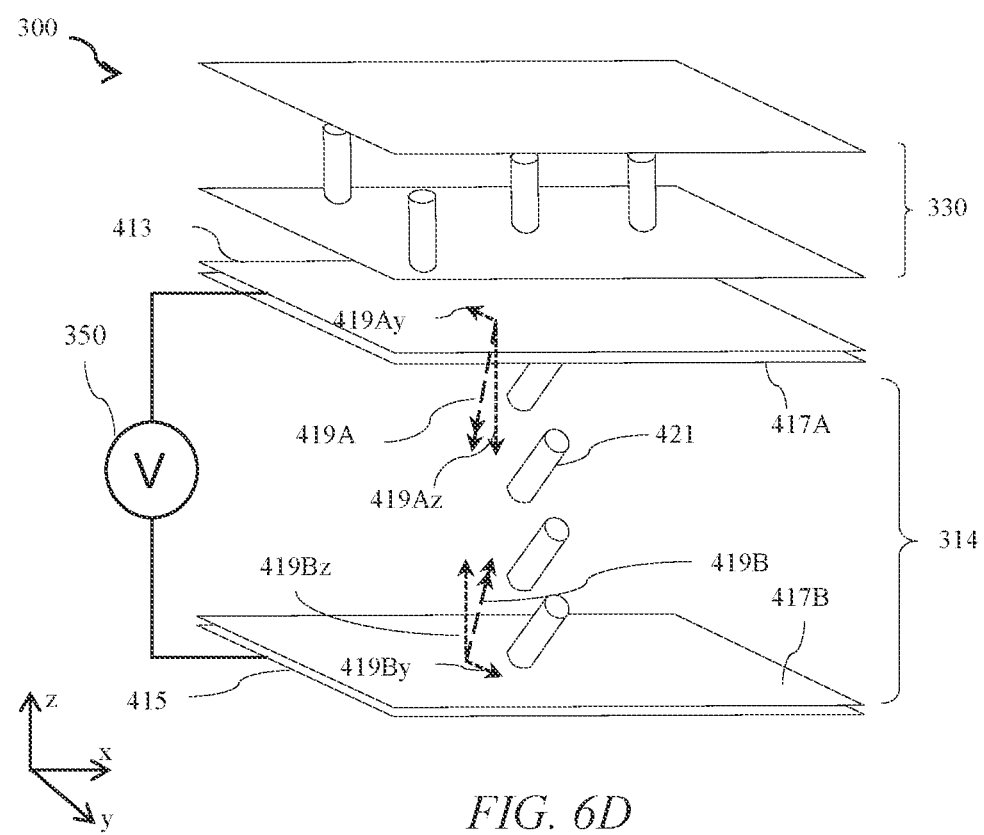
FIG. 6D is a schematic diagram illustrating in side perspective view a structure of a polar control retarder wherein the polar control retarder comprises a passive C plate and an active liquid crystal layer comprising two homeotropic alignment layers, wherein pretilt directions of the alignment layers have a component in the plane of the alignment layers that are antiparallel.

FIG. 6D is a schematic diagram illustrating in side perspective view a structure of a polar control retarder wherein the polar control retarder comprises a passive C plate and an active liquid crystal layer comprising two homeotropic alignment layers, wherein pretilt directions of the alignment layers have a component in the plane of the alignment layers that are antiparallel.

Figure 6E:
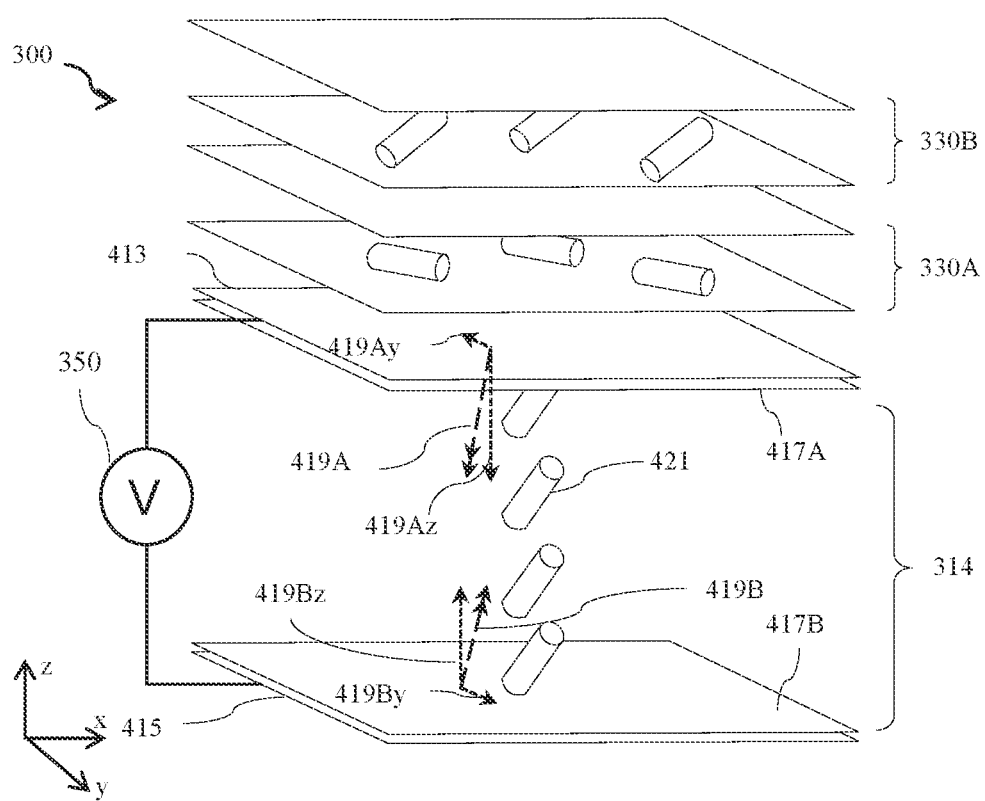
FIG. 6E is a schematic diagram illustrating in side perspective view a structure of a polar control retarder and an active liquid crystal layer comprising two homogeneous alignment layers wherein the polar control retarder comprises crossed A-plates.

FIG. 6E is a schematic diagram illustrating in side perspective view a structure of a polar control retarder and an active liquid crystal layer comprising two homogeneous alignment layers wherein the polar control retarder comprises crossed A-plates. Advantageously higher retardances of the passive retarder 330A, 330B may be provided at lower cost in comparison to a C-plate 330 embodiment of FIG. 6D.

In the present embodiments one of the polar control retarders 300A, 300B may comprise the polar control retarder 300 of FIG. 6A and the other of the polar control retarders 300A, 300B may comprise one of the polar control retarders 300 of FIGS. 6B-E. The at least one passive compensation retarder of said other of the at least one first polar control retarder and the at least one second polar control retarder comprises either: a passive uniaxial retarder having its optical axis perpendicular to the plane of the retarder; or a pair of passive uniaxial retarders having optical axes in the plane of the retarders that are crossed.

In respect of said other (with alignment layers that are of the same type) of the at least one first polar control retarder and the at least one second polar control retarder, both of the surface alignment layers may be arranged to provide homeotropic alignment in the adjacent liquid crystal material. Advantageously reduced voltage and power consumption may be provided in public mode in comparison to arrangements in which both alignment layers have homogeneous alignment.

In respect of said other (with alignment layers that are of the same type) of the at least one first polar control retarder and the at least one second polar control retarder, both of the surface alignment layers may be arranged to provide homogeneous alignment in the adjacent liquid crystal material. Advantageously the visibility of defects to applied pressure may be reduced in comparison to arrangements in which both alignment layers have homeotropic alignment.

Features of the embodiment of FIGS. 6A-C not discussed in further detail may be assumed to correspond to the features with equivalent reference numerals as discussed above, including any potential variations in the features.

Referring to the arrangements of FIGS. 1A-B, FIGS. 4A-B and FIGS. 5A-B, in respect of one of the at least one first polar control retarder 300A and the at least one second polar control retarder 300B, one of the surface alignment layers 417A or 417B is arranged to provide homogenous alignment in the adjacent liquid crystal material and the other of the surface alignment layers 417B or 417A is arranged to provide homeotropic alignment in the adjacent liquid crystal material 421, and in respect of the other of the at least one first polar control retarder 300A and the at least one second polar control retarder 300B, both of the surface alignment layers 417A, 417B are arranged to provide homogenous alignment in the adjacent liquid crystal material or both of the surface alignment layers 417A, 417B are arranged to provide homeotropic alignment in the adjacent liquid crystal material.

Operation of polar control retarders between parallel polarisers is described further in U.S. Pat. No. 10,126,575 and in U.S. Patent Publ. No. 2019-0086706, both of which are herein incorporated by reference in their entireties. The operation of the plural polar control retarders of the present embodiments in a public mode of operation will now be described.

Figure 7A:
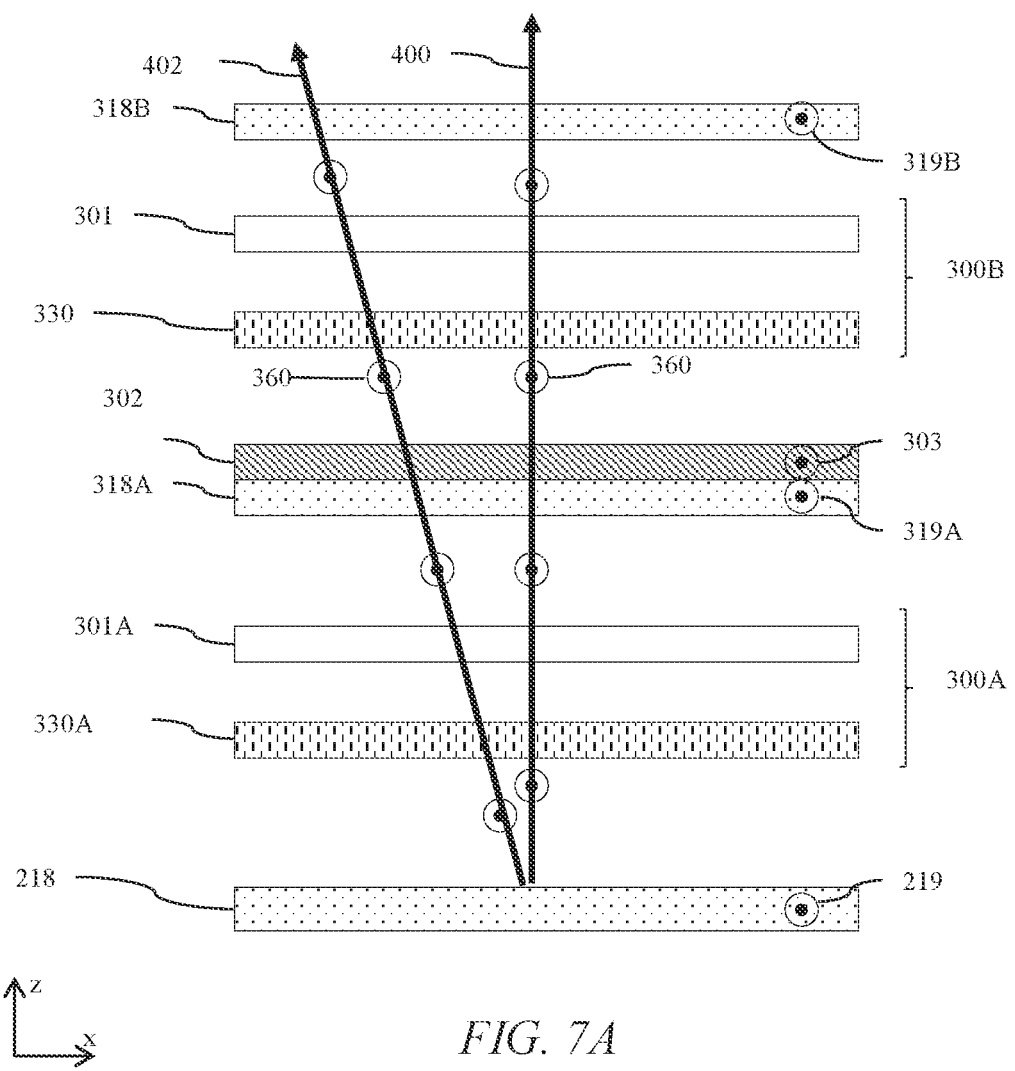
FIG. 7A is a schematic diagram illustrating in side view the operation of the arrangement of FIG. 1A for transmitted light from the spatial light modulator in the public mode of operation.

FIG. 7A is a schematic diagram illustrating in side view the operation of the arrangement of FIG. 1A for transmitted light from the spatial light modulator in the public mode of operation. In the embodiments that will be described below, light ray 400 that is normal to the display (or in a head-on direction) is transmitted by the display polariser 219 with a polarisation state 360 that is unmodified by the polar control retarders 300A, 300B and polarisers 318A, 302 and 318B. Such light is transmitted with high luminance.

In public mode, rays 402 with a non-zero polar angle to the normal direction are also transmitted with the same polarisation state 360 that is substantially not modified by the polar control retarders 300A, 300B and polarisers 318A, 302 and 318B. The polar profile of luminance from the spatial light modulator may be substantially unmodified. Advantageously the display may be visible from a wide range of polar viewing positions and viewable by multiple display users.

Figure 7B:
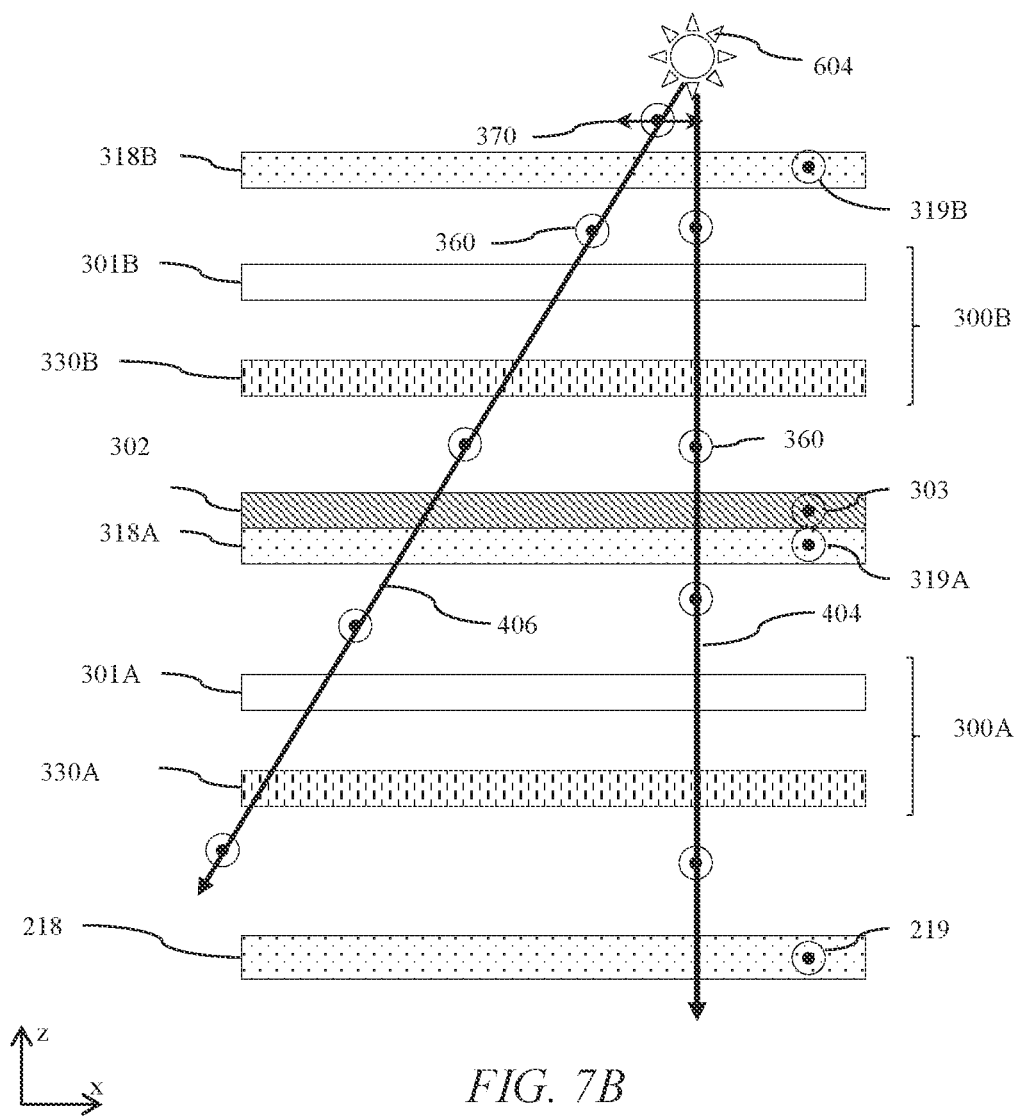
FIG. 7B is a schematic diagram illustrating in side view the operation of the arrangement of FIG. 1A for ambient light in the public mode of operation.

FIG. 7B is a schematic diagram illustrating in side view the operation of the arrangement of FIG. 1A for incident ambient light 604 in the public mode of operation. Light rays 404, 406 are incident on the display device 100 with substantially unpolarised state 370. The polariser 318B provides a polarisation state 360 that is incident on the first polar control retarder and is substantially unmodified for head-on ray 404 and off-axis ray 406. Thus the light rays are substantially not reflected by the display are absorbed in the spatial light modulator 48 and backlight 20 if present. The display reflectivity is maintained at a low level for a wide range of viewing directions and advantageously a high contrast image is seen by multiple display users.

The operation of the polar control retarders in a private mode of operation will now be described.

Figure 7C:
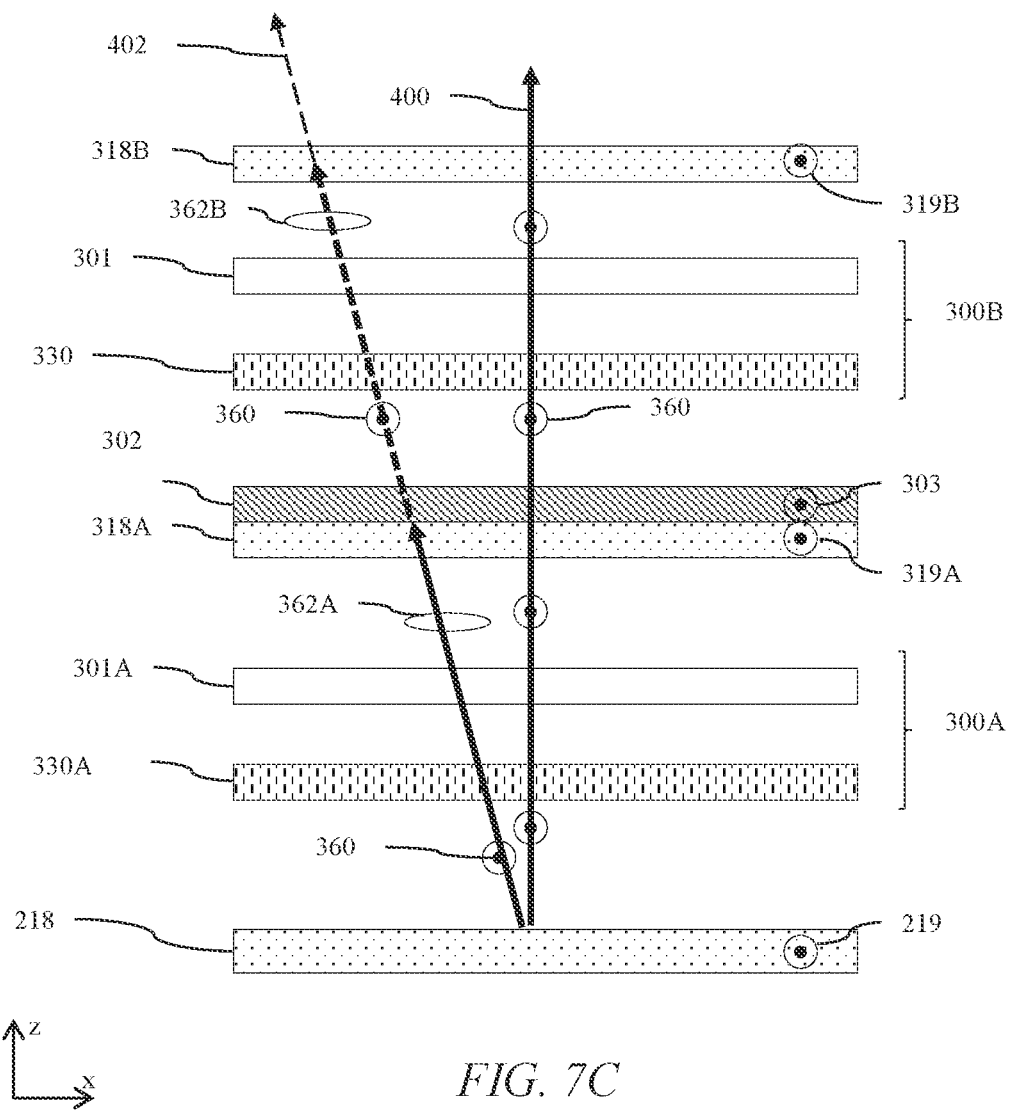
FIG. 7C is a schematic diagram illustrating in side view the operation of the arrangement of FIG. 1A for transmitted light from the spatial light modulator in a privacy mode of operation with high reflectivity of ambient light.

FIG. 7C is a schematic diagram illustrating in side view the operation of the arrangement of FIG. 1A for transmitted light from the spatial light modulator in a privacy mode of operation with high reflectivity of ambient light. Head-on light ray 400 has a polarisation state 360 that is substantially unmodified by polar control retarders 300A, 300B. By comparison, off-axis light ray 402 has an output from the first polar control retarder that has an imparted phase difference to provide in general an elliptical state 362A. On incidence with first additional polariser 318A the luminance of the ray 402 is reduced with output state 360. Said light ray 402 is transmitted through reflective polariser 302 with small loss and is incident on the second polar control retarder 300B at which further phase modulation is provided and an output polarisation state 362B is achieved. Such state 362B is at least in part absorbed by second additional polariser 318B. Ray 402 is thus transmitted at off-axis polar locations with reduced luminance compared to the ray 402 in FIG. 7A.

Figure 7D:
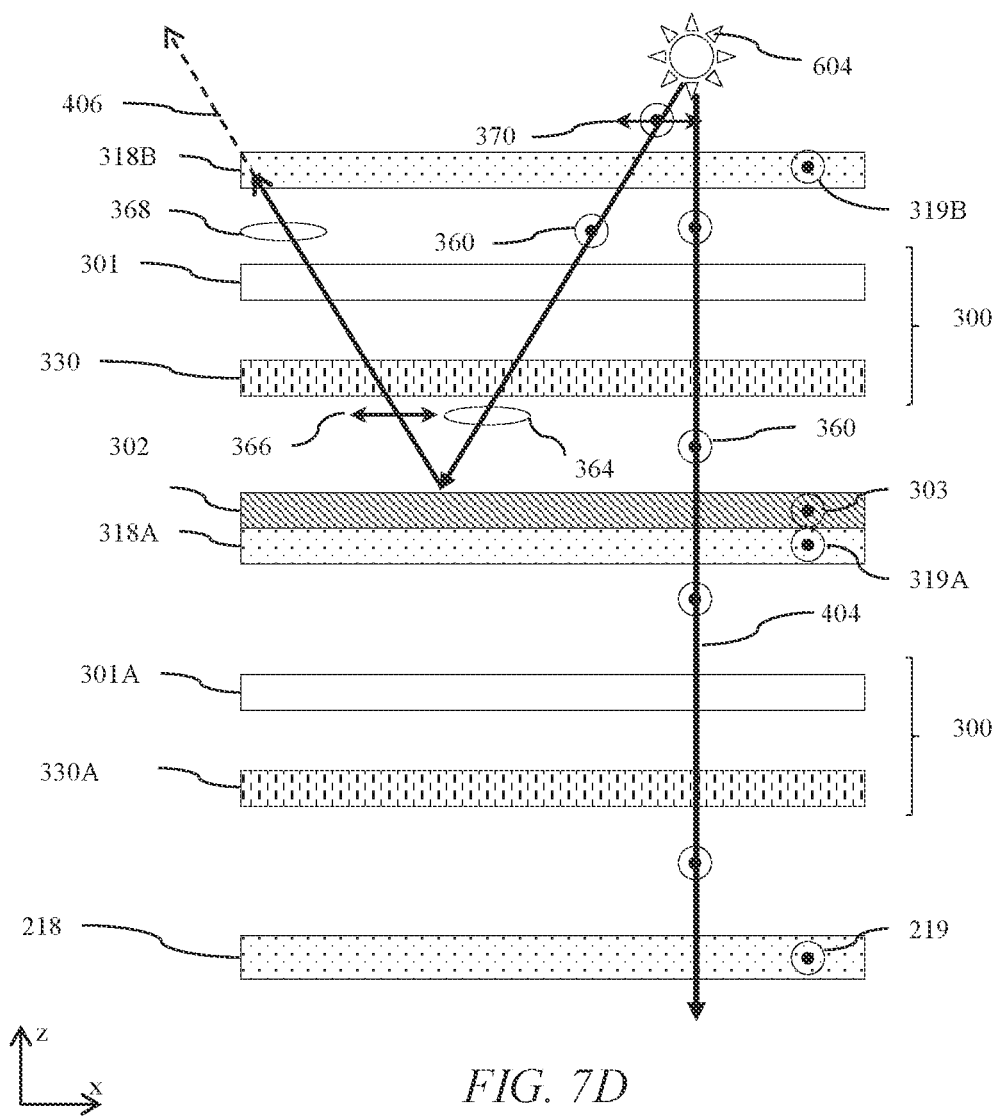
FIG. 7D is a schematic diagram illustrating in side view the operation of the arrangement of FIG. 1A for ambient light in a privacy mode of operation with high reflectivity of ambient light.

FIG. 7D is a schematic diagram illustrating in side view the operation of the arrangement of FIG. 1A for ambient light in a privacy mode of operation with high reflectivity of ambient light. Head-on incident ambient light ray 404 is transmitted with substantial reflection from the reflective polariser 302.

By comparison light ray 406 undergoes a phase modulation at the polar control retarder 300B such that state 364 illuminates the reflective polariser. The resolved polarisation state 366 that is orthogonal to the electric vector transmission direction 303 of the reflective polariser 302 is reflected and is passed through the polar retarder such that polarisation state 368 is incident on to the second additional polariser. The component of the state 368 that is parallel to the electric vector transmission direction of the polariser 318B is thus transmitted. To an off-axis observer, the display appears to have increased reflectivity. Said increased reflectivity advantageously achieves increased security factor, S as described above.

Features of the embodiments of FIGS. 7A-D not discussed in further detail may be assumed to correspond to the features with equivalent reference numerals as discussed above, including any potential variations in the features.

The operation of FIGS. 7A-D is common to the arrangements of FIGS. 1A-B and FIG. 4A.

The embodiments of FIGS. 1A-B and FIG. 4A may further be provided with no reflective polariser 302. In such non-reflective structures and in FIG. 5A, the operation of FIGS. 7A and 7C only apply, that is the reflectivity does not increase in embodiments in which the reflective polariser 302 is omitted. Advantageously displays may be provided with low reflectivity in privacy mode of operation. For example displays for use in bright ambient environments such as for daytime operation in automotive vehicles may not provide a reflectivity enhancement in privacy mode.

It may be desirable to provide a switchable privacy display with narrow angle privacy switch-on and with a wide angle public mode.

Figure 8A:
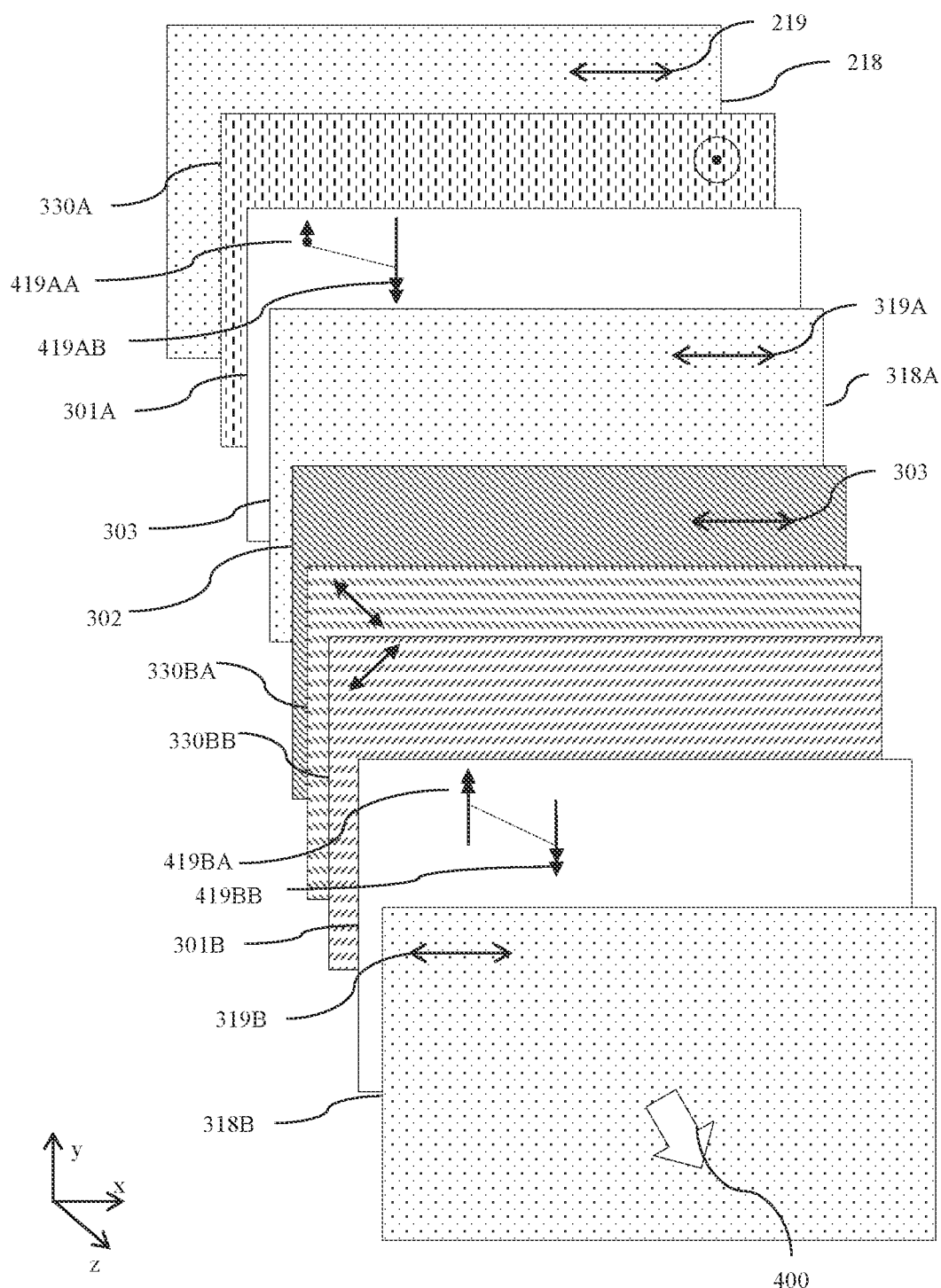
FIG. 8A is a schematic diagram illustrating in front perspective view an arrangement polarisers and polar control retarders for the embodiment of FIG. 1A wherein the first polar control retarder comprises a homeotropic alignment layer and a homogeneous alignment layer and C-plate; and the second polar control retarder comprises two homogeneous alignment layers and crossed A-plates.

FIG. 8A is a schematic diagram illustrating in front perspective view an arrangement polarisers and polar control retarders for the embodiment of FIG. 1A wherein the first polar control retarder 300A comprises a homeotropic alignment 419AA and a homogeneous alignment layer 419AB and C-plate 330A: and the second polar control retarder 300B comprises two homogeneous alignment layers 419BA, 419BB and the passive control retarder comprises crossed A-plates 330BA, 330BB.

Features of the embodiment of FIG. 8A not discussed in further detail may be assumed to correspond to the features with equivalent reference numerals as discussed above, including any potential variations in the features.

In the present embodiments, liquid crystal retarders 301 with two homogeneous alignment layers are preferably provided with passive retarder 330 comprising a negative C plate. In alternative embodiments such retarders may also be provided by crossed A-plates, however such embodiments are not described in further detail herein.

In the present embodiments, liquid crystal retarders 301 with two homogeneous alignment layers are preferably provided with passive retarder 330 comprising crossed A-plates or at least one negative C plate.

In the present embodiments, liquid crystal retarders 301 with one homogeneous alignment layer and one homeotropic alignment layer are preferably provided with passive retarder 330 comprising crossed at least one negative C plate. Preferably the negative C plate is on the same side of the liquid crystal layer 314 as the homeotropic alignment layer, that is the homeotropic alignment layer 417A is between the liquid crystal layer 314 and the passive retarder 330. In alternative embodiments such retarders may also be provided by crossed A-plates, however such embodiments are not described in further detail herein.

The illustrative embodiment of TABLE A will now be discussed with reference to FIGS. 8B-J.

TABLE 1A

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 0 | 700 nm | | |
| | 417BA | Homogeneous | 2 | 180 | {550 nm~800 nm} (450 nm~900 nm) | | |
| | 330BA | | | | | Positive A-plate @ 45° | +570 nm {+400~625 nm} (+250 nm~+800 nm) |
| | 330BB | | | | | Positive A-plate @ 135° | +570 nm {+400~625 nm} (+250 nm~+800 nm) |
| 300A | 417AB | Homogeneous | 2 | 180 | 1250 nm | | |
| | 417AA | Homeotropic | 88 | 0 | {850 nm~1800 nm} (700 nm~2500 nm) | | |
| | 330A | | | | | Negative C-plate | −1000 nm {−700 nm~−1700 nm} (−400 nm~−2100 nm) |

In the present embodiments, the switchable liquid crystal retarder 314 of said one (with a homeotropic alignment layer and a homogeneous alignment layer) of the at least one first polar control retarder and the at least one second polar control retarder that is arranged to provide homogenous alignment in the adjacent liquid crystal material and the other of the surface alignment layers is arranged to provide homeotropic alignment in the adjacent liquid crystal material, is the first polar control retarder 300A. Said retarder has a liquid crystal retarder 314 that has a retardance for light of a wavelength of 550 nm having a first retardance value in a range from 700 nm to 2500 nm, preferably in a range from 850 nm to 1800 mm. Said one 300A of the at least one first polar control retarder and the at least one second polar control retarder further comprises at least one passive compensation retarder.

As disclosed in TABLE 1A, the passive uniaxial retarder 330A has a retardance for light of a wavelength of 550 nm in a range from −400 nm to −2100 nm, preferably in a range from −700 nm to −1700 nm.

The switchable liquid crystal retarder 314A of said one (with a homeotropic alignment layer and a homogeneous alignment layer) first polar control retarder has a retardance for light of a wavelength of 550 nm having a first retardance value and the switchable liquid crystal retarder of said other (with two homogeneous alignment layers) of the second polar control retarder 300B has a retardance for light of a wavelength of 550 nm has a second retardance value, the first retardance value being greater than the second retardance value.

The magnitude of the difference between half the first retardance value and the second retardance value is at most 400 nm and preferably at most 200 nm.

Figure 8B:
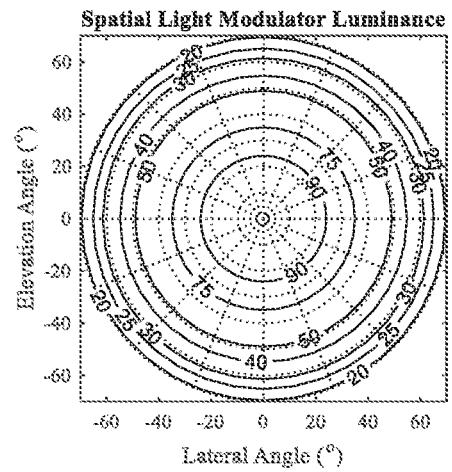
FIG. 8B is a graph illustrating a simulated polar profile of luminance output of an emissive spatial light modulator.

FIG. 8B is a graph illustrating a simulated polar profile of luminance output of an emissive spatial light modulator. As illustrated in FIG. 1A, the spatial light modulator 48 comprises an emissive spatial light modulator arranged to output light, the display polariser is an output display polariser 218 arranged on the output side of the emissive spatial light modulator 48, the second additional polariser 318B is arranged on the output side of the spatial light modulator 48 outside the first additional polariser 318A, and the at least one second polar control retarder 300B is arranged between the first additional polariser 318A and the second additional polariser 318B. FIG. 8B illustrates that the emissive spatial light modulator 48 has an output luminance profile having a full width half maximum that is at least 40 degrees, preferably at least 50 degrees.

In an alternative arrangement such as illustrated in FIG. 3 the display device may further comprises a backlight 20 arranged to output light, and the spatial light modulator 48 comprises a transmissive spatial light modulator arranged to receive output light from the backlight 20. The backlight may have an output luminance profile having a full width half maximum that is at least 40 degrees, preferably at least 50 degrees.

Figure 8C:
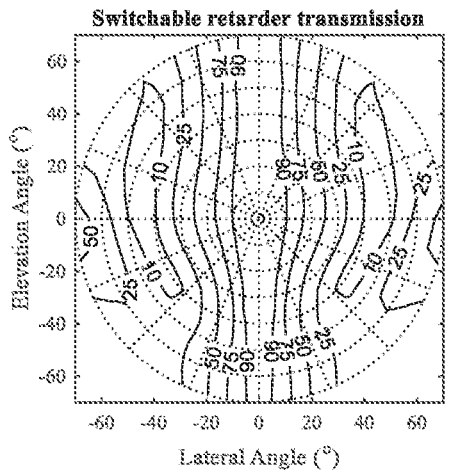
FIG. 8C is a graph illustrating a simulated polar profile of transmission of the second polar control retarder of FIG. 8A arranged between the first and second additional polarisers wherein the electric vector transmission directions of the polarisers are parallel.
Figure 8D:
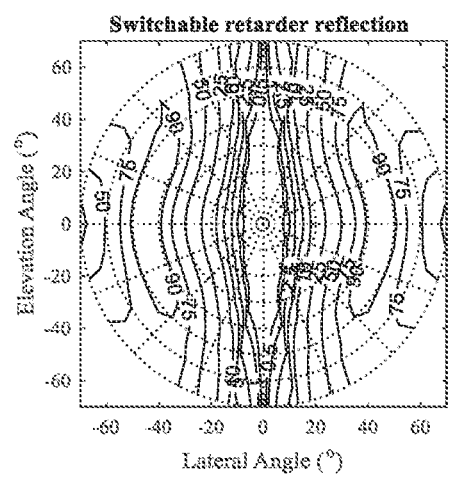
FIG. 8D is a graph illustrating a simulated polar profile of reflectivity of the second polar control retarder of FIG. 8A arranged between a reflective polariser and the second additional polariser wherein the electric vector transmission directions of the polarisers are parallel.
Figure 8E:
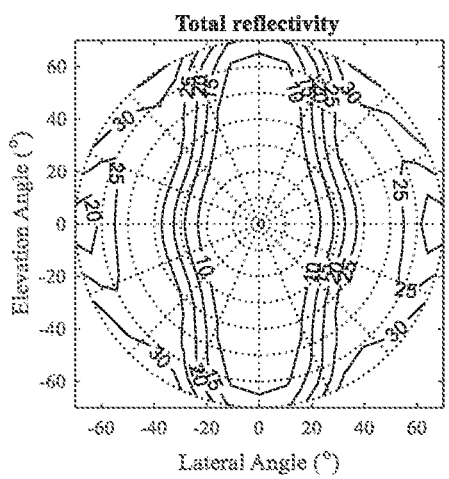
FIG. 8E is a graph illustrating a simulated polar profile of the total reflectivity comprising the reflectivity of FIG. 8D and the Fresnel reflectivity from the front surface of the display device.

FIG. 8C is a graph illustrating a simulated polar profile of transmission of the second polar control retarder of FIG. 8A and TABLE 1A arranged between the first and second additional polarisers wherein the electric vector transmission directions of the polarisers are parallel; FIG. 8D is a graph illustrating a simulated polar profile of reflectivity of the second polar control retarder of FIG. 8A arranged between a reflective polariser and the second additional polariser wherein the electric vector transmission directions of the polarisers are parallel; and FIG. 8E is a graph illustrating a simulated polar profile of the total reflectivity comprising the reflectivity of FIG. 8D and the Fresnel reflectivity from the front surface of the display device.

Figure 8F:
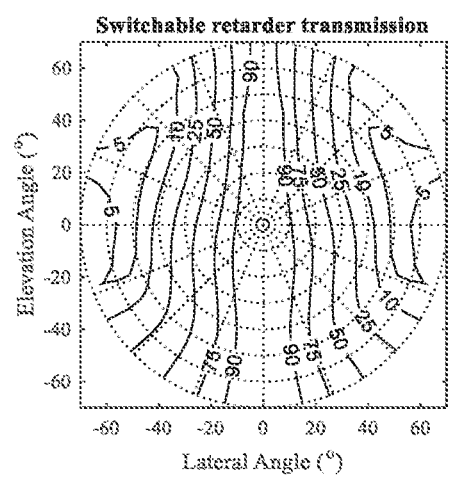
FIG. 8F is a graph illustrating a simulated polar profile of transmission of the first polar control retarder of FIG. 8A arranged between the display polariser and the first additional polariser wherein the electric vector transmission directions of the polarisers are parallel and wherein the pretilt directions of the first polar control retarder are parallel or anti-parallel to the pretilt directions of the second polar control retarder.

FIG. 8F is a graph illustrating a simulated polar profile of transmission of the first polar control retarder of FIG. 8A and TABLE 1A arranged between the display polariser and the first additional polariser wherein the electric vector transmission directions of the polarisers are parallel. The pretilt directions of the first polar control retarder 300A are parallel or anti-parallel to the pretilt directions of the second polar control retarder 300B.

Figure 8G:
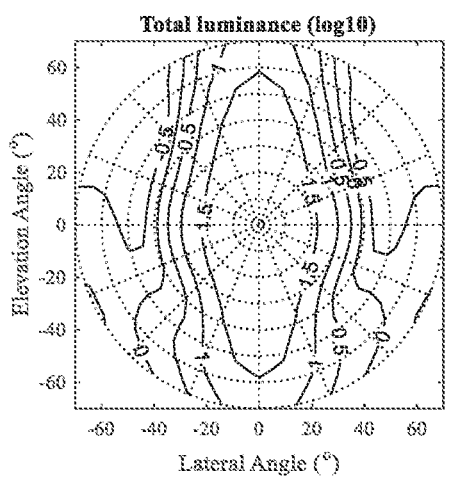
FIG. 8G is a graph illustrating a simulated polar profile of the logarithm of total output luminance of the spatial light modulator and first and second polar control retarders of FIG. 8A.

FIG. 8G is a graph illustrating a simulated polar profile of the logarithm of total output luminance of the spatial light modulator and first and second polar control retarders of FIG. 8A and TABLE 1A for the polar profiles of FIGS. 8B-F.

As described above, the security performance of the display can be determined using the polar variation of visual security level, S with polar viewing angle.

Figure 8H:
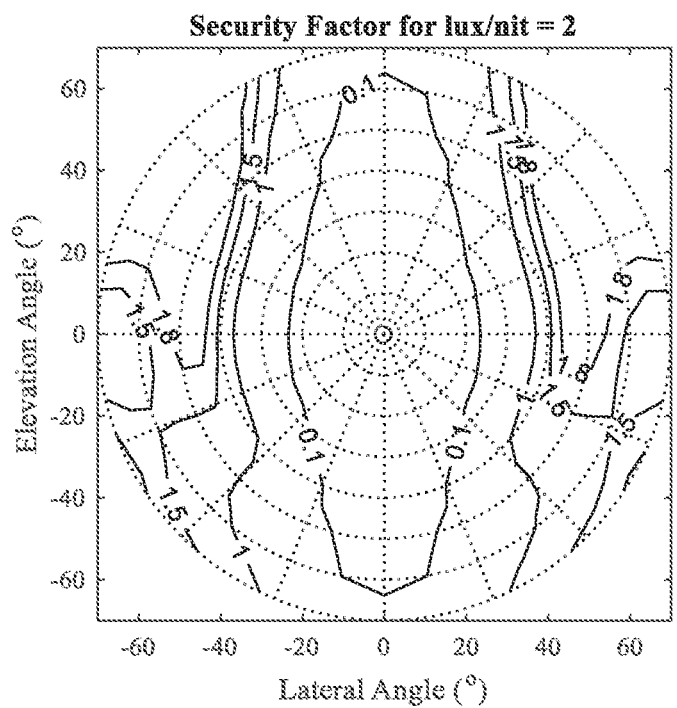
FIG. 8H is a graph illustrating a simulated polar profile of the security level, S of the arrangement of FIG. 8A for an ambient illuminance measured in lux that is twice the head-on display luminance measured in nits.
Figure 8I:
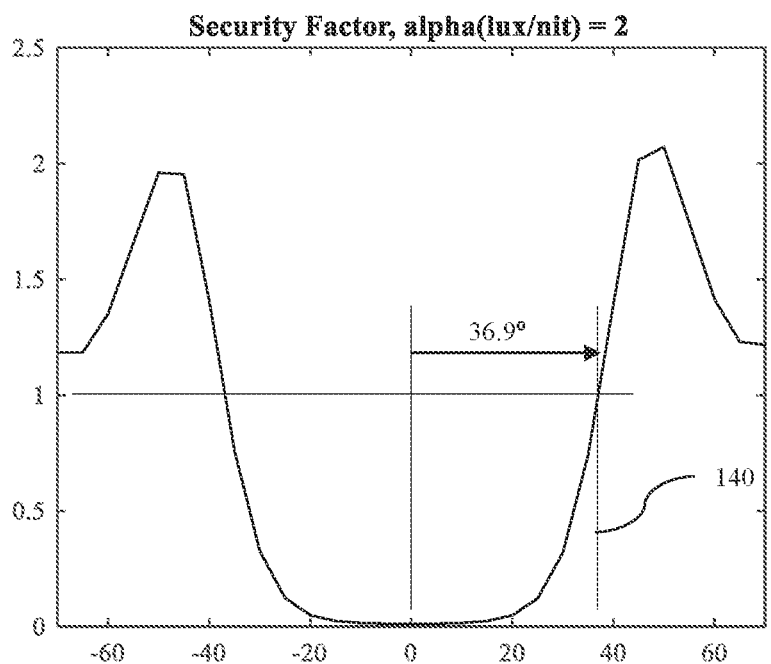
FIG. 8I is a graph illustrating a simulated lateral profile for zero degrees elevation of the visual security factor of the arrangement of FIG. 8A for an ambient illuminance measured in lux that is twice the head-on display luminance measured in nits.

FIG. 8H is a graph illustrating a simulated polar profile of the security level. S of the arrangement of FIG. 8A and TABLE 1A for an ambient illuminance measured in lux that is twice the head-on display luminance measured in nits; and FIG. 8I is a graph illustrating a simulated lateral profile for zero degrees elevation of the visual security factor of the arrangement of FIG. 8A and TABLE 1A for an ambient illuminance measured in lux that is twice the head-on display luminance measured in nits. Thus the arrangement of FIG. 8A and TABLE 1A using a typical luminance profile of an emissive display of FIG. 1A can achieve a privacy switch-on angle 140 of approximately 37 degrees. Advantageously an observer at 45 degrees polar angle for zero degrees elevation can see substantially no image information, independent of image content for such ambient lighting conditions. Further the display achieves increased security level in the upper quadrants (azimuthal angles around +/−45 degrees from the northerly azimuthal direction). In operation, privacy displays desirably provide higher security levels for snoopers in look-down viewing quadrants. In said look down quadrants high security factor is desirably achieved.

Figure 8J:
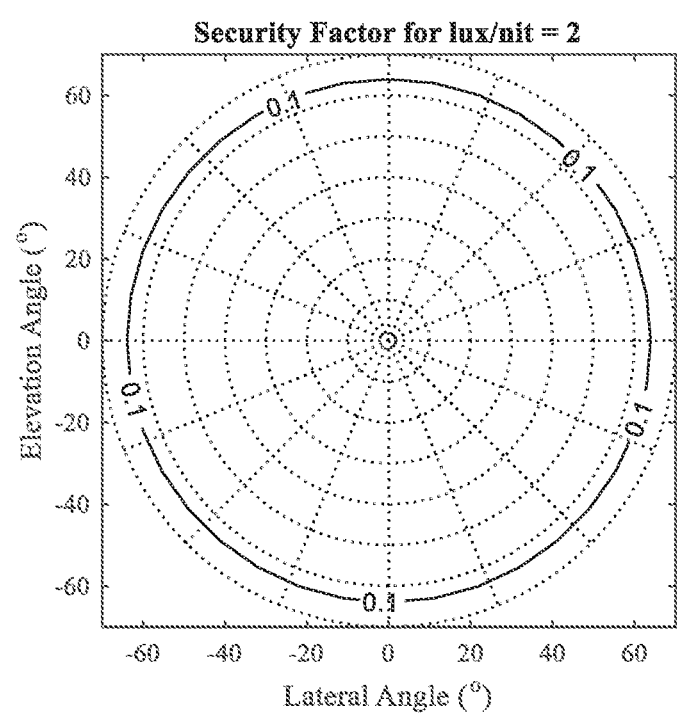
FIG. 8J is a graph illustrating a simulated polar profile of the security level, S of the arrangement of FIG. 8A for an ambient illuminance measured in lux that is twice the head-on display luminance measured in nits and operated in public mode.

FIG. 8J is a graph illustrating a simulated polar profile of the security level, S of the arrangement of FIG. 8A for an ambient illuminance measured in lux that is twice the head-on display luminance measured in nits and operated in public mode. Advantageously image visibility (S<0.1) is maintained to wide viewing angles so that the display can be easily seen with high contrast from polar viewing angles that are greater than 45 degrees.

Other illustrate embodiments are illustrated in TABLES 1B-F and TABLE 2 compares the privacy switch-on angle 140 for each illustrative embodiment. In comparison to the arrangement of TABLE 1A, embodiments comprising a C-plate in comparison to the crossed A-plates may advantageously be thinner and cheaper. Embodiments comprising two homeotropic alignment layers in comparison to the two homogeneous alignment layers may advantageously achieve public mode operation with zero volts, and may have lower power consumption. Embodiments wherein the first retarder 300A comprises a homeotropic alignment layer and a homogeneous alignment layer advantageously achieve lower privacy switch-on angle 140 while maintaining high security level at higher polar angles.

TABLE 1B

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homotropic | 88 | 0 | {850 nm~1800 nm} (700 nm~2500 nm) | | |
| | 330B | | | | | Negative C-plate | −1000 nm {−700 nm~−1700 nm} (−400 nm~−2100 nm) |

TABLE 1B-continued

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300A | 417AB | Homogeneous | 2 | 0 | 700 nm | | |
| | 417AA | Homogeneous | 2 | 180 | {550 nm~800 nm} (450 nm~900 nm) | | |
| | 330AA | | | | | Positive A-plate @ 45° | +570 nm {+400~625 nm} (+250 nm~+800 nm) |
| | 330AB | | | | | Positive A-plate @ 135° | +570 nm {+400~625 nm} (+250 nm~+800 nm) |

In respect of said other (with the same type of alignment layers) of the at least one first polar control retarder and the at least one second polar control retarder, both of the surface alignment layers are arranged to provide homogeneous alignment in the adjacent liquid crystal material.

By way of comparison with the illustrative embodiment of TABLE 1A, TABLE 1B provides the switchable liquid crystal retarder 314B of said one (with a homeotropic alignment layer and a homogeneous alignment layer) second polar control retarder has a retardance for light of a wavelength of 550 nm having a first retardance value and the switchable liquid crystal retarder of said other (with two homogeneous alignment layers) of the first polar control retarder 300B has a retardance for light of a wavelength of 550 nm has a second retardance value, the first retardance value being greater than the second retardance value.

In respect of said other (with the same type of alignment layers) of the at least one first polar control retarder and the at least one second polar control retarder, being the second polar control retarder 300A in TABLE 1A and the first polar control retarder in TABLE 1B, both of the surface alignment layers are arranged to provide homogenous alignment in the adjacent liquid crystal material which has a retardance for light of a wavelength of 550 nm in a range from 450 nm to 900 nm, preferably in a range from 550 nm to 800 nm, and said other of the at least one first polar control retarder and the at least one second polar control retarder further comprises a pair of passive uniaxial retarders having optical axes in the plane of the retarders that are crossed and each having a retardance for light of a wavelength of 550 nm in a range from 250 nm to 800 nm, preferably in a range from 400 nm to 625 nm.

TABLE 1C

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 0 | 750 nm | | |
| | 417BA | Homogeneous | 2 | 180 | {600 nm~850 nm} (500 nm~900 nm) | | |
| | 330B | | | | | Negative C-plate | −440 nm {−350 nm~−600 nm} (−300 nm~−700 nm) |
| 300A | 417AB | Homogeneous | 2 | 180 | 1250 nm | | |
| | 417AA | Homeotropic | 88 | 0 | {850 nm~1800 nm} (700 nm~2500 nm) | | |
| | 330A | | | | | Negative C-plate | −1000 nm {−700 nm~−1700 nm} (−400 nm~−2100 nm) |

TABLE 1D

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homeotropic | 88 | 0 | {850 nm~1800 nm} (700 nm~2500 nm) | | |

TABLE 1D-continued

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| | 330B | | | | | Negative C-plate | −1000 nm {−700 nm~−1700 nm} (−400 nm~−2100 nm) |
| 300A | 417AB | Homogeneous | 2 | 0 | 750 nm | | |
| | 417AA | Homogeneous | 2 | 180 | {600 nm~850 nm} (500 nm~900 nm) | | |
| | 330A | | | | | Negative C-plate | −440 nm {−350 nm~−600 nm} (−300 nm~−700 nm) |

For the illustrative embodiments of TABLES 1C-D in respect of the other of the at least one first polar control retarder and the at least one second polar control retarder, both of the surface alignment layers are arranged to provide homogenous alignment in the adjacent liquid crystal material which has a retardance for light of a wavelength of 550 nm in a range from 500 nm to 900 nm, preferably 600 nm to 850 nm, and said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −700 nm, preferably in a range from −350 nm to −600 nm.

TABLE 1E

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homeotropic | 88 | 0 | {850 nm~1800 nm} (700 nm~2500 nm) | | |
| | 330B | | | | | Negative C-plate | −1000 nm {−700 nm~−1700 nm} (−400 nm~−2100 nm) |
| 300A | 417AB | Homeotropic | 88 | 0 | 750 nm | | |
| | 417AA | Homeotropic | 88 | 180 | {600 nm~850 nm} (500 nm~900 nm) | | |
| | 330A | | | | | Negative C-plate | −660 nm {−400 nm~−800 nm} (−300 nm~−900 nm) |

TABLE 1F

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homeotropic | 88 | 0 | 750 nm | | |
| | 417BA | Homeotropic | 88 | 180 | {600 nm~850 nm} (500 nm~900 nm) | | |
| | 330B | | | | | Negative C-plate | −660 nm {−400 nm~−800 nm} (−300 nm~−900 nm) |
| 300A | 417AB | Homogeneous | 2 | 180 | 1250 nm | | |
| | 417AA | Homeotropic | 88 | 0 | {850 nm~1800 nm} (700 nm~2500 nm) | | |
| | 330A | | | | | Negative C-plate | −1000 nm {−700 nm~−1700 nm} (−400 nm~−2100 nm) |

For the illustrative embodiments of TABLES 1E-F, in respect of the other of the at least one first polar control retarder and the at least one second polar control retarder, both of the surface alignment layers are arranged to provide homeotropic alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −900 nm, preferably in a range from −400 nm to −800 nm.

of the same type) of the at least one first polar control retarder and the at least one second polar control retarder is between the backlight 20 and the transmissive spatial light modulator 48. Advantageously the visibility of flow due to high restoration times of homeotropic alignment layers may be reduced.

It may be desirable to provide a display with a small switch-on angle 140 while maintaining high security level for off-axis viewing. The illustrative embodiment of TABLE 3A will now be discussed with reference to FIGS. 9A-H.

In the embodiments of TABLES 3A-D, the switchable liquid crystal retarder of said one (with a homeotropic

TABLE 2

| TABLE | 300A alignment layers & passive retarder(s) | 300B alignment layers & passive retarder(s) | 301A retardance/ nm | 330A retardance/ nm | 301B retardance/ nm | 330B retardance/ nm | Parallel cell half width angle 140 for S = 1 @ 2 lux/nit/deg |
|---|---|---|---|---|---|---|---|
| 1A | Homogeneous Homeotropic Negative C | Homogeneous Homogeneous Crossed A | 1250 | −1000 | 700 | 570 | 36.9 |
| 1B | Homogeneous Homogeneous Crossed A | Homogeneous Homeotropic Negative C | 700 | 570 | 1250 | −1000 | 37.2 |
| 1C | Homogeneous Homeotropic Negative C | Homogeneous Homogeneous Negative C | 1250 | −1000 | 750 | −440 | 37.8 |
| 1D | Homogeneous Homogeneous Negative C | Homogeneous Homeotropic Negative C | 750 | −440 | 1250 | −1000 | 37.9 |
| 1E | Homeotropic Homeotropic Negative C | Homogeneous Homeotropic Negative C | 750 | −660 | 1250 | −1000 | 39.2 |
| 1F | Homogeneous Homeotropic Negative C | Homeotropic Homeotropic Negative C | 1250 | −1000 | 750 | −660 | 39.6 |

TABLE 2 illustrates that privacy switch-on 140 may be achieved for angles of less than 40 degrees. Advantageously a snooper at 45 degrees polar angle may have low image visibility at at least some azimuthal angles.

In alternative embodiments of the present disclosure illustrated in FIG. 4A and FIG. 5A, the display device may further comprise a backlight 20 arranged to output light, the spatial light modulator 48 comprises a transmissive spatial light modulator 48 arranged to receive output light from the backlight 20, and said other (with alignment layers that are of the same type) of the at least one first polar control retarder and the at least one second polar control retarder has a retardance for light of a wavelength of 550 nm having a first retardance value and the switchable liquid crystal retarder of said other (with alignment layers that are of the same type) the at least one first polar control retarder and the at least one second polar control retarder has a retardance for light of a wavelength of 550 nm has a second retardance value, half of the first retardance value being less than the second retardance value.

TABLE 3A

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1480 nm | | |
| | 417BA | Homogeneous | 2 | 0 | {850 nm~1800 nm} (700 nm~2500 nm) | | |
| | 330BA | | | | | Positive A-plate @ 45° | +1050 nm {+750 nm to +1300 nm} (+600 nm to +1600 nm) |
| | 330BB | | | | | Positive A-plate @ 135° | +1050 nm {+750 nm to +1300 nm} (+600 nm to + 1600 nm) |
| 300A | 417AB | Homogeneous | 2 | 180 | 1250 nm | | |
| | 417AA | Homeotropic | 88 | 0 | {850 nm~1800 nm} (700 nm~2500 nm) | | |

TABLE 3A-continued

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| | 330A | | | | | Negative C-plate | −1000 nm {−700 nm~−1700 nm} (−400 nm~−2100 nm) |

Figure 9A:
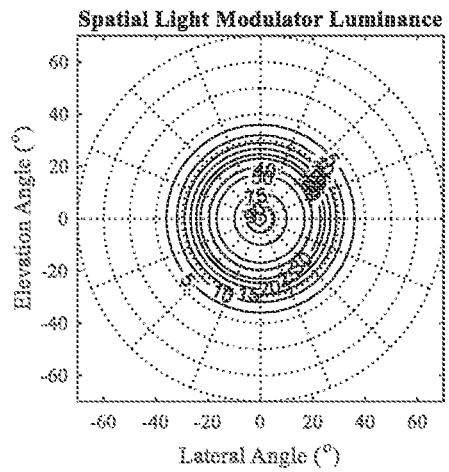
FIG. 9A is a graph illustrating a simulated polar profile of luminance output of a transmissive spatial light modulator that is illuminated by a collimated backlight.

FIG. 9A is a graph illustrating a simulated polar profile of luminance output of a transmissive spatial light modulator 48 that is illuminated by a collimated backlight 20. The display device 100 thus further comprises a backlight 20 arranged to output light, and the spatial light modulator 48 comprises a transmissive spatial light modulator arranged to receive output light from the backlight. The backlight has an output luminance profile having a full width half maximum that is at most 40 degrees. The spatial light modulator may alternatively comprise an emissive spatial light modulator and a parallax barrier 70) as described with respect to FIGS. 12A-B, below.

The optical stack of FIG. 8A comprising the layers of TABLE 3A and a collimated backlight 20 will now be discussed.

Figure 9B:
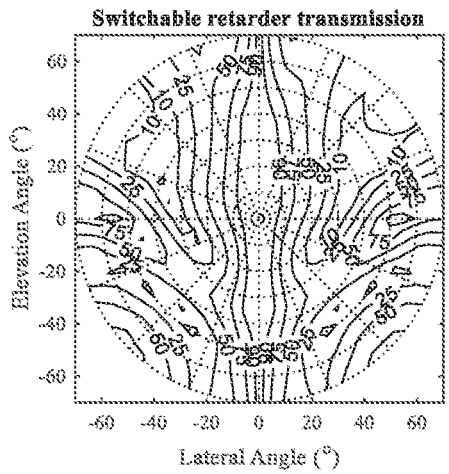
FIG. 9B is a graph illustrating a simulated polar profile of transmission of the second polar control retarder.
Figure 9C:
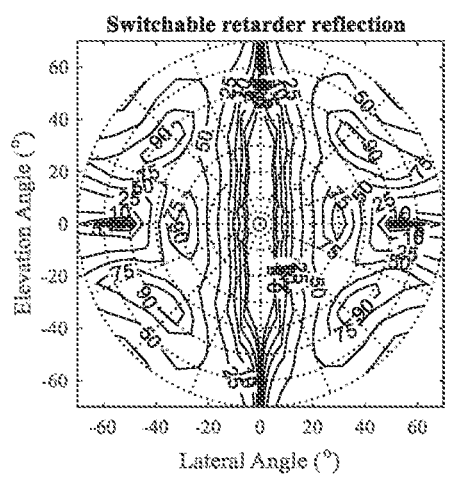
FIG. 9C is a graph illustrating a simulated polar profile of reflectivity of the second polar control retarder.
Figure 9D:
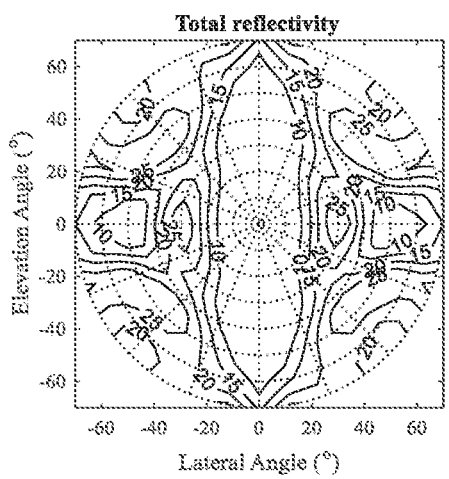
FIG. 9D is a graph illustrating a simulated polar profile of the total reflectivity comprising the reflectivity of FIG. 9C and the Fresnel reflectivity from the front surface of the display device.

FIG. 9B is a graph illustrating a simulated polar profile of transmission of the second polar control retarder of TABLE 3A; FIG. 9C is a graph illustrating a simulated polar profile of reflectivity of the second polar control retarder of TABLE 3A; FIG. 9D is a graph illustrating a simulated polar profile of the total reflectivity comprising the reflectivity of FIG. 9C and the Fresnel reflectivity from the front surface of the display device.

Figure 9E:
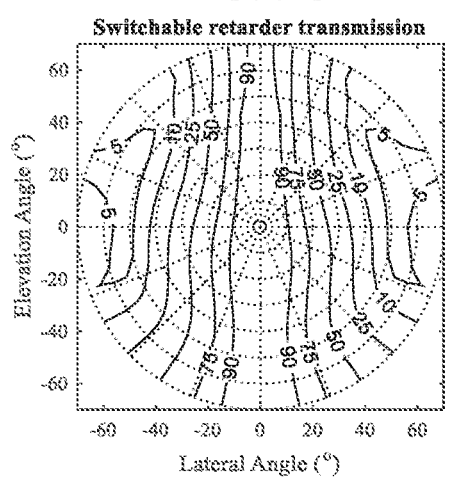
FIG. 9E is a graph illustrating a simulated polar profile of transmission of the first polar control retarder wherein the pretilt directions of the first polar control retarder are parallel or anti-parallel to the pretilt directions of the second polar control retarder.

FIG. 9E is a graph illustrating a simulated polar profile of transmission of the first polar control retarder of TABLE 3A. The pretilt directions of the first polar control retarder 300A are parallel or anti-parallel to the pretilt directions of the second polar control retarder 300B.

Figure 9F:
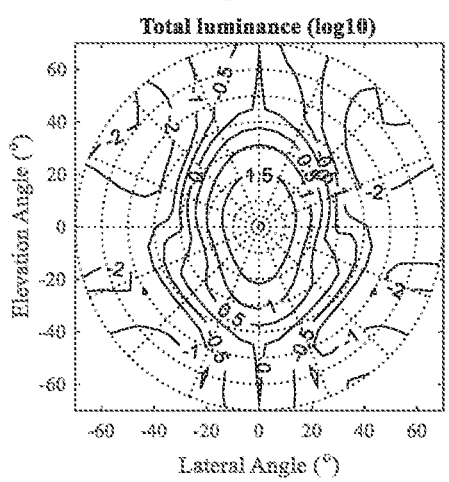
FIG. 9F is a graph illustrating a simulated polar profile of the logarithm of total output luminance of the spatial light modulator and first and second polar control retarders.

FIG. 9F is a graph illustrating a simulated polar profile of the logarithm of total output luminance of the spatial light modulator and first and second polar control retarders for the polar profiles of FIGS. 9A-E.

Figure 9G:
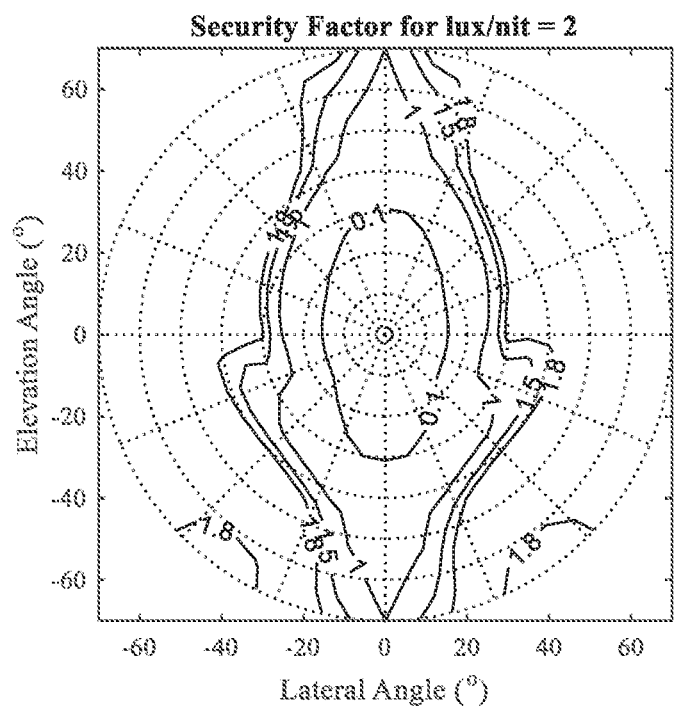
FIG. 9G is a graph illustrating a simulated polar profile of the security level, S of the arrangement for an ambient illuminance measured in lux that is twice the head-on display luminance measured in nits.
Figure 9H:
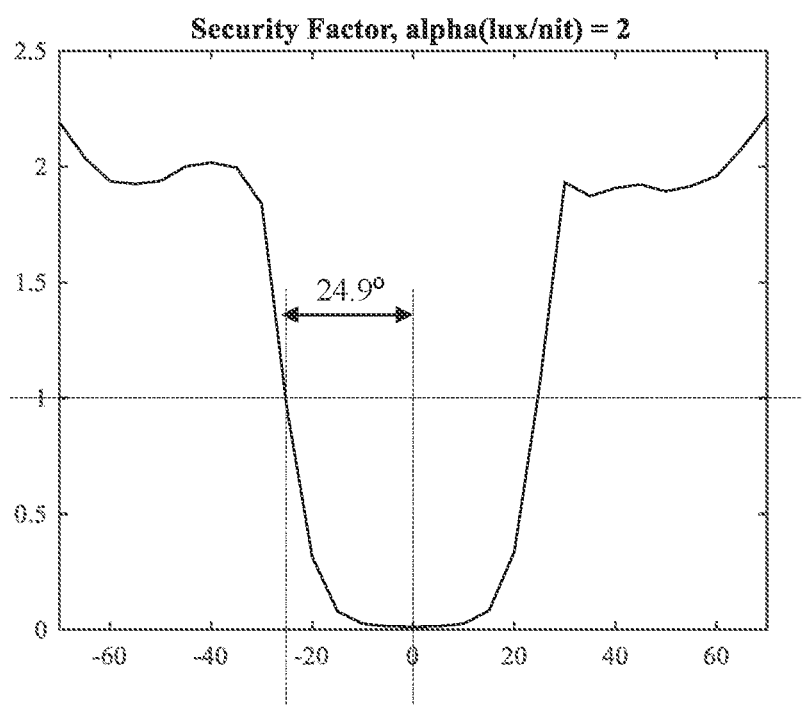
FIG. 9H is a graph illustrating a simulated lateral profile for zero degrees elevation of the visual security factor of the arrangement for an ambient illuminance measured in lux that is twice the head-on display luminance measured in nits.

FIG. 9G is a graph illustrating a simulated polar profile of the security level, S of the arrangement of FIG. 8A, and the profiles of FIGS. 9A-F for an ambient illuminance measured in lux that is twice the head-on display luminance measured in nits for the polar profiles of FIGS. 9A-E; and FIG. 9H is a graph illustrating a simulated lateral profile for zero degrees elevation of the visual security factor of the arrangement for an ambient illuminance measured in lux that is twice the head-on display luminance measured in nits for the polar profiles of FIGS. 9A-E.

Other illustrate embodiments are illustrated in TABLES 3B-D and TABLE 4 compares the privacy switch-on angle 140 for each illustrative embodiment. The embodiments may be provided for the arrangements of FIGS. 1A-B or alternatively for the arrangements of FIGS. 4A-B, wherein the arrangements comprise reflective polariser 302.

In comparison to the arrangement of TABLE 3A, embodiments comprising a C-plate in comparison to the crossed A-plates may advantageously be thinner and cheaper. Embodiments comprising two homeotropic alignment layers in comparison to the two homogeneous alignment layers may advantageously achieve public mode operation with zero volts, and may have lower power consumption. Embodiments wherein the first retarder 300A comprises a homeotropic alignment layer and a homogeneous alignment layer advantageously achieve lower privacy switch-on angle 140 while maintaining high security level at higher polar angles.

TABLE 3B

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homeotropic | 88 | 0 | 1500 nm | | |
| | 417BA | Homeotropic | 88 | 180 | {1000 nm~1800 nm} (700 nm~2500 nm) | | |
| | 330B | | | | | Negative C-plate | −1400 nm {−900 nm~−1800 nm} (−700 nm~−2500 nm) |
| 300A | 417AB | Homogeneous | 2 | 180 | 1250 nm | | |
| | 417AA | Homeotropic | 88 | 0 | {850 nm~1800 nm} (700 nm~2500 nm) | | |
| | 330A | | | | | Negative C-plate | −1000 nm {−700 nm~−1700 nm} (−400 nm~−2100 nm) |

TABLE 3C

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homeotropic | 88 | 0 | {850 nm~1800 nm} | | |
| | | | | | (700 nm~2500 nm) | | |
| | 330B | | | | | Negative C-plate | −1000 nm {−700 nm~−1700 nm} (−400 nm~−2100 nm) |
| 300A | 417AB | Homogeneous | 2 | 180 | 1480 nm | | |
| | 417AA | Homogeneous | 2 | 0 | {850 nm~1800 nm} | | |
| | | | | | (700 nm~2500 nm) | | |
| | 330AB | | | | | Positive A-plate @ 45° | +1050 nm {+750 nm to +1300 nm} (+600 nm to +1600 nm) |
| | 330AA | | | | | Positive A-plate @ 135° | +1050 nm {+750 nm to +1300 nm} (+600 nm to +1600 nm) |

TABLE 3D

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homeotropic | 88 | 0 | {850 nm~1800 nm} | | |
| | | | | | (700 nm~2500 nm) | | |
| | 330B | | | | | Negative C-plate | −1000 nm {−700 nm~−1700 nm} (−400 nm~−2100 nm) |
| 300A | 417AB | Homeotropic | 88 | 0 | 1500 nm | | |
| | 417AA | Homeotropic | 88 | 180 | {1000 nm~1800 nm} | | |
| | | | | | (700 nm~2500 nm) | | |
| | 330A | | | | | Negative C-plate | −1400 nm {−900 nm~−1800 nm} (−700 nm~−2500 nm) |

For the illustrative embodiments of TABLES 3A-D, said one retarder (with a homeotropic alignment layer and a homogeneous alignment layer) has a liquid crystal retarder 314 that has a retardance for light of a wavelength of 550 nm having a first retardance value in a range from 700 nm to 2500 nm, preferably in a range from 850 nm to 1800 nm.

In respect of the other of the at least one first polar control retarder and the at least one second polar control retarder, wherein both of the surface alignment layers are arranged to provide homogenous alignment in the adjacent liquid crystal material which has a retardance for light of a wavelength of 550 nm in a range from 700 nm to 2500 nm, preferably in a range from 850 nm to 1800 nm, and said other of the at least one first polar control retarder and the at least one second polar control retarder further comprises a pair of passive uniaxial retarders having optical axes in the plane of the retarders that are crossed and each having a retardance for light of a wavelength of 550 nm in a range from 600 nm to 1600 nm, preferably in a range from 750 nm to 1300 nm.

In respect of the other of the at least one first polar control retarder and the at least one second polar control retarder, wherein both of the surface alignment layers are arranged to provide homeotropic alignment in the adjacent liquid crystal material which has a retardance for light of a wavelength of 550 nm in a range from 700 nm to 2500 nm, preferably in a range from 1000 nm to 1800 nm, and said other of the at least one first polar control retarder and the at least one second polar control retarder further comprises a passive uniaxial retarder having its optical axis perpendicular to the plane of the retarder and having a retardance for light of a wavelength of 550 nm in a range from −700 nm to −2500 nm, preferably in a range from −900 nm to −1800 nm.

TABLE 4

| TABLE | 300A alignment layers & passive retarder(s) | 300B alignment layers & passive retarder(s) | 301A retardance/ nm | 330A retardance/ nm | 301B retardance/ nm | 330B retardance/ nm | Parallel cell half width angle 140 for S = 1 @ 2 lux/nit/deg |
|---|---|---|---|---|---|---|---|
| 3A | Homogeneous Homeotropic Negative C | Homogeneous Homeotropic Crossed A | 1250 | −1000 | 1480 | 1050 | 24.9 |
| 3B | Homogeneous Homeotropic Negative C | Homeotropic Homeotropic Negative C | 1250 | −1000 | 1500 | −1400 | 26.4 |
| 3C | Homogeneous Homogeneous Crossed A | Homogeneous Homeotropic Negative C | 1480 | 1050 | 1250 | −1000 | 26.8 |
| 3D | Homeotropic Homeotropic Negative C | Homogeneous Homeotropic Negative C | 1500 | −1400 | 1250 | −1000 | 27.7 |

Figure 9I:
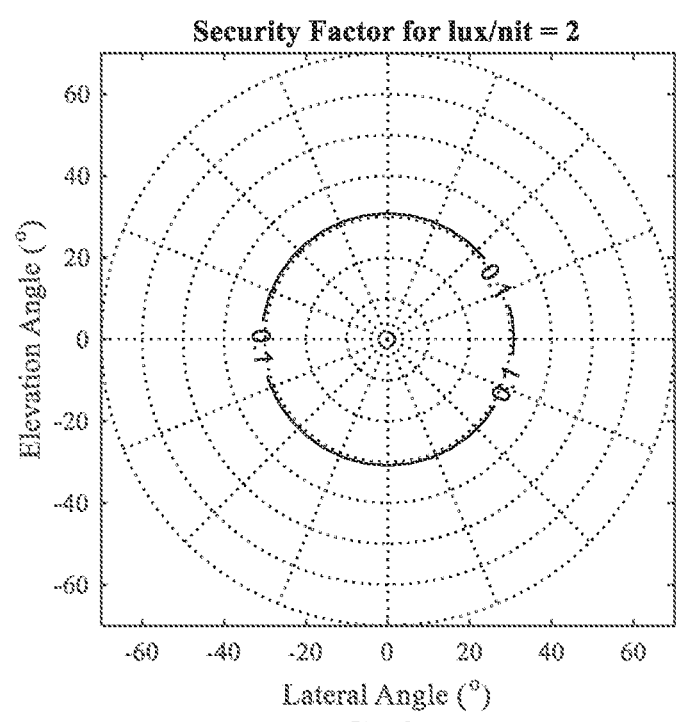
FIG. 9I is a graph illustrating a simulated polar profile of the security level, S for an ambient illuminance measured in lux that is twice the head-on display luminance measured in nits and operated in public mode.

FIG. 9I is a graph illustrating a simulated polar profile of the security level, S of the arrangement of FIG. 9A for an ambient illuminance measured in lux that is twice the head-on display luminance measured in nits and operated in public mode. In comparison to the arrangement using the wide angle emission of FIG. 8B, the collimated backlight with luminance profile of FIG. 9A achieves improved privacy viewing angles, but has narrower polar range over which other observers can see a high contrast image (S<0.1) in privacy mode. Such a display is well suited to display applications that are primarily for single viewers with occasional use by multiple users.

It may be desirable to provide a switchable privacy display with no reflective polariser 302. The illustrative embodiment of TABLE 3A will now be discussed with reference to FIGS. 10A-H. Further The arrangements of TABLES 3B-D may be provided in such embodiments.

Figure 10A:
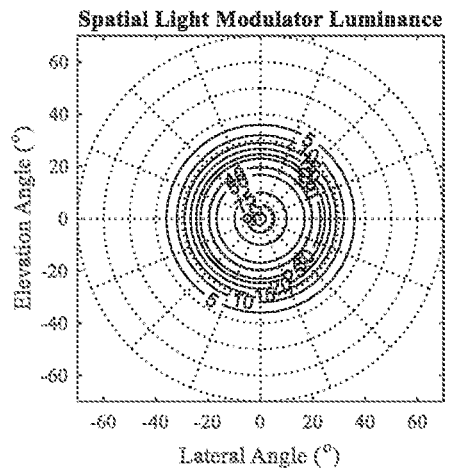
FIG. 10A is a graph illustrating a simulated polar profile of luminance output of a transmissive spatial light modulator that is illuminated by a collimated backlight.

FIG. 10A is a graph illustrating a simulated polar profile of luminance output of a transmissive spatial light modulator that is illuminated by a collimated backlight: The display may comprise the arrangement of FIGS. 5A-B. Alternatively the arrangement of FIGS. 1A-B provided with no reflective polariser 302 and with the spatial light modulator of FIG. 3. Alternatively the arrangement of FIGS. 4A-B may be provided with no reflective polariser 302.

Figure 10B:
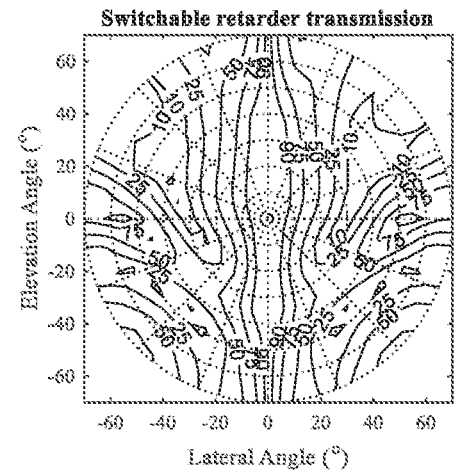
FIG. 10B is a graph illustrating a simulated polar profile of transmission of the second polar control retarder.
Figure 10C:
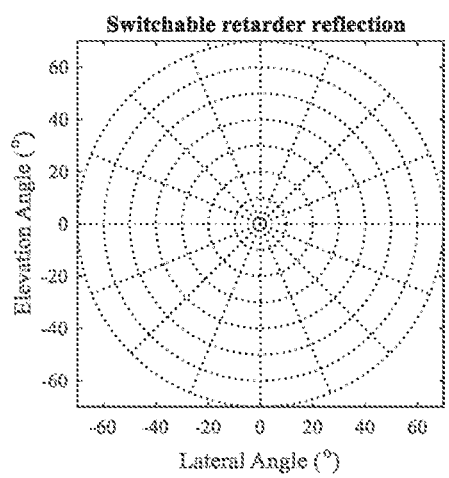
FIG. 10C is a graph illustrating a simulated polar profile of reflectivity of the second polar control retarder for no reflective polariser.
Figure 10D:
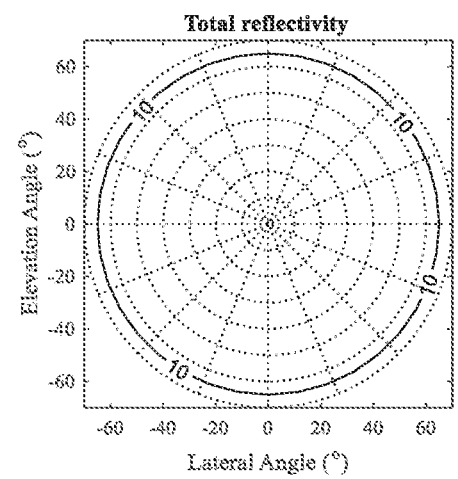
FIG. 10D is a graph illustrating a simulated polar profile of the total reflectivity comprising the reflectivity of FIG. 10C and the Fresnel reflectivity from the front surface of the display device for no reflective polariser.

FIG. 10B is a graph illustrating a simulated polar profile of transmission of the second polar control retarder: FIG. 10C is a graph illustrating a simulated polar profile of reflectivity of the second polar control retarder for no reflective polariser; FIG. 10D is a graph illustrating a simulated polar profile of the total reflectivity comprising the reflectivity of FIG. 9C and the Fresnel reflectivity from the front surface of the display device for no reflective polariser.

Figure 10E:
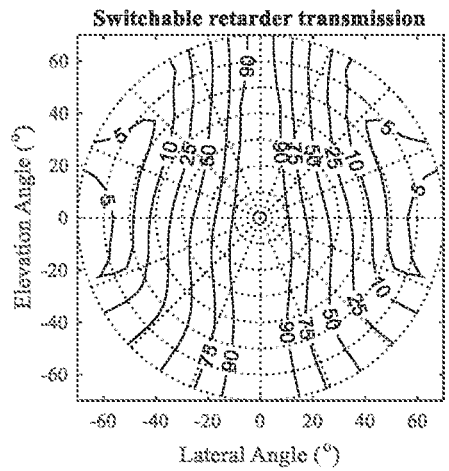
FIG. 10E is a graph illustrating a simulated polar profile of transmission of the first polar control retarder wherein the pretilt directions of the first polar control retarder are parallel or anti-parallel to the pretilt directions of the second polar control retarder.

FIG. 10E is a graph illustrating a simulated polar profile of transmission of the first polar control retarder. The pretilt directions of the first polar control retarder 300A are parallel or anti-parallel to the pretilt directions of the second polar control retarder 300B.

Figure 10F:
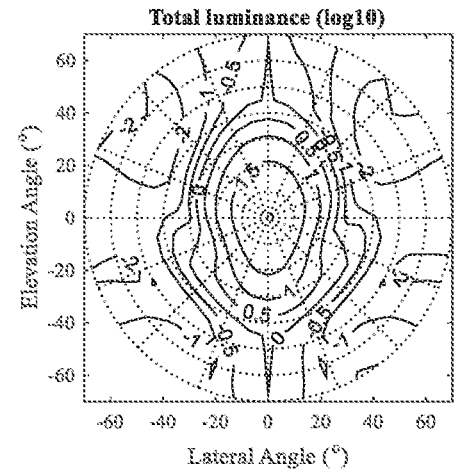
FIG. 10F is a graph illustrating a simulated polar profile of the logarithm of total output luminance of the spatial light modulator and first and second polar control retarders.

FIG. 10F is a graph illustrating a simulated polar profile of the logarithm of total output luminance of the spatial light modulator and first and second polar control retarders for the polar profiles of FIGS. 10A-E.

Figure 10G:
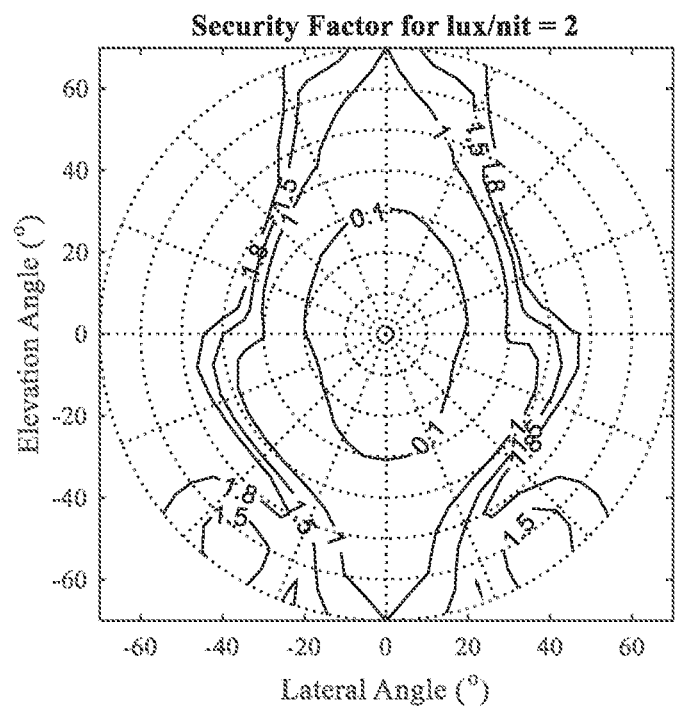
FIG. 10G is a graph illustrating a simulated polar profile of the security level. S of the arrangement with no reflective polariser for an ambient illuminance measured in lux that is twice the head-on display luminance measured in nits.
Figure 10H:
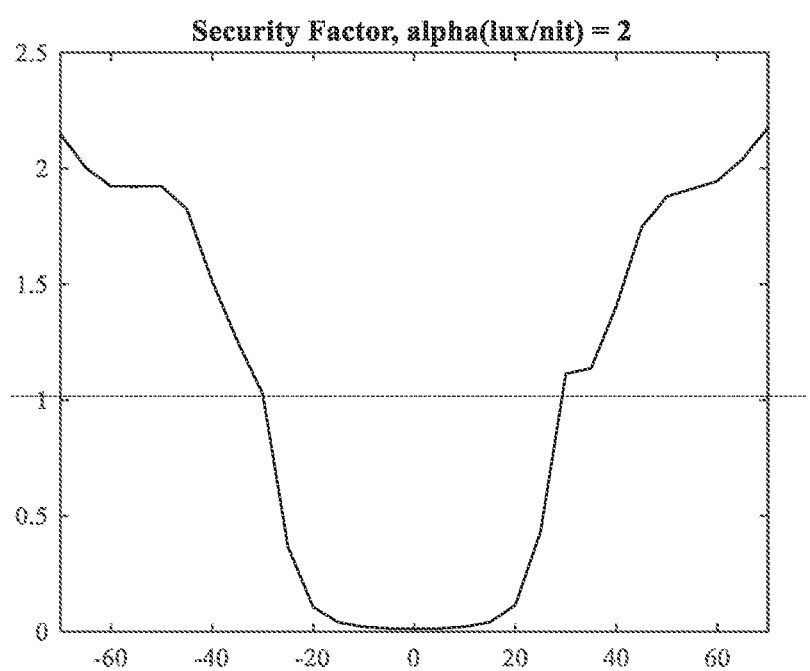
FIG. 10H is a graph illustrating a simulated lateral profile for zero degrees elevation of the visual security factor of the arrangement for an ambient illuminance measured in lux that is twice the head-on display luminance measured in nits.

FIG. 10G is a graph illustrating a simulated polar profile of the security level, S of the arrangement with no reflective polariser for an ambient illuminance measured in lux that is twice the head-on display luminance measured in nits; and FIG. 10H is a graph illustrating a simulated lateral profile for zero degrees elevation of the visual security factor of the arrangement for an ambient illuminance measured in lux that is twice the head-on display luminance measured in nits.

The relative performance of switch-on angle 140 is illustrated in TABLE 5. The order of the first and second polar control retarders 300A, 300B does not change the output polar profiles.

TABLE 5

| TABLE | First alignment layers & passive retarder(s) | Second alignment layers & passive retarder(s) | First LC retardance/ nm | First passive retarder(s) retardance/ nm | Second LC retardance/ nm | Second passive retarder(s) retardance/ nm | Parallel cell half width angle 140 for S = 1 @ 2 lux/nit/deg |
|---|---|---|---|---|---|---|---|
| 3A, 3C | Homogeneous Homeotropic Negative C | Homogeneous Homogeneous Crossed A | 1250 | −1000 | 1480 | 1050 | 29.5 |
| 3B, 3D | | Homeotropic Homeotropic Negative C | | | 1500 | −1400 | 30.7 |

Advantageously a display may be provided with lower reflectivity in comparison to arrangements with reflective polariser 302. Such arrangements may be desirable in certain operating environments such as automotive cabins in bright sunlight.

It may be desirable to provide privacy displays that achieve high security level for off-axis viewing in both landscape and portrait modes of operation. The illustrative embodiment of TABLE 6A will now be discussed with reference to FIGS. 11A-G.

TABLE 6A

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 0 | 700 nm | | |
| | 417BA | Homogeneous | 2 | 180 | {550 nm~800 nm} (450 nm~900 nm) | | |
| | 330BA | | | | | Positive A-plate @ 45° | +570 nm {+400~625 nm} (+250 nm~+800 nm) |
| | 330BB | | | | | Positive A-plate @ 135° | +570 nm {+400~625 nm} (+250 nm~+800 nm) |
| 300A | 417AB | Homogeneous | 2 | 90 | 1250 nm | | |
| | 417AA | Homeotropic | 88 | 270 | {850 nm~1800 nm} (700 nm~2500 nm) | | |
| | 330A | | | | | Negative C-plate | −1000 nm {−700 nm~−1700 nm} (−400 nm~−2100 nm) |

In respect of the other (with alignment layers that are of the same type) of the at least one first polar control retarder and the at least one second polar control retarder, both of the surface alignment layers are arranged to provide homogenous alignment in the adjacent liquid crystal material which has a retardance for light of a wavelength of 550 nm in a range from 450 nm to 900 nm, preferably in a range from 550 nm to 800 nm, and said other of the at least one first polar control retarder and the at least one second polar control retarder further comprises a pair of passive uniaxial retarders having optical axes in the plane of the retarders that are crossed and each having a retardance for light of a wavelength of 550 nm in a range from 250 nm to 800 nm, preferably in a range from 400 nm to 625 nm.

Figure 11A:
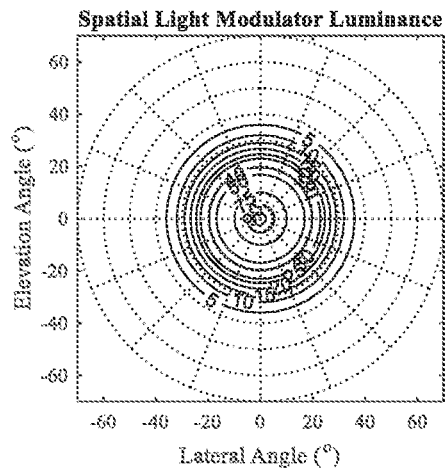
FIG. 11A is a graph illustrating a simulated polar profile of luminance output of a transmissive spatial light modulator that is illuminated by a collimated backlight.
Figure 11B:
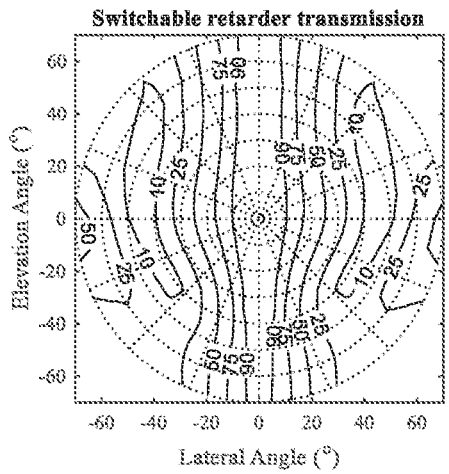
FIG. 11B is a graph illustrating a simulated polar profile of transmission of the second polar control retarder.
Figure 11C:
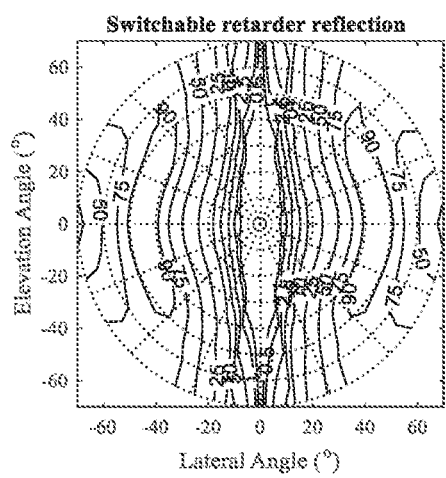
FIG. 11C is a graph illustrating a simulated polar profile of reflectivity of the second polar control retarder.
Figure 11D:
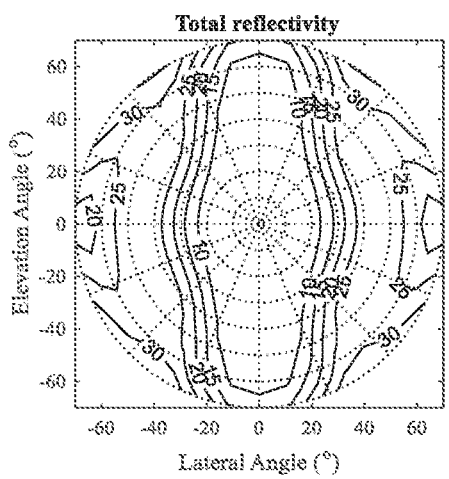
FIG. 11D is a graph illustrating a simulated polar profile of the total reflectivity comprising the reflectivity of FIG. 11C and the Fresnel reflectivity from the front surface of the display device.

FIG. 11A is a graph illustrating a simulated polar profile of luminance output of a transmissive spatial light modulator that is illuminated by a collimated backlight; FIG. 11B is a graph illustrating a simulated polar profile of transmission of the second polar control retarder: FIG. 11C is a graph illustrating a simulated polar profile of reflectivity of the second polar control retarder: and FIG. 11D is a graph illustrating a simulated polar profile of the total reflectivity comprising the reflectivity of FIG. 11C and the Fresnel reflectivity from the front surface of the display device.

Said surface alignment layers of said other (with alignment layers that are of the same type) of the at least one first polar control retarder and the at least one second polar control retarder have pretilts having pretilt directions with components in the plane of the layer of liquid crystal material in a second pair of anti-parallel directions.

Figure 11E:
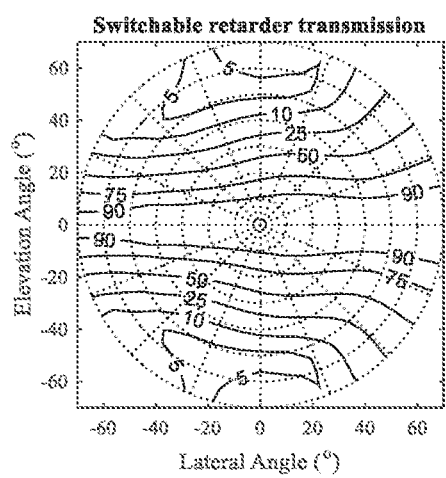
FIG. 11E is a graph illustrating a simulated polar profile of transmission of the first polar control retarder wherein the pretilt directions of the first polar control retarder are orthogonal to the pretilt directions of the second polar control retarder.

FIG. 11E is a graph illustrating a simulated polar profile of transmission of the first polar control retarder wherein the pretilt directions of the first polar control retarder are orthogonal to the pretilt directions of the second polar control retarder. The pretilt directions of the first polar control retarder 300A are orthogonal to the pretilt directions of the second polar control retarder 300B. Said surface alignment layers of said one (with a homeotropic alignment layer and a homogeneous alignment layer) of the at least one first polar control retarder and the at least one second polar control retarder have pretilts having pretilt directions with components in the plane of the layer of liquid crystal material in a first pair of anti-parallel directions.

In the illustrative embodiments of FIGS. 11A-G and FIGS. 12A-J, the first pair of anti-parallel directions are crossed with the second pair of anti-parallel directions. The first pair of anti-parallel directions are at 90 degrees to the second pair of anti-parallel directions, as viewed normal the planes of the layers of liquid crystal material of the at least one first polar control retarder and the at least one second polar control retarder.

The switchable liquid crystal retarder of said one (with a homeotropic alignment layer and a homogeneous alignment layer) of the at least one first polar control retarder and the at least one second polar control retarder has a retardance for light of a wavelength of 550 nm having a first retardance value and the switchable liquid crystal retarder of said other (with alignment layers that are of the same type) the at least one first polar control retarder and the at least one second polar control retarder has a retardance for light of a wavelength of 550 nm has a second retardance value, the first retardance value being greater than the second retardance value.

The magnitude of the difference between half the first retardance value and the second retardance value is at most 400 nm and preferably at most 200 nm.

Figure 11F:
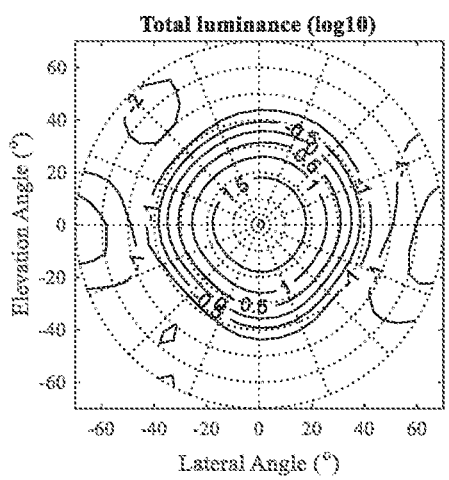
FIG. 11F is a graph illustrating a simulated polar profile of the logarithm of total output luminance of the spatial light modulator and first and second polar control retarders.

FIG. 11F is a graph illustrating a simulated polar profile of the logarithm of total output luminance of the spatial light modulator and first and second polar control retarders.

Figure 11G:
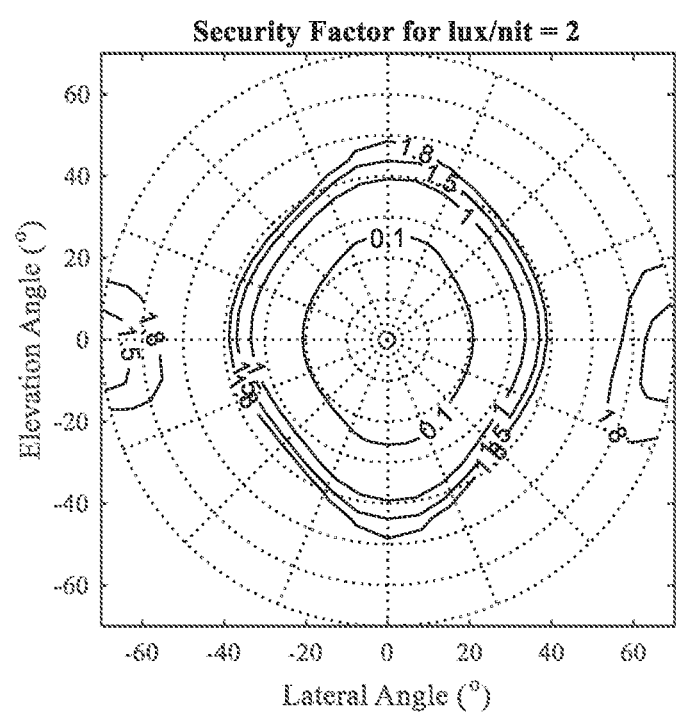
FIG. 11G is a graph illustrating a simulated polar profile of the security level, S of the arrangement with no reflective polariser for an ambient illuminance measured in lux that is twice the head-on display luminance measured in nits for the polar profiles of FIGS. 11A-F.

FIG. 11G is a graph illustrating a simulated polar profile of the security level, S of the arrangement with no reflective polariser for an ambient illuminance measured in lux that is twice the head-on display luminance measured in nits for the polar profiles of FIGS. 11A-F.

Advantageously a display may be provided with high visual security for landscape and portrait operation of a display in privacy mode, with high security factor for off-axis viewing locations. Such a display may be switched to a public mode of operation with security level similar to that illustrated in FIG. 9J.

Other illustrate embodiments are illustrated in TABLES 6B-C. The embodiments may be provided for the arrangements of FIGS. 1A-B or alternatively for the arrangements of FIGS. 4A-B, wherein the arrangements comprise reflective polariser 302. In other embodiments, reflective polariser 302 may be omitted.

In comparison to the arrangement of TABLE 6A, embodiments comprising a C-plate in comparison to the crossed A-plates may advantageously be thinner and cheaper. Embodiments comprising two homeotropic alignment layers in comparison to the two homogeneous alignment layers may advantageously achieve public mode operation with zero volts, and may have lower power consumption. Embodiments wherein the first retarder 300A comprises a homeotropic alignment layer and a homogeneous alignment layer advantageously achieve lower privacy switch-on angle 140 while maintaining high security level at higher polar angles.

TABLE 6B

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 0 | 750 nm | | |
| | 417BA | Homogeneous | 2 | 180 | {600 nm~850 nm} (500 nm~900 nm) | | |
| | 330B | | | | | Negative C-plate | −440 nm {−350 nm~−600 nm} (−300 nm~−700 nm) |
| 300A | 417AB | Homogeneous | 2 | 90 | 1250 nm | | |
| | 417AA | Homeotropic | 88 | 270 | {850 nm~1800 nm} (700 nm~2500 nm) | | |
| | 330A | | | | | Negative C-plate | −1000 nm {−700 nm~−1700 nm} (−400 nm~−2100 nm) |

In respect of the other (with alignment layers that are of the same type) of the at least one first polar control retarder and the at least one second polar control retarder, both of the surface alignment layers are arranged to provide homogenous alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −700 nm, preferably in a range from −350 nm to −600 nm.

TABLE 6C

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm | | |
| | 417BA | Homeotropic | 88 | 0 | {850 nm~1800 nm} (700 nm~2500 nm) | | |
| | 330B | | | | | Negative C-plate | −1000 nm {−700 nm~−1700 nm} (−400 nm~ −2100 nm) |
| 300A | 417AB | Homeotropic | 88 | 90 | 750 nm | | |
| | 417AA | Homeotropic | 88 | 270 | {600 nm~850 nm} (500 nm~900 nm) | | |
| | 330A | | | | | Negative C-plate | −660 nm {−400 nm~−800 nm} (−300 nm~−900 nm) |

In respect of the other (with alignment layers that are of the same type) of the at least one first polar control retarder and the at least one second polar control retarder, both of the surface alignment layers are arranged to provide homeotropic alignment in the adjacent liquid crystal material which has a retardance for light of a wavelength of 550 nm in a range from 500 nm to 900 nm, preferably in a range from 600 nm to 850 nm, and said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −800 nm, preferably in a range from −400 nm to −800 nm.

TABLE 7 compares the retardances of the embodiments of FIGS. 6A-C.

TABLE 7

| TABLE | First alignment layers & passive retarder(s) | Second alignment layers & passive retarder(s) | First LC retardance/ nm | First passive retarder(s) retardance/ nm | Second LC retardance/ nm | Second passive retarder(s) retardance/ nm |
|---|---|---|---|---|---|---|
| 6A | Homogeneous Homeotropic Negative C | Homogeneous Homeotropic Crossed A | 1250 | −1000 | 700 | 570 |
| 6B | | Homogeneous Homogeneous Negative C | | | 750 | −440 |
| 6C | | Homeotropic Homeotropic Negative C | | | 1500 | −1400 |

It may be desirable to provide privacy displays that achieve high security level for off-axis viewing in both landscape and portrait modes of operation for an emissive display. The illustrative embodiment of TABLE 9A will now be discussed with reference to FIGS. 12A-G for an illustrative pixel plane 214 and parallax barrier 700 arrangement of FIG. 2.

Figure 12A:
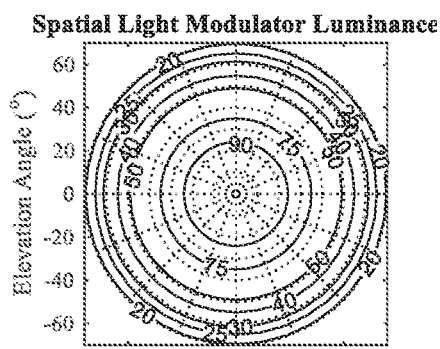
FIG. 12A is a graph illustrating a simulated polar profile of luminance output of an emissive spatial light modulator with the barrier structure of FIG. 2.

FIG. 12A is a graph illustrating a simulated polar profile of luminance output of an emissive spatial light modulator.

The spatial light modulator 48 comprises an emissive spatial light modulator arranged to output light, the display polariser is an output display polariser 218 arranged on the output side of the emissive spatial light modulator 48, as illustrated in FIG. 1A. The emissive spatial light modulator comprises an array of pixels 220, 222, 224 arranged in a pixel layer 214, and the display device further comprises a parallax barrier 700 forming an array of apertures 702, wherein the parallax barrier 700 is separated from the pixel layer 214 by a parallax distance d along an axis along a normal to the plane of the pixel layer 214, each pixel 220, 222, 224 being aligned with an aperture 702.

Figure 12B:
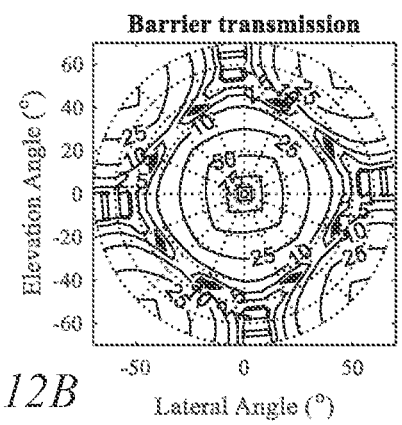
FIG. 12B is a graph illustrating a simulated polar profile of transmission of the barrier structure of FIG. 2 of light from the pixels of the emissive spatial light modulator.

FIG. 12B is a graph illustrating a simulated polar profile of transmission of the barrier structure of FIG. 2 of light from the pixels of the emissive spatial light modulator. An illustrative example is provided in TABLE 8 where the emissive spatial light modulator 48 and the aligned parallax barrier 700 has an output luminance profile having a full width half maximum that is at most 40 degrees.

TABLE 8

| Parameter, x-axis direction | Illustrative value |
|---|---|
| Pixel 224 pitch | 20 microns |
| Pixel 224 emitting width | 10 microns |
| Barrier aperture 702 width | 10 microns |
| Barrier separation, d | 20 microns |

TABLE 9A

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 0 | 480 nm | | |
| | 417BA | Homogeneous | 2 | 180 | {400 nm~600 nm} (300 nm~800 nm) | | |
| | 330BA | | | | | Positive A-plate @ 45° | +570 nm {+250~625 nm} (+150 nm~+800 nm) |

TABLE 9A-continued

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| | 330BB | | | | | Positive A-plate @ 135° | +570 nm {+250~625 nm} (+150 nm~+800 nm) |
| 300A | 417AB | Homogeneous | 2 | 180 | 1250 nm {850 nm~1800 nm} (700 nm~2500 nm) | | |
| | 417AA | Homeotropic | 88 | 0 | | | |
| | 330A | | | | | Negative C-plate | −1000 nm {−700 nm~−1700 nm} (−400 nm~−2100 nm) |

Figure 12C:
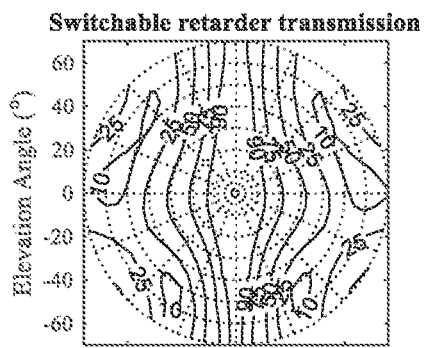
FIG. 12C is a graph illustrating a simulated polar profile of transmission of the second polar control retarder arranged between the first and second additional polarisers wherein the electric vector transmission directions of the polarisers are parallel.
Figure 12D:
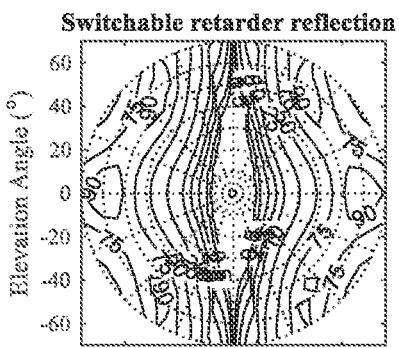
FIG. 12D is a graph illustrating a simulated polar profile of reflectivity of the second polar control retarder arranged between a reflective polariser and the second additional polariser wherein the electric vector transmission directions of the polarisers are parallel.
Figure 12E:
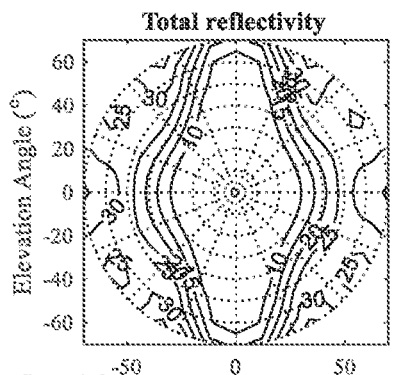
FIG. 12E is a graph illustrating a simulated polar profile of the total reflectivity comprising the reflectivity and the Fresnel reflectivity from the front surface of the display device.

FIG. 12C is a graph illustrating a simulated polar profile of transmission of the second polar control retarder arranged between the first and second additional polarisers wherein the electric vector transmission directions of the polarisers are parallel, FIG. 12D is a graph illustrating a simulated polar profile of reflectivity of the second polar control retarder arranged between a reflective polariser and the second additional polariser wherein the electric vector transmission directions of the polarisers are parallel; and FIG. 12E is a graph illustrating a simulated polar profile of the total reflectivity comprising the reflectivity and the Fresnel reflectivity from the front surface of the display device.

Figure 12F:
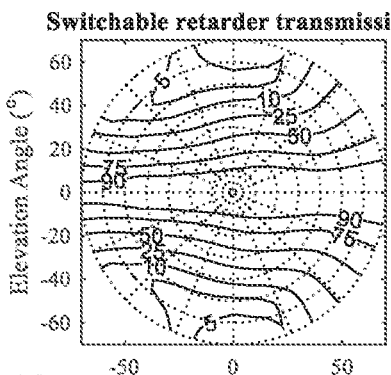
FIG. 12F is a graph illustrating a simulated polar profile of transmission of the first polar control retarder arranged between the display polariser and the first additional polariser wherein the electric vector transmission directions of the polarisers are parallel.

FIG. 12F is a graph illustrating a simulated polar profile of transmission of the first polar control retarder arranged between the display polariser and the first additional polariser wherein the electric vector transmission directions of the polarisers are parallel and the pretilt directions of the first polar control retarder 300A are orthogonal to the pretilt directions of the second polar control retarder 300B.

Figure 12G:
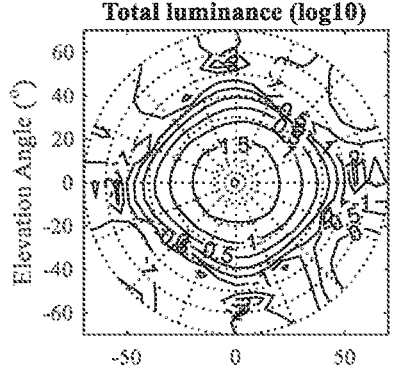
FIG. 12G is a graph illustrating a simulated polar profile of the logarithm of total output luminance of the spatial light modulator and first and second polar control retarders.
Figure 12H:
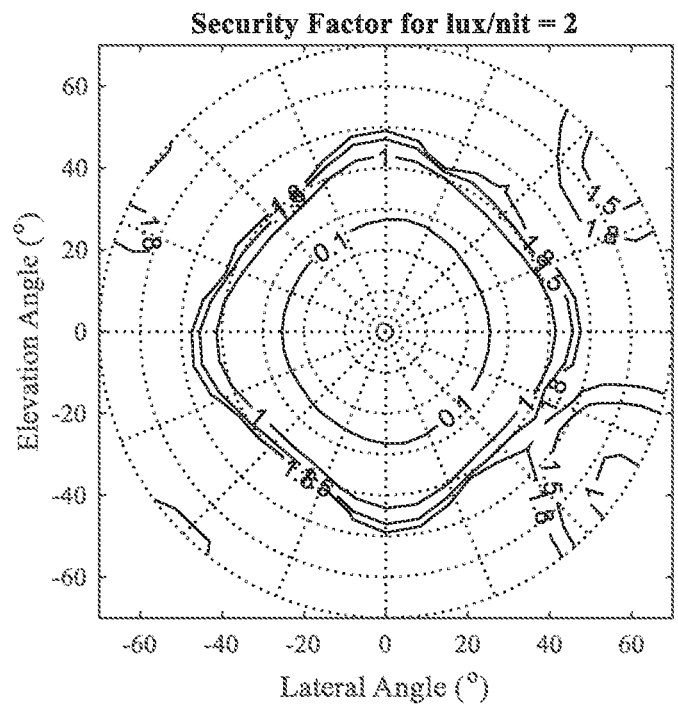
FIG. 12H is a graph illustrating a simulated polar profile of the security level, S of the arrangement for an ambient illuminance measured in lux that is twice the head-on display luminance measured in nits.

FIG. 12G is a graph illustrating a simulated polar profile of the logarithm of total output luminance of the spatial light modulator and first and second polar control retarders as illustrated in FIGS. 12A-F; and FIG. 12H is a graph illustrating a simulated polar profile of the security level, S of the arrangement for the polar profiles of FIGS. 12A-G for an ambient illuminance measured in lux that is twice the head-on display luminance measured in nits.

Advantageously a display that provides desirable security factor, S in landscape and portrait operation may be provided. In comparison to the embodiment of TABLE 6A, the desirable retardance of the first polar control retarder is reduced. Such a polar control retarder provides high angle luminance reduction, while the parallax barrier 700 provides lower angle luminance reduction. Advantageously increased uniformity of security level is achieved in an emissive display.

Figure 12I:
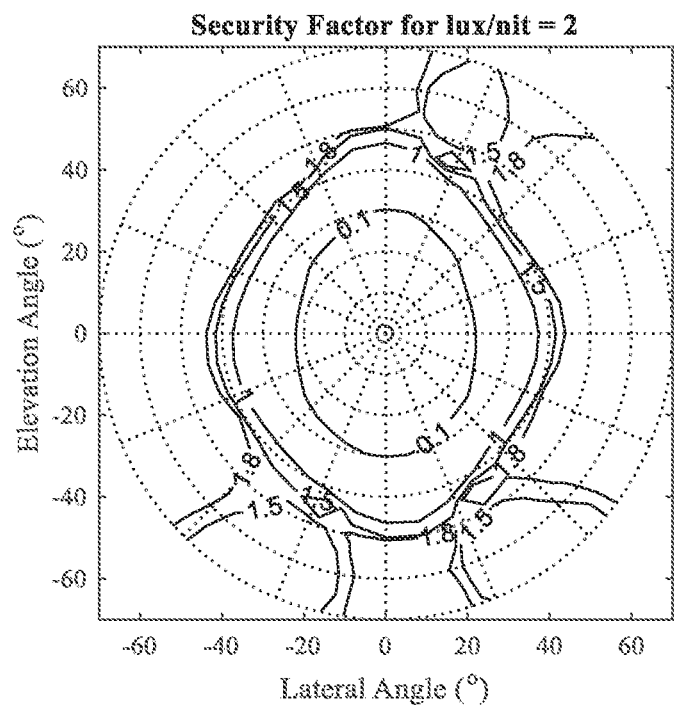
FIG. 12I is a graph illustrating a simulated polar profile of the security level, S wherein the first polar control retarder is the second polar control retarder of FIG. 12H and the second polar control retarder is the first polar control retarder of FIG. 11H.

FIG. 12I is a graph illustrating a simulated polar profile of the security level, S wherein the first polar control retarder is the second polar control retarder of FIG. 11H and the second polar control retarder is the first polar control retarder of FIG. 11H, as illustrated in TABLE 9B. In comparison to the arrangement of TABLE 9A, advantageously privacy switch-on angle is reduced in the lateral direction.

TABLE 9B

| Item | Layer | Alignment type | Pretilt | In-plane alignment direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homogeneous | 2 | 180 | 1250 nm {850 nm~1800 nm} (700 nm~2500 nm) | | |
| | 417BA | Homeotropic | 88 | 0 | | | |
| | 330BA | | | | | Negative C-plate | −1000 nm {−700 nm~−1700 nm} (−400 nm~−2100 nm) |
| 300A | 417AB | Homogeneous | 2 | 0 | 480 nm {400 nm~600 nm} (300 nm~800 nm) | | |
| | 417AA | Homogeneous | 2 | 180 | | | |
| | 330AA | | | | | Positive A-plate @ 45° | +570 nm {+250~625 nm} (+150 nm~+800 nm) |
| | 330AB | | | | | Positive A-plate @ 135° | +570 nm {+250~625 nm} (+150 nm~+800 nm) |

In other embodiments the first polar control retarder may comprise homeotropic alignment layers, to advantageously achieve reduced power consumption. In other embodiments the first polar control retarder may comprise passive C-plate retarders to advantageously achieve reduced cost and complexity as described elsewhere herein.

Figure 12J:
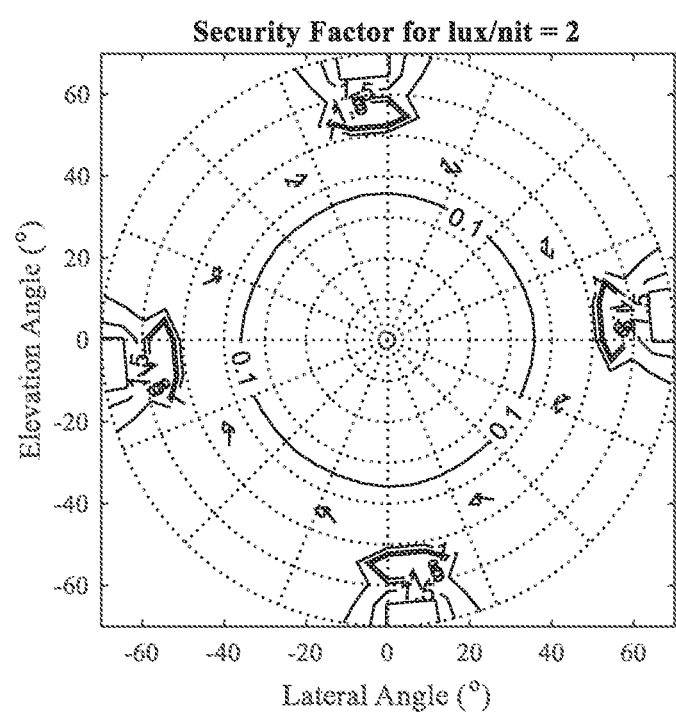
FIG. 12J is a graph illustrating a simulated polar profile of the security level, S of the arrangement for an ambient illuminance measured in lux that is twice the head-on display luminance measured in nits and operated in public mode.

FIG. 12J is a graph illustrating a simulated polar profile of the security level, S of the arrangement for an ambient illuminance measured in lux that is twice the head-on display luminance measured in nits and operated in public mode for the arrangements of FIGS. 12A-H. Advantageously image visibility (S<0.1) is maintained to so that the display can be easily seen with high contrast from polar viewing angles that are greater than 30 degrees in both landscape and portrait orientations.

Figure 13:
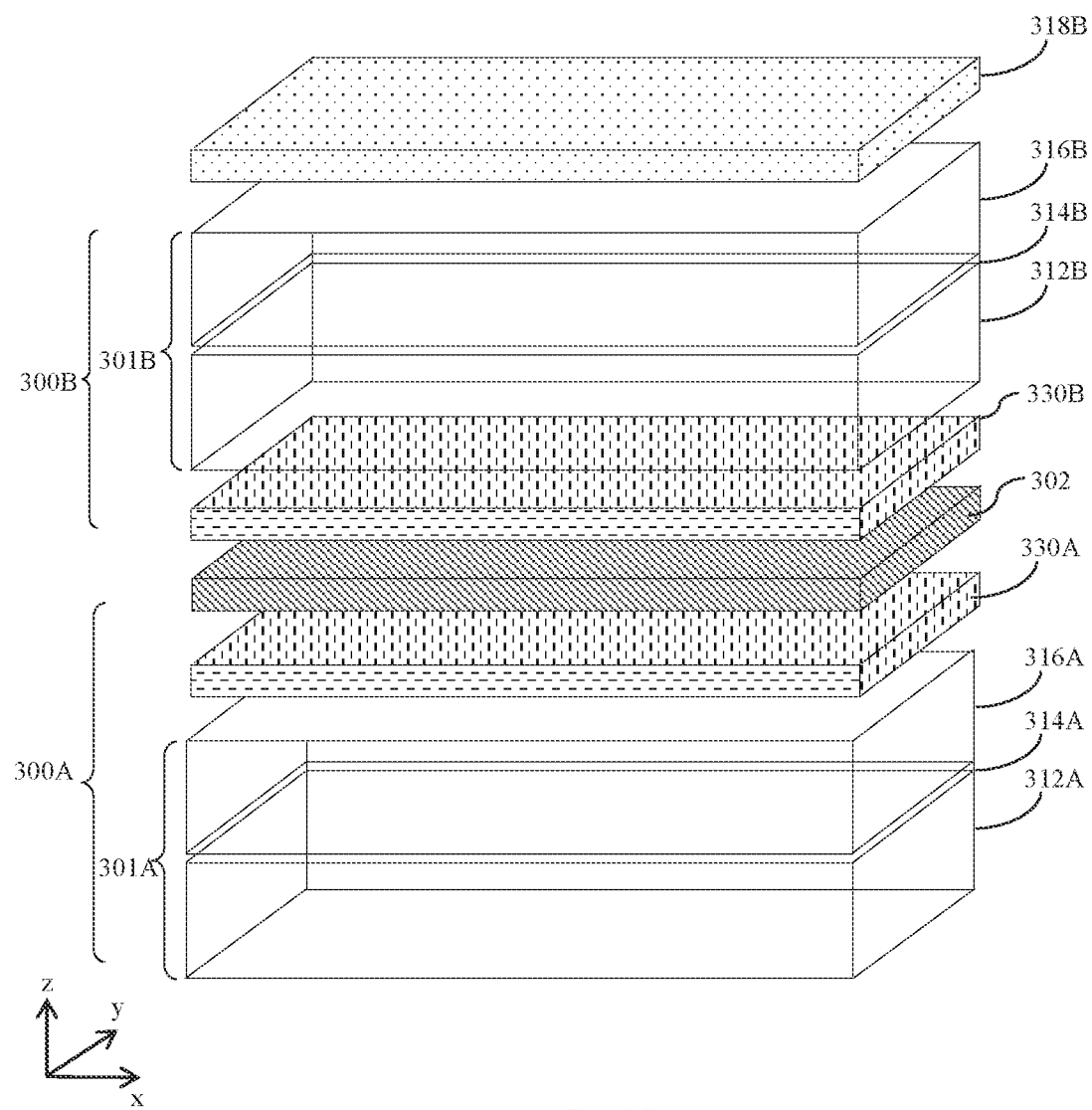
FIG. 13 is a schematic diagram illustrating in side perspective view a switchable privacy display component for use with a spatial light modulator comprising a first polar control retarder and a first additional polariser, a reflective polariser; and a second polar control retarder arranged between the first additional polariser and a second additional polariser.

FIG. 13 is a schematic diagram illustrating in side perspective view a switchable privacy display component 102 for use with a spatial light modulator 48 comprising a first polar control retarder 300A and a first additional polariser 318A, a reflective polariser 302; and a second polar control retarder 300B arranged between the first additional polariser 318A and a second additional polariser 318B. Advantageously a spatial light modulator 48 may be reconfigured in the factory or in the field for use as a switchable privacy display. Features of the embodiment of FIG. 13 not discussed in further detail may be assumed to correspond to the features with equivalent reference numerals as discussed above, including any potential variations in the features.

Figure 14:
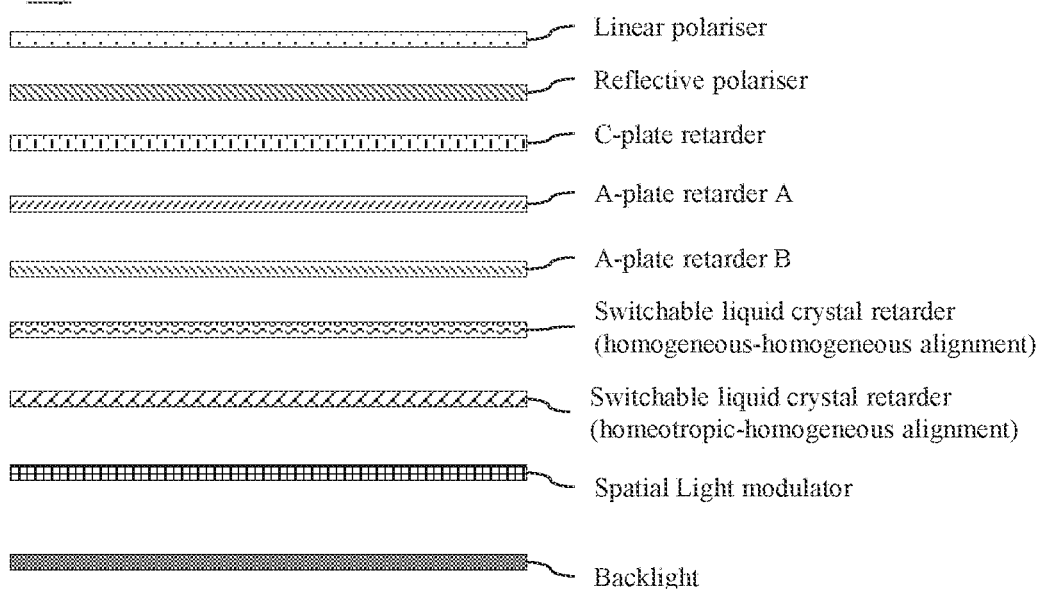
FIG. 14 is a key for the alternative stacking arrangements of FIGS. 15A-F, FIGS. 16A-F, FIGS. 17A-C and FIGS. 18A-F.
Figure 15A:
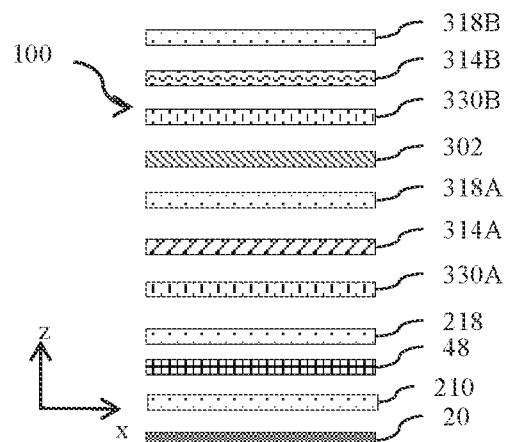
FIG. 15A, FIG. 15B, FIG. 15C, FIG. 15D, FIG. 15E, and FIG. 15F are schematic diagrams illustrating in side view alternatives for optical component stackings for a switchable privacy display wherein the first and second polar control retarders are arranged to receive light from a transmissive spatial light modulator and backlight.
Figure 15B:
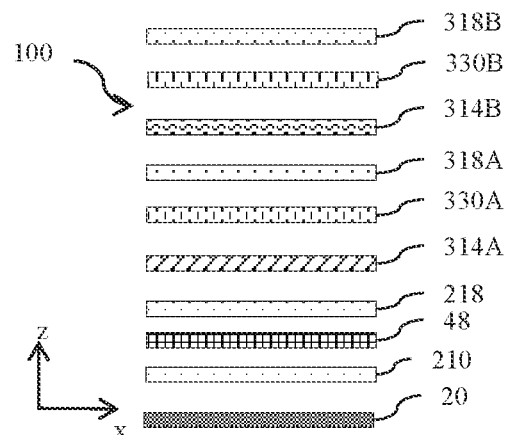
Figure 15C:
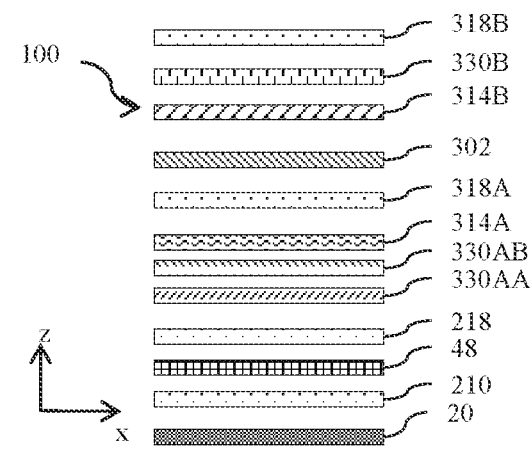
Figure 15D:
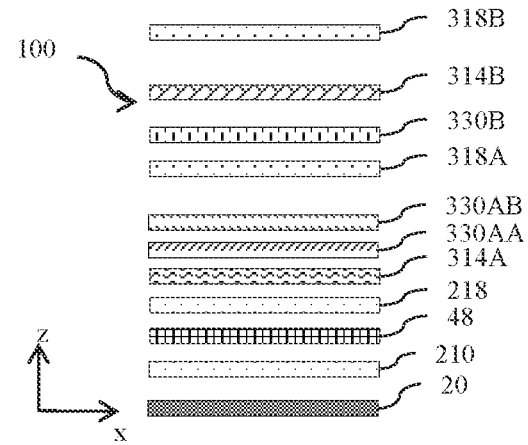
Figure 15E:
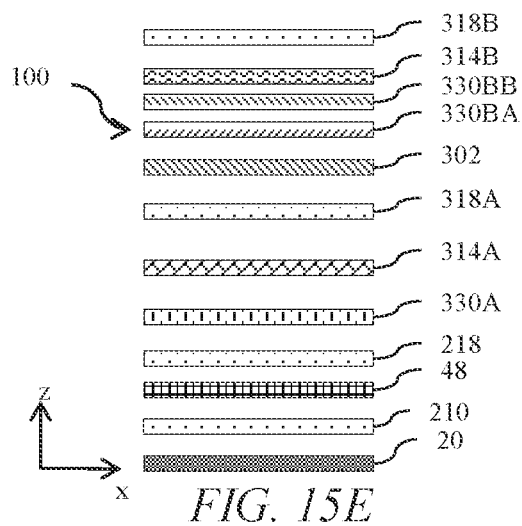
Figure 15F:
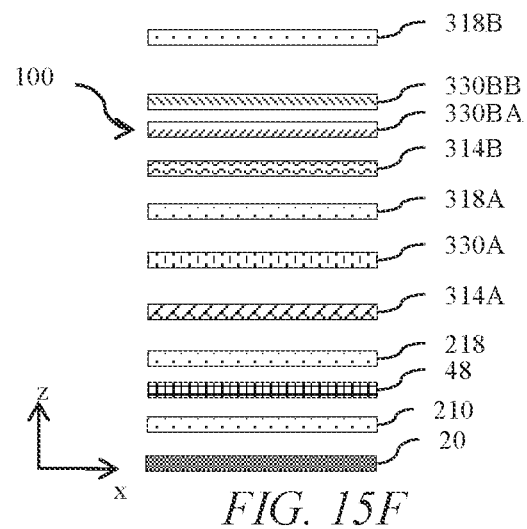

Various alternatives for optical stackings of the present embodiments will now be described FIG. 14 is a key for the alternative stacking arrangements of FIGS. 15A-F, FIGS. 16A-F, FIGS. 17A-C and FIGS. 18A-F.

FIGS. 15A-F are schematic diagrams illustrating in side view alternatives for optical component stackings for a switchable privacy display 100 wherein the first and second polar control retarders 300A, 300B are arranged to receive light from a transmissive spatial light modulator 48 and backlight 20. Features of the embodiment of FIGS. 15A-F not discussed in further detail may be assumed to correspond to the features with equivalent reference numerals as discussed above, including any potential variations in the features.

Figure 17A:
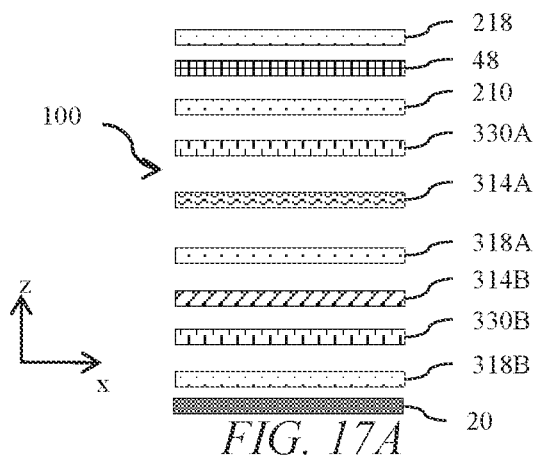
FIG. 17A, FIG. 17B, and FIG. 17C are schematic diagrams illustrating in side view alternatives for optical component stackings for a switchable privacy display wherein the transmissive spatial light modulator is arranged to receive light from the first and second polar control retarders and a backlight.
Figure 17B:
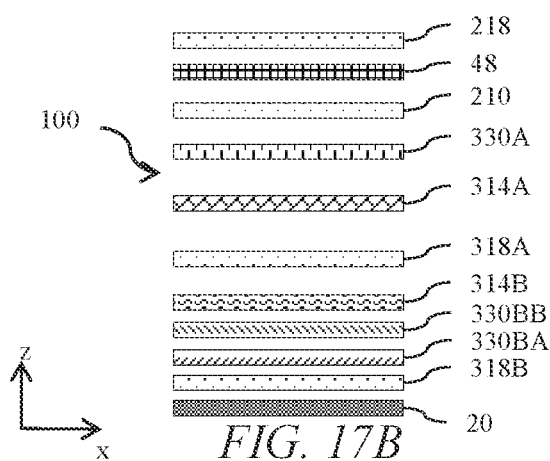
Figure 17C:
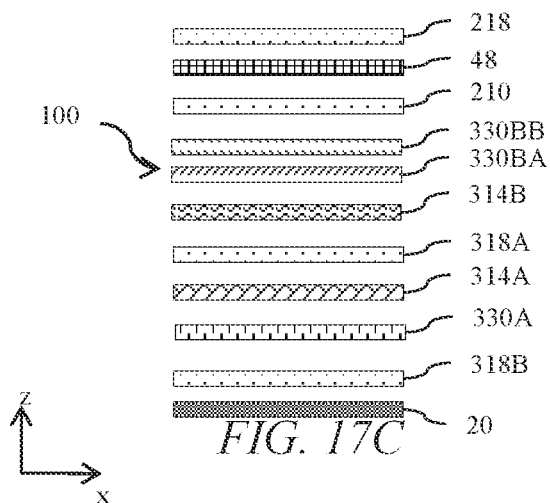

FIGS. 16A-F are schematic diagrams illustrating in side view alternatives for optical component stackings for a switchable privacy display 100 wherein one of the first and second polar control retarders 300A, 300B is arranged to receive light from the transmissive spatial light modulator 48 and the spatial light modulator 48 is arranged to receive light from the other of the first and second polar control retarders 300A, 300B and backlight 20, and FIGS. 17A-C are schematic diagrams illustrating in side view alternatives for optical component stackings for a switchable privacy display wherein the spatial light modulator 48 is arranged to receive light from the first and second polar control retarders 300A, 300B and backlight 20. Features of the embodiment of FIGS. 16A-F and FIGS. 17A-C not discussed in further detail may be assumed to correspond to the features with equivalent reference numerals as discussed above, including any potential variations in the features.

FIGS. 18A-F are schematic diagrams illustrating in side view alternatives for optical component stackings for a switchable privacy display 100 wherein the first and second polar control retarders 300A, 300B are arranged to receive light from an emissive spatial light modulator 48. Features of the embodiment of FIGS. 18A-F not discussed in further detail may be assumed to correspond to the features with equivalent reference numerals as discussed above, including any potential variations in the features.

In the alternatives of FIGS. 15A-F, FIGS. 16A-F, FIGS. 17A-C and FIGS. 18A-F, various alternatives are illustrated and can more generally be described as follows.

For each polar control retarder 300A, 300B that comprises a liquid crystal retarder 314A, 314B with two homogeneous alignment layers 417A, 417B then the respective passive retarder 330A, 330B or pair of crossed passive retarders 330AA, 330AB or 330BA, 330BB may be arranged to either receive light from the respective liquid crystal retarder 314A, 314B; or the liquid crystal retarder 314A, 314B may be arranged to receive light from the respective passive retarder 330A, 330B or pair of crossed passive retarders 330AA, 330AB or 330BA, 330BB.

For each polar control retarder 300A, 300B that comprises a liquid crystal retarder 314A, 314B with one homogeneous alignment layer and one homeotropic alignment layer 417A, 417B then preferably the homeotropic alignment layer is arranged between the respective layer of liquid crystal material 421A, 421B and the respective passive retarder 330A, 330B. Advantageously the size of the polar region for reduced luminance in privacy mode is increased.

Figure 18A:
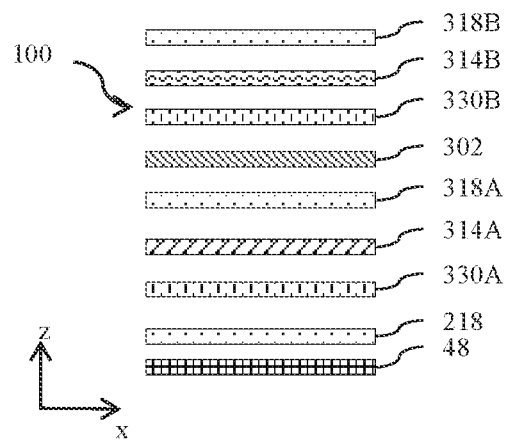
FIG. 18A, FIG. 18B, FIG. 18C, FIG. 18D, FIG. 18E, and FIG. 18F are schematic diagrams illustrating in side view alternatives for optical component stackings for a switchable privacy display wherein the first and second polar control retarders are arranged to receive light from an emissive spatial light modulator.
Figure 18B:
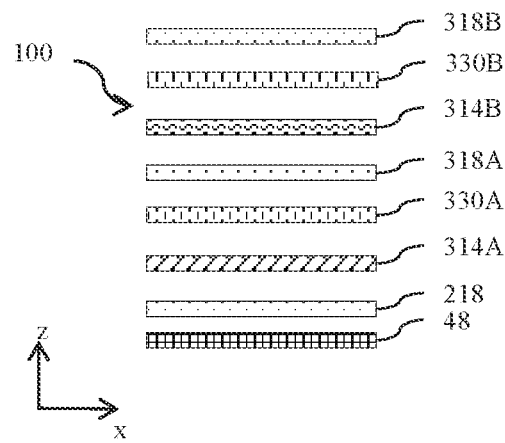
Figure 18C:
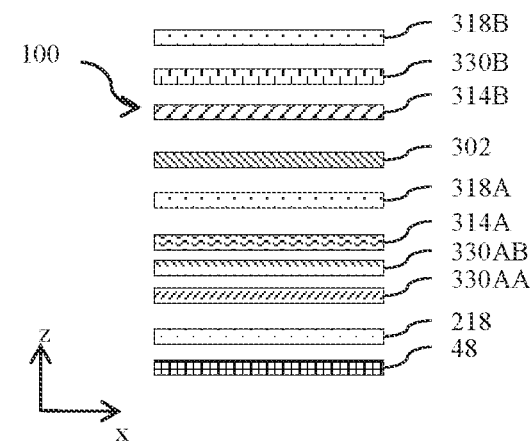
Figure 18D:
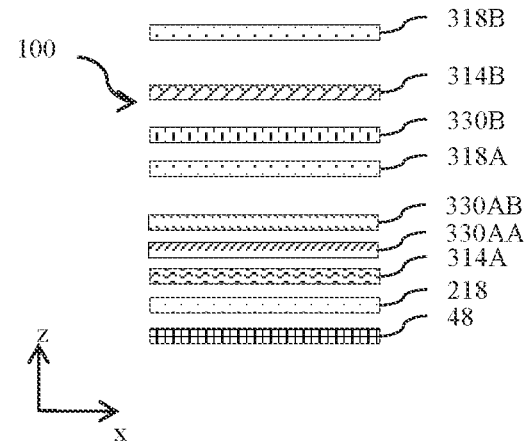
Figure 18E:
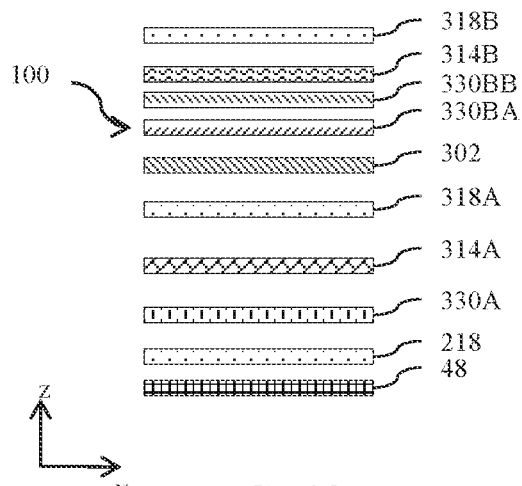
Figure 18F:
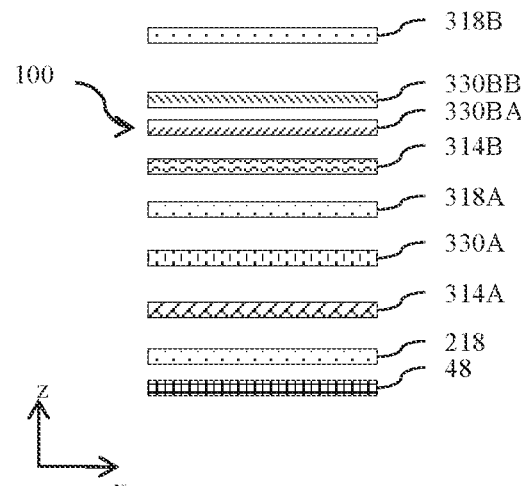

For the alternatives of FIGS. 15A, 15C, 15E, FIGS. 16A, 16C. 16E, and FIGS. 18A, 18C, 18E, one of polar control retarders 300A, 300B may be arranged between reflective polariser 302 and further additional polariser 318B. Advantageously the reflectivity of the display 100 in privacy mode of operation may be increased, and security factor increased.

The alternatives of FIGS. 15A-F, FIGS. 16A-F and FIGS. 17A-C with the transmissive spatial light modulator 48 and backlight 20 omitted or the alternative of FIGS. 18A-F with the emissive spatial light modulator 48 omitted may provide alternative components such as that illustrated in FIG. 13.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
a spatial light modulator;
a display polariser arranged on a side of the spatial light modulator, the display polariser being a linear polariser;
a first additional polariser arranged on the same side of the spatial light modulator as the display polariser, the first additional polariser being a linear polariser;
at least one first polar control retarder arranged between the first additional polariser and the display polariser,
a second additional polariser, the second additional polariser being a linear polariser; and
at least one second polar control retarder, wherein either:
the second additional polariser is arranged on the same side of the spatial light modulator as the first additional polariser outside the first additional polariser, and the at least one second polar control retarder is arranged between the first additional polariser and the second additional polariser; or
the display device further comprises a backlight arranged to output light, the spatial light modulator comprises a transmissive spatial light modulator arranged to receive output light from the backlight, said display polariser is an input display polariser arranged on the input side of the spatial light modulator, and the display device further comprises an output display polariser arranged on the output side of the spatial light modulator, the second additional polariser is arranged on the output side of the spatial light modulator, and the at least one second polar control retarder is arranged between the second additional polariser and the output display polariser,
wherein:
each of the at least one first polar control retarder and the at least one second polar control retarder comprises a respective switchable liquid crystal retarder comprising a layer of liquid crystal material and two surface alignment layers disposed adjacent to the layer of liquid crystal material and on opposite sides thereof,
in respect of one of the at least one first polar control retarder and the at least one second polar control retarder, one of the surface alignment layers is arranged to provide homogeneous alignment in the adjacent liquid crystal material and the other of the surface alignment layers is arranged to provide homeotropic alignment in the adjacent liquid crystal material, and
in respect of the other of the at least one first polar control retarder and the at least one second polar control retarder, both of the surface alignment layers are arranged to provide homogeneous alignment in the adjacent liquid crystal material or both of the surface alignment layers are arranged to provide homeotropic alignment in the adjacent liquid crystal material.

2. A display device according to claim 1, wherein the switchable liquid crystal retarder of said one of the at least one first polar control retarder and the at least one second polar control retarder has a retardance for light of a wavelength of 550 nm having a first retardance value in a range from 700 nm to 2500 nm, preferably in a range from 850 nm to 1800 nm.

3. A display device according to claim 1, wherein said one of the at least one first polar control retarder and the at least one second polar control retarder further comprises at least one passive compensation retarder.

4. A display device according to claim 3, wherein the at least one passive compensation retarder of said one of the at least one first polar control retarder and the at least one second polar control retarder is arranged on the same side of the switchable liquid crystal retarder as the surface alignment layers that is arranged to provide homeotropic alignment in the adjacent liquid crystal material.

5. A display device according to claim 3, wherein the at least one passive compensation retarder of said one of the at least one first polar control retarder and the at least one second polar control retarder comprises a passive uniaxial retarder having its optical axis perpendicular to the plane of the retarder.

6. A display device according to claim 5, wherein the passive uniaxial retarder has a retardance for light of a wavelength of 550 nm in a range from −400 nm to −2100 nm, preferably in a range from −700 nm to −1700 nm.

7. A display device according to claim 1, wherein
the display device further comprises a reflective polariser, the reflective polariser being a linear polariser, and either:
said display polariser is an output display polariser arranged on the output side of the spatial light modulator, the second additional polariser is arranged on the same side of the spatial light modulator as the first additional polariser outside the first additional polariser, the at least one second polar control retarder is arranged between the first additional polariser and the second additional polariser, and the reflective polariser is arranged between the first additional polariser and the at least one second polar control retarder; or
the display device further comprises a backlight arranged to output light, the spatial light modulator comprises a transmissive spatial light modulator arranged to receive output light from the backlight, said display polariser is an input display polariser arranged on the input side of the spatial light modulator, and the display device further comprises an output display polariser arranged on the output side of the spatial light modulator, the second additional polariser is arranged on the output side of the spatial light modulator, the at least one second polar control retarder is arranged between the second additional polariser and the output display polariser, and the reflective polariser is arranged between the output display polariser and the at least one second polar control retarder.

8. A display device according to claim 7, wherein said one of the at least one first polar control retarder and the at least one second polar control retarder is the at least one second polar control retarder and said other of the at least one first polar control retarder and the at least one second polar control retarder is the at least one first polar control retarder.

9. A display device according to claim 1, wherein the switchable liquid crystal retarder of said one of the at least one first polar control retarder and the at least one second polar control retarder has a retardance for light of a wavelength of 550 nm having a first retardance value and the switchable liquid crystal retarder of said other of the at least one first polar control retarder and the at least one second polar control retarder has a retardance for light of a wavelength of 550 nm having a second retardance value, the first retardance value being greater than the second retardance value.

10. A display device according to claim 9, wherein the magnitude of the difference between half the first retardance value and the second retardance value is at most 400 nm.

11. A display device according to claim 9, wherein
in respect of said other of the at least one first polar control retarder and the at least one second polar control retarder, both of the surface alignment layers are arranged to provide homogeneous alignment in the adjacent liquid crystal material which has a retardance for light of a wavelength of 550 nm in a range from 450 nm to 900 nm, preferably in a range from 550 nm to 800 nm, and
said other of the at least one first polar control retarder and the at least one second polar control retarder further comprises a pair of passive uniaxial retarders having optical axes in the plane of the retarders that are crossed and each having a retardance for light of a wavelength of 550 nm in a range from 250 nm to 800 nm, preferably in a range from 400 nm to 625 nm.

12. A display device according to claim 9, wherein
in respect of the other of the at least one first polar control retarder and the at least one second polar control retarder, both of the surface alignment layers are arranged to provide homogeneous alignment in the adjacent liquid crystal material which has a retardance for light of a wavelength of 550 nm in a range from 500 nm to 900 nm, preferably in a range from 600 nm to 850 nm, and
said other of the at least one first polar control retarder and the at least one second polar control retarder further comprises a passive uniaxial retarder having its optical axis perpendicular to the plane of the retarder and having a retardance for light of a wavelength of 550 nm in a range from –300 nm to –700 nm, preferably in a range from-350 nm to –600 nm.

13. A display device according to claim 9, wherein
in respect of the other of the at least one first polar control retarder and the at least one second polar control retarder, both of the surface alignment layers are arranged to provide homeotropic alignment in the adjacent liquid crystal material which has a retardance for light of a wavelength of 550 nm in a range from 500 nm to 900 nm, preferably in a range from 600 nm to 850 nm, and
said other of the at least one first polar control retarder and the at least one second polar control retarder further comprises a passive uniaxial retarder having its optical axis perpendicular to the plane of the retarder and having a retardance for light of a wavelength of 550 nm in a range from –300 nm to –900 nm, preferably in a range from-400 nm to –800 nm.

14. A display device according to claim 9, wherein the spatial light modulator comprises an emissive spatial light modulator arranged to output light, the display polariser is an output display polariser arranged on the output side of the emissive spatial light modulator, the second additional polariser is arranged on the output side of the spatial light modulator outside the first additional polariser, and the at least one second polar control retarder is arranged between the first additional polariser and the second additional polariser.

15. A display device according to claim 14, wherein the emissive spatial light modulator has an output luminance profile having a full width half maximum that is at least 40 degrees, preferably at least 50 degrees.

16. A display device according to claim 9, wherein the display device further comprises a backlight arranged to output light, and the spatial light modulator comprises a transmissive spatial light modulator arranged to receive output light from the backlight.

17. A display device according to claim 16, wherein the backlight has an output luminance profile having a full width half maximum that is at least 40 degrees, preferably at least 50 degrees.

18. A display device according to claim 1, wherein the switchable liquid crystal retarder of said one of the at least one first polar control retarder and the at least one second polar control retarder has a retardance for light of a wavelength of 550 nm having a first retardance value and the switchable liquid crystal retarder of said other the at least one first polar control retarder and the at least one second polar control retarder has a retardance for light of a wavelength of 550 nm having a second retardance value, half of the first retardance value being less than the second retardance value.

19. A display device according to claim 18, wherein
in respect of the other of the at least one first polar control retarder and the at least one second polar control retarder, both of the surface alignment layers are arranged to provide homogeneous alignment in the adjacent liquid crystal material which has a retardance for light of a wavelength of 550 nm in a range from 700 nm to 2500 nm, preferably in a range from 850 nm to 1800 nm, and
said other of the at least one first polar control retarder and the at least one second polar control retarder further comprises a pair of passive uniaxial retarders having optical axes in the plane of the retarders that are crossed and each having a retardance for light of a wavelength of 550 nm in a range from 600 nm to 1600 nm, preferably in a range from 750 nm to 1300 nm.

20. A display device according to claim 18, wherein
in respect of the other of the at least one first polar control retarder and the at least one second polar control retarder, both of the surface alignment layers are arranged to provide homeotropic alignment in the adjacent liquid crystal material which has a retardance for light of a wavelength of 550 nm in a range from 700 nm to 2500 nm, preferably in a range from 1000 nm to 1800 nm, and
said other of the at least one first polar control retarder and the at least one second polar control retarder further comprises a passive uniaxial retarder having its optical axis perpendicular to the plane of the retarder and having a retardance for light of a wavelength of 550 nm in a range from –700 nm to –2500 nm, preferably in a range from-900 nm to –1800 nm.

21. A display device according to claim 18, wherein the spatial light modulator comprises an emissive spatial light modulator arranged to output light, the display polariser is an output display polariser arranged on the output side of the emissive spatial light modulator, the second additional polariser is arranged on the output side of the spatial light modulator outside the first additional polariser, and the at least one second polar control retarder is arranged between the first additional polariser and the second additional polariser.

22. A display device according to claim 21, wherein
the emissive spatial light modulator comprises an array of pixels arranged in a pixel layer, and
the display device further comprises a parallax barrier forming an array of apertures, wherein the parallax barrier is separated from the pixel layer by a parallax distance along an axis along a normal to the plane of the pixel layer, each pixel being aligned with an aperture.

23. A display device according to claim 22, wherein the emissive spatial light modulator and the parallax barrier has an output luminance profile having a full width half maximum that is at most 40 degrees.

24. A display device according to claim 18, wherein the display device comprises a backlight arranged to output light, and the spatial light modulator comprises a transmissive spatial light modulator arranged to receive output light from the backlight.

25. A display device according to claim 24, wherein the backlight has an output luminance profile having a full width half maximum that is at most 40 degrees.

26. A display device according to claim 1, wherein
said surface alignment layers of said one of the at least one first polar control retarder and the at least one second polar control retarder have pretilts having pretilt directions with components in the plane of the layer of liquid crystal material in a first pair of anti-parallel directions, and
said surface alignment layers of said other of the at least one first polar control retarder and the at least one second polar control retarder have pretilts having pretilt directions with components in the plane of the layer of liquid crystal material in a second pair of anti-parallel directions, the first pair of anti-parallel directions being crossed with the second pair of anti-parallel directions.

27. A display device according to claim 26, wherein the first pair of anti-parallel directions are at 90 degrees to the second pair of anti-parallel directions, as viewed normal the planes of the layers of liquid crystal material of the at least one first polar control retarder and the at least one second polar control retarder.

28. A display device according to claim 26, wherein the switchable liquid crystal retarder of said one of the at least one first polar control retarder and the at least one second polar control retarder has a retardance for light of a wavelength of 550 nm having a first retardance value and the switchable liquid crystal retarder of said other the at least one first polar control retarder and the at least one second polar control retarder has a retardance for light of a wavelength of 550 nm having a second retardance value, the first retardance value being greater than the second retardance value.

29. A display device according to claim 28, wherein the magnitude of the difference between half the first retardance value and the second retardance value is at most 400 nm.

30. A display device according to claim 26, wherein
in respect of the other of the at least one first polar control retarder and the at least one second polar control retarder, both of the surface alignment layers are arranged to provide homogeneous alignment in the adjacent liquid crystal material which has a retardance for light of a wavelength of 550 nm in a range from 450 nm to 900 nm, preferably in a range from 550 nm to 800 nm, and
said other of the at least one first polar control retarder and the at least one second polar control retarder further comprises a pair of passive uniaxial retarders having optical axes in the plane of the retarders that are crossed and each having a retardance for light of a wavelength of 550 nm in a range from 250 nm to 800 nm, preferably in a range from 400 nm to 625 nm.

31. A display device according to claim 26, wherein
in respect of the other of the at least one first polar control retarder and the at least one second polar control retarder, both of the surface alignment layers are arranged to provide homogeneous alignment in the adjacent liquid crystal material which has a retardance for light of a wavelength of 550 nm in a range from 500 nm to 900 nm, preferably in a range from 600 nm to 850 nm, and
said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −700 nm, preferably in a range from-350 nm to −600 nm.

32. A display device according to claim 26, wherein
in respect of the other of the at least one first polar control retarder and the at least one second polar control retarder, both of the surface alignment layers are arranged to provide homeotropic alignment in the adjacent liquid crystal material which has a retardance for light of a wavelength of 550 nm in a range from 500 nm to 900 nm, preferably in a range from 600 nm to 850 nm, and
said other of the at least one first polar control retarder and the at least one second polar control retarder further comprises a passive uniaxial retarder having its optical axis perpendicular to the plane of the retarder and having a retardance for light of a wavelength of 550 nm in a range from −300 nm to −800 nm, preferably in a range from-400 nm to −800 nm.

33. A display device according to claim 26, wherein the spatial light modulator comprises an emissive spatial light modulator arranged to output light, the display polariser is an output display polariser arranged on the output side of the emissive spatial light modulator, the second additional polariser is arranged on the output side of the spatial light modulator outside the first additional polariser, and the at least one second polar control retarder is arranged between the first additional polariser and the second additional polariser.

34. A display device according to claim 33, wherein
the emissive spatial light modulator comprises an array of pixels arranged in a pixel layer, and
the display device further comprises a parallax barrier forming an array of apertures, wherein the parallax barrier is separated from the pixel layer by a parallax distance along an axis along a normal to the plane of the pixel layer, each pixel being aligned with an aperture.

35. A display device according to claim 33, wherein the emissive spatial light modulator and parallax barrier has an output luminance profile having a full width half maximum that is at most 40 degrees.

36. A display device according to claim 26, wherein the display device further comprises a backlight arranged to output light, and the spatial light modulator comprises a transmissive spatial light modulator arranged to receive output light from the backlight.

37. A display device according to claim 36, wherein the backlight has an output luminance profile having a full width half maximum that is at most 40 degrees.

38. A display device according to claim 1, wherein the spatial light modulator comprises an emissive spatial light modulator arranged to output light, the display polariser is an output display polariser arranged on the output side of the emissive spatial light modulator, the second additional polariser is arranged on the output side of the spatial light modulator outside the first additional polariser, and the at least one second polar control retarder is arranged between the first additional polariser and the second additional polariser.

39. A display device according to claim 1, wherein the display device further comprises a backlight arranged to output light, and the spatial light modulator comprises a transmissive spatial light modulator arranged to receive output light from the backlight.

40. A display device according to claim 1, wherein said other of the at least one first polar control retarder and the at least one second polar control retarder further comprises at least one passive compensation retarder.

41. A display device according to claim 40, wherein the at least one passive compensation retarder of said other of the at least one first polar control retarder and the at least one second polar control retarder comprises either:
- a passive uniaxial retarder having its optical axis perpendicular to the plane of the retarder; or
- a pair of passive uniaxial retarders having optical axes in the plane of the retarders that are crossed.

42. A display device according to claim 1, wherein, in respect of said other of the at least one first polar control retarder and the at least one second polar control retarder, both of the surface alignment layers are arranged to provide homeotropic alignment in the adjacent liquid crystal material.

43. A display device according to claim 42, wherein the display device further comprises a backlight arranged to output light, the spatial light modulator comprises a transmissive spatial light modulator arranged to receive output light from the backlight, and said other of the at least one first polar control retarder and the at least one second polar control retarder is between the backlight and the transmissive spatial light modulator.

44. A display device according to claim 1, wherein, in respect of said other of the at least one first polar control retarder and the at least one second polar control retarder, both of the surface alignment layers are arranged to provide homogeneous alignment in the adjacent liquid crystal material.

45. A display device according to claim 16, wherein:
- said display polariser is an input display polariser arranged on the input side of the spatial light modulator;
- the first additional polariser is arranged between the backlight and the input display polariser; and
- the second additional polariser is arranged on the same side of the spatial light modulator as the first additional polariser between the backlight and the first additional polariser, and the at least one second polar control retarder is arranged between the first additional polariser and the second additional polariser.

* * * * *